(12) United States Patent
Shimohata et al.

(10) Patent No.: US 9,647,727 B2
(45) Date of Patent: May 9, 2017

(54) INFORMATION PROCESSING SYSTEM, INFORMATION PROCESSING DEVICE, STORAGE MEDIUM STORING INFORMATION PROCESSING PROGRAM, AND STORAGE DEVICE

(71) Applicant: Nintendo Co., Ltd., Kyoto (JP)

(72) Inventors: Yasuyuki Shimohata, Kyoto (JP); Kimiharu Hyodo, Kyoto (JP); Ryuichi Yoshida, Kyoto (JP); Goro Abe, Kyoto (JP); Yusuke Yamasoto, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 0 days.

(21) Appl. No.: 15/229,792

(22) Filed: Aug. 5, 2016

(65) Prior Publication Data
US 2016/0342353 A1 Nov. 24, 2016

Related U.S. Application Data

(63) Continuation of application No. 14/856,605, filed on Sep. 17, 2015, now Pat. No. 9,564,949, which is a
(Continued)

(30) Foreign Application Priority Data

May 2, 2014 (JP) .................................. 2014-095029
May 29, 2014 (JP) .................................. 2014-110879
Oct. 31, 2014 (JP) .................................. 2014-223267

(51) Int. Cl.
*H04Q 5/22* (2006.01)
*H04B 5/00* (2006.01)
(Continued)

(52) U.S. Cl.
CPC ........... *H04B 5/0056* (2013.01); *G06F 3/061* (2013.01); *G06F 3/067* (2013.01); *G06F 3/0622* (2013.01);
(Continued)

(58) Field of Classification Search
CPC ...... G06F 3/0622; G06F 3/0653; G06F 3/067; H04B 5/0031
(Continued)

(56) References Cited

U.S. PATENT DOCUMENTS 9,039,532 B2  5/2015 Canessa
2003/0220876 A1* 11/2003 Burger .................... G06F 21/32
  705/50
(Continued)

OTHER PUBLICATIONS

Skylanders, https://web.archive.org/web/20120423224035/http://www.skylanders.com/ (2012), 3 pages.
(Continued)

Primary Examiner — Ojiako Nwugo
(74) Attorney, Agent, or Firm — Nixon & Vanderhye P.C.

(57) ABSTRACT

An example of information processing system includes a storage device; and an information processing device for performing near field communication with the storage device. The storage device includes a storage unit storing application data usable in a predetermined application program and shared data usable in an application program regardless of whether the application program is the predetermined application program. The information processing system receives an instruction regarding data read and/or data write from/to the storage device from an application program to be executed by the information processing device. Under the condition that the instruction is from the predetermined application program, the application data is passed to the predetermined application program. Regardless of whether the instruction is from the predetermined
(Continued)

application program, the shared data is passed to the application program that issued the instruction.

17 Claims, 28 Drawing Sheets

Related U.S. Application Data continuation of application No. 14/701,938, filed on May 1, 2015.

(51) Int. Cl.
    *G06F 3/06*     (2006.01)
    *G06F 21/62*     (2013.01)
    *G06F 21/78*     (2013.01)

(52) U.S. Cl.
    CPC .......... *G06F 3/0653* (2013.01); *G06F 3/0659* (2013.01); *G06F 3/0673* (2013.01); *G06F 21/62* (2013.01); *G06F 21/78* (2013.01); *H04B 5/0031* (2013.01)

(58) Field of Classification Search
    USPC .......... 340/5.1–5.8, 10.1–10.5, 572.1–572.9; 711/163, 164
    See application file for complete search history.

(56) References Cited

U.S. PATENT DOCUMENTS

| | | | |
|---|---|---|---|
| 2004/0046643 A1* | 3/2004 | Becker | G06K 19/0717 340/10.41 |
| 2004/0089707 A1* | 5/2004 | Cortina | G06K 19/0723 235/375 |
| 2006/0156036 A1* | 7/2006 | Oh | G06F 21/79 713/193 |
| 2007/0069852 A1 | 3/2007 | Mo et al. | |
| 2008/0290994 A1* | 11/2008 | Bruns | H04L 63/0428 340/10.1 |
| 2010/0115170 A1* | 5/2010 | Jeong | G06F 15/163 710/308 |
| 2011/0009075 A1* | 1/2011 | Jantunen | G06K 7/0008 455/73 |
| 2011/0148588 A1* | 6/2011 | Bacquet | G06K 7/10336 340/10.1 |
| 2012/0206242 A1* | 8/2012 | Cho | B65D 17/165 340/10.42 |

OTHER PUBLICATIONS

Communication pursuant to Article 94(3) EPC dated Oct. 17, 2016, issued in corresponding European Patent Application No. 15165469.6.
Office Action dated Dec. 13, 2016, issued in related U.S. Appl. No. 14/701,938.

* cited by examiner

INFORMATION PROCESSING SYSTEM, INFORMATION PROCESSING DEVICE, STORAGE MEDIUM STORING INFORMATION PROCESSING PROGRAM, AND STORAGE DEVICE

CROSS REFERENCE TO RELATED APPLICATION

This application is a continuation of U.S. patent application Ser. No. 14/856,605 filed on Sep. 17, 2015, now U.S. Pat. No. 9,564,949; which is a continuation of U.S. patent application Ser. No. 14/701,938 filed on May 1, 2015; which claims priority to Japanese Patent Application No. 2014-095029 filed on May 2, 2014, Japanese Patent Application No. 2014-110879 filed on May 29, 2014, and Japanese Patent Application No. 2014-223267 filed on Oct. 31, 2014; the disclosures of each of which are incorporated herein by reference.

FIELD

The technology herein relates to an information processing system, an information processing device, a storage medium storing an information processing program, an information processing method and a storage device for performing near field communication.

BACKGROUND AND SUMMARY

Conventionally, there is a technology for performing communication between devices by use of near field communication such as NFC. By near field communication, communication between an information processing device and a storage device (so-called tag) starts in response to the storage device approaching the information processing device.

Conventionally, a storage device that is communicable with an information processing device by near field communication is merely used in a specific application program executed by the information processing device, and there has been room for improvement regarding the versatility of such a storage device.

Accordingly, this application discloses an information processing system, an information processing device, a storage medium storing an information processing program, and an information processing method, with which a storage device is usable in a more versatile manner, and such a storage device.

(1)

An example of information processing system described in this specification is an information processing system including a storage device; and an information processing device for performing near field communication with the storage device.

The storage device includes a storage unit storing application data usable in a predetermined application program and shared data usable in an application program regardless of whether the application program is the predetermined application program.

The information processing system includes a receiving unit, a first processing unit and a second processing unit. The receiving unit receives an instruction regarding data read and/or data write from/to the storage unit from an application program to be executed by the information processing device. In the case where the received instruction relates to the application data, under the condition that the instruction is from the predetermined application program, the first processing unit passes the application data read from the storage unit to the predetermined application program. In the case where the received instruction relates to the shared data, the second processing unit passes the shared data read from the storage unit to the application program that issued the instruction regardless of whether the instruction is from the predetermined application program.

(2)

The storage unit may store identification information that is set for each of types of storage devices. The predetermined application program may include identification information that is set for a type of storage device which stores the application data usable in the predetermined application program. The first processing unit may determine whether the received instruction is from the predetermined application program based on the identification information read from the storage unit and identification information acquired from the application program that issued the instruction.

(3)

The storage unit may store identification information specifying at least one type of predetermined application program which can use the application data. The receiving unit may receive, from the application program, the identification information corresponding to the application program that issued the instruction. The first processing unit may determine whether the received instruction is from the predetermined application program based on the identification information stored on the storage unit and the identification information acquired from the application program that issued the instruction.

(4)

The storage unit may store application data encrypted by a method which allows the encrypted data to be decrypted by the first processing unit and shared data encrypted by a method which allows the encrypted data to be decrypted by the second processing unit.

(5)

The storage device may have an external appearance representing, three-dimensionally or two-dimensionally, an object which appears in a virtual space generated by executing the predetermined application program and which is represented by the application data and/or the shared data.

(6)

The storage unit may store, as the shared data, at least one type of data among identification information relating to the object, identification information relating to a group to which the object belongs, identification information specific to each of storage devices, and identification information representing the type of the storage device.

(7)

The information processing device may include a determination unit for, when near field communication is possible between the information processing device and a storage device, determining whether the storage device is a permitted storage device, an access to which by the information processing device is permitted. In the case where it is determined that the storage device with which the near field communication is possible for the information processing device is a permitted storage device, the receiving unit may execute a process conforming to the instruction from the application program to be executed by the information processing device.

(8)

The storage device may store at least a part of the shared data in a read-only area from which data can be read but to which data cannot be written, and may store the application data in a read/write area from which data can be read and to which data can be written.

(9)

The application data may be saved data of the predetermined application program.

(10)

Another example of information processing system described in this specification is an information processing system including a storage device; and an information processing device for performing near field communication with the storage device.

The storage device includes a storage unit storing shared data which relates to an object appearing in a predetermined application program and which is usable in an application program regardless of whether the application program is the predetermined application program.

The information processing device includes a first processing unit and a second processing unit. The first processing unit executes a first process of, for executing the predetermined application program, outputting information relating to the object to an output device using the shared data read from the storage unit. The second processing unit executes a second process of, for executing an application program different from the predetermined application program, outputting information relating to the object to the output device using the shared data read from the storage unit, the second process being different from the first process.

(11)

The information processing device may further include a determination unit and a permission unit. When near field communication is possible between the information processing device and a storage device, the determination unit determines whether the storage device is a permitted storage device, an access to which by an application program to be executed by the information processing device is permitted. Under the condition that the storage device with which the near field communication is possible for the information processing device is a permitted storage device, the permission unit permits the shared data to be used in the application program to be executed by the information processing device.

(12)

The first processing unit may execute a process of displaying the object on a display device as the first process. The second processing unit may execute, as the second process, a process of displaying the object on the display device, the process being different from the first process.

(13)

The second processing unit may execute, as the second process, a process of displaying the object in a different display state from the display state in which the object is displayed in the first process.

(14)

When executing a game application program different from the predetermined application program, the second processing unit may execute, as the second process, a process that does not influence progress of the game.

(15)

The storage device may have an external appearance representing, three-dimensionally or two-dimensionally, an object represented by the shared data.

(16)

The storage device may store a hash value relative to part or all of the data stored thereon. The determination unit may determine whether the storage device is a permitted storage device based on a hash value calculated from data read from the storage device and the hash value read from the storage device.

(17)

Still another example of information processing system described in this specification is an information processing system including a storage device; and an information processing device for performing near field communication with the storage device.

The storage device has an external appearance representing, three-dimensionally or two-dimensionally, an object that appears in a virtual space generated by executing a predetermined application program by the information processing device. The storage device stores first identification information relating to the object and second identification information relating to a group to which the object belongs.

The information processing device executes a predetermined process using the first identification information read from the storage device and executes the predetermined process using the second identification information read from the storage device.

(18)

The information processing device may include a first determination unit, a second determination unit, and a processing execution unit. The first determination unit determines, while executing an application program, whether the first identification information read from the storage device represents a value registered in the application program that is being executed. The second determination unit determines whether the second identification information read from the storage device represents a value registered in the application program that is being executed. In the case where at least one of the first identification information and the second identification information read from the storage device represents a value registered in the application program that is being executed, the processing execution unit executes the predetermined process in the application program.

(19)

The predetermined process may be a process on the object.

In the case where the first identification information read from the storage device represents a value registered in the application program that is being executed, the processing execution means may specify the object using the first identification information. In the case where the first identification information read from the storage device does not represent a value registered in the application program that is being executed and the second identification information read from the storage device represents a value registered in the application program that is being executed, the processing execution means may specify the object using the second identification information.

(20)

Still another example of information processing system described in this specification includes a storage medium and an information processing device for performing near field communication with the storage medium.

The storage medium includes a storage unit for storing shared data that is usable in an application program regardless of whether the application program is a predetermined application program.

The information processing device includes the following units:

a permission unit for permitting a predetermined process in the predetermined application program under the condition that registration data relating to a user and/or the information processing device is stored on the storage medium;

a determination unit for determining whether the registration data is stored on the storage medium; and a registration processing unit for, in the case where the registration data is determined as not being stored on the storage medium, executing a process for storing the registration data on the storage medium.

(21)

Still another example of information processing system described in this specification includes a storage medium and an information processing device for performing near field communication with the storage medium.

The storage medium includes a storage unit for storing registration data relating to a user and/or the information processing device.

The information processing device includes the following units:

a determination unit for executing, commonly in a plurality of application programs, a process for determining whether the registration data is stored on the storage medium; and a registration processing unit for, in the case where the registration data is determined by the determination unit as not being stored on the storage medium, executing a process for storing the registration data on the storage medium.

(22)

Still another example of information processing system described in this specification includes a storage medium and an information processing device for performing near field communication with the storage medium.

The storage medium includes a storage unit for storing registration data relating to a user and/or the information processing device.

The information processing device includes the following units:

a determination unit for determining whether the registration data is stored on the storage medium; and a registration processing unit for, in the case where the registration data is determined by the determination unit as not being stored on the storage medium at the time when the registration data is to be read from and/or written to the storage medium, executing a process for storing the registration data on the storage medium.

(23)

Still another example of information processing system described in this specification includes a storage medium and an information processing device for performing near field communication with the storage medium.

The information processing device includes the following units:

a usable/non-usable determination unit for, in the case where the storage medium is made accessible during execution of a predetermined application, determining whether use information, indicating whether application data that is stored, or is to be stored, on the storage medium is usable in the predetermined application, is stored on the storage medium;

a writing unit for, at least under the condition that the use information is determined as not being stored on the storage medium, writing, to the storage medium, use information indicating that the application data that is stored, or is to be stored, on the storage medium is usable in the predetermined application; and a permission unit for, under the condition that use information indicating that the application data is usable in a certain application is stored on the storage medium, permitting the certain application to use the application data stored on the storage medium.

(24)

The storage medium may store predetermined identification information.

The information processing device may further include the following units;

an acquisition unit for acquiring, from a predetermined application which is being executed, usability information representing identification information relating to a storage medium that is usable for storing application data in the predetermined application; and a usable/non-usable determination unit for determining whether the storage medium is usable in the predetermined application based on the identification information stored on the storage medium and the acquired usability information.

In the case where the result of the determination by the usable/non-usable determination unit is positive, under the condition that the use information is determined as not being stored on the storage medium, the writing unit may write, to the storage medium, use information indicating that the application data that is stored, or is to be stored, on the storage medium is usable in the predetermined application.

(25)

The usability information may represent type identification information identifying a type of the storage medium.

The information processing device may further include an acquisition unit for acquiring, as the usability information, a list of type identification information identifying a type of the storage medium usable in the predetermined application.

The usable/non-usable determination unit may determine whether the type identification information stored on the storage medium is included in the list of type identification information.

(26)

The information processing device may further include a deletion unit for, in the case where the use information is stored on the storage medium, deleting the use information from the storage medium in response to an operation by a user.

(27)

Still another example of information processing system described in this specification includes a storage medium and an information processing device for performing near field communication with the storage medium.

The storage medium includes a storage unit for storing application data usable in a predetermined application program.

The information processing device includes the following units:

a backup storage unit for storing backup data of data to be stored on the storage medium; and a data recovery unit for, in the case where data stored on the storage medium communicable with the information processing device is broken, even if the predetermined application program is not being executed by the information processing device, recovering the data stored on the storage medium using the backup data.

(28)

The information processing device may further include a writing unit for writing predetermined data to the storage medium.

The backup storage unit may store the predetermined data as the backup data before the predetermined data is written by the writing unit.

(29)

The information processing device may further include an identification information acquisition unit for acquiring identification information identifying the storage medium.

The backup storage unit may store the backup data in association with the identification information.

(30)

Still another example of information processing system described in this specification includes a storage medium and a first information processing device for performing near field communication with the storage medium.

The storage medium has an external appearance representing a predetermined object three-dimensionally or two-dimensionally.

The storage medium includes a storage unit for storing a piece of information, different from object information representing the predetermined object, in a state of being encrypted by a first method, and storing the object information in a state of being encrypted by a second method different from the first method.

The first information processing device executes a process of using the object information stored on the storage medium to cause a display device to display the object.

(31)

Still another example of information processing system described in this specification includes a storage medium and a first information processing device for performing near field communication with the storage medium.

The storage medium has an external appearance representing a predetermined object three-dimensionally or two-dimensionally.

The storage medium includes a storage unit for storing a piece of information, different from object information representing the predetermined object, in a state of being encrypted by a first method, and storing the object information in a non-encrypted state.

The first information processing device executes a process of using the object information stored on the storage medium to cause a display device to display the object.

(32)

The information processing system may further include a second information processing device different from the first information processing medium.

The first information processing device does not include a first decryption processing function of decrypting information encrypted by the first method.

The second information processing device includes a first decryption processing unit for decrypting information encrypted by the first method and a second decryption processing unit for decrypting information encrypted by the second method.

(33)

Still another example of information processing system described in this specification includes a storage medium and an information processing device for performing near field communication with the storage medium.

The information processing device includes the following units:

a determination unit for determining whether the storage medium, made accessible to the information processing device during execution of a predetermined application, stores registration data relating to a user and/or the information processing device; and a write processing unit for, in the case where the storage medium is determined as not storing the registration data, writing the registration data to the storage medium based on a registration content input by a user, and at the time when the registration data is written to the storage medium, writing information relating to the predetermined application to the storage medium regardless of whether there is an instruction of the user.

(34)

Still another example of information processing system described in this specification includes a storage medium and an information processing device for performing near field communication with the storage medium.

The storage medium stores identification information relating to a user regarding a network service accessible using the information processing device.

The information processing device is communicable with a server providing the network service.

When being permitted to communicate with the storage medium, the information processing device accesses the server using the identification information read from the storage medium, under a certain condition regardless of whether there is an instruction of the user.

(35)

The information processing system may include another information processing device for performing near field communication with the storage medium, the another information processing device being different from the information processing device.

The another information processing device includes a storage unit for storing the identification information.

The another information processing device communicates with the storage medium to cause the storage unit to store the identification information stored on the storage medium.

(36)

The another information processing device may access the server using the identification information stored on the storage unit.

This specification discloses an example of the information processing device or storage device included in the information processing system according to (1) through (36), and also disclose an example of non-transitory computer-readable storage medium storing an information processing program which causes a computer of the information processing device to function as each of units of the information processing device. This specification discloses an example of information processing method executable by the information processing system.

According to an information processing system, an information processing device, a storage medium storing an information processing program, an information processing method and a storage device described above, the storage device performing near field communication can be used in a more versatile manner.

These and other objects, features, aspects and advantages will become more apparent from the following detailed description when taken in conjunction with the accompanying drawings.

DETAILED DESCRIPTION OF NON-LIMITING EXAMPLE EMBODIMENTS

1. Structure of the Information System

Figure 1:
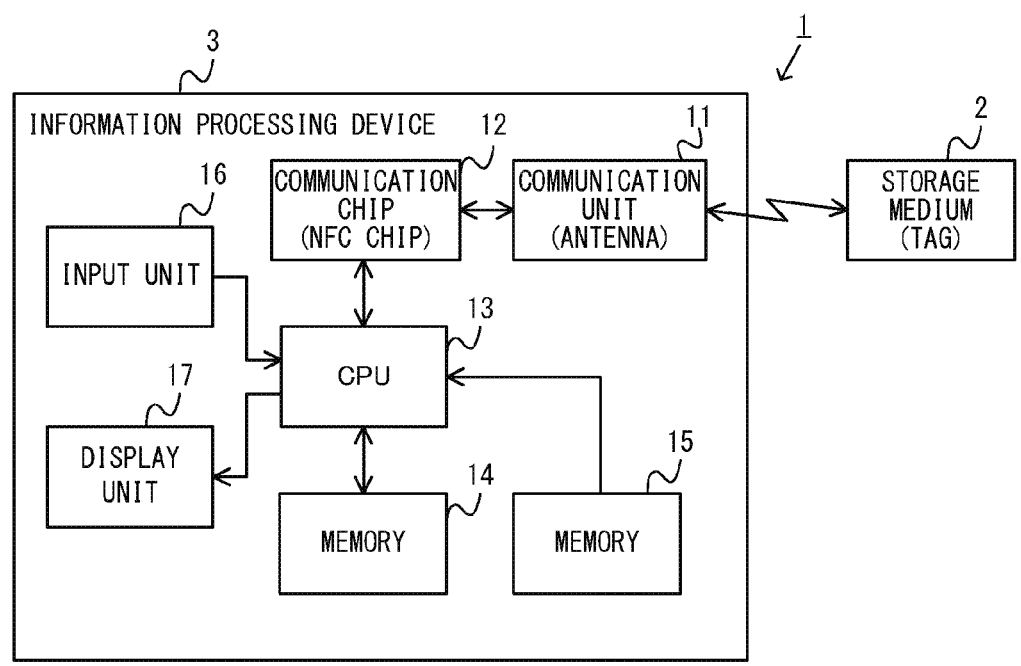
FIG. 1 shows a structure of an example of information processing system according to the example embodiment.

Hereinafter, an information processing system, an information processing device, a storage medium storing an information processing program, an information processing method, and a storage device according to an example of the example embodiment will be described. First, a structure of an information processing system will be described. FIG. 1 shows a structure of an example of information processing system in the example embodiment. As shown in FIG. 1, an information processing system 1 includes a storage device (tag) 2 and an information processing device 3. The information processing device 3 is an optional information processing device capable of performing near field communication with the tag 2.

In the example embodiment, a case in which communication based on the NFC standards is performed between the information processing device 3 and the tag 2 will be described as an example of near field communication. Herein, "near field communication" refers to a communication system by which radio waves (e.g., electromagnetic induction) from one device generates an electromotive force in the other device. The other device is operable by the generated electromagnetic force (the other device may or may not have a power source). In the near field communication, the information processing device 3 and the tag 2 become communicable with each other when approaching each other (typically, when the distance therebetween becomes several ten centimeters or shorter). In the near field communication, radio waves are kept transmitted while the communication between two communication devices are established (i.e., while one of the communication devices (tag) is close to the other communication device).

The information processing device 3 is an optional information processing device capable of performing near field communication. In the example embodiment, the information processing device 3 may be, for example, a mobile (also referred to as "portable") device such as a mobile game device, a mobile phone, a smart phone or the like; an installation type device such as a personal computer, a home-use game device or the like; or a large-scale device such as a commercial-use arcade game device or the like. For example, the information processing device 3 is a mobile device having an NFC reader/writer function.

The tag 2 is an optional device capable of performing near field communication with the information processing device 3. In the example embodiment, the tag 2 is a storage device having an NFC tag function. Namely, the tag 2 includes a circuit (IC chip) for performing near field communication and a storage unit (memory, etc.) storing data. The tag 2 is not limited to a device having only a function of storing data, and may be an information processing device (mobile device) having an NFC card emulation function.

Hereinafter, a structure of the information processing device 3 will be described. As shown in FIG. 1, the information processing device 3 includes a communication unit 11. The communication unit 11 is an antenna usable for near field communication. The information processing device 3 also includes a communication chip 12. The communication chip 12 generates a signal (radio wave) to be transmitted from the communication unit 11 in conformity to an instruction from a CPU 13 (described later). The generated signal is transmitted from the communication unit 11. The communication chip 12 is, for example, an NFC chip.

As shown in FIG. 1, the information processing device 3 includes the CPU 13 and a memory 14. The CPU 13 is an information processing unit for executing various types of information processes to be executed by the information processing device 3. The CPU 13 executes the above-described various types of information processes by use of the memory 14.

The information processing device 3 includes a program storage unit 15. The program storage unit 15 stores various programs (including a communication program and an application program described later) to be executed by the information processing device 3. The program storage device 15 is an optional storage device (storage medium) accessible by the CPU 13. The program storage unit 15 may be a storage unit built in the information processing device 3 such as, for example, a hard disc or a memory; a storage medium detachable from the information processing device 3 such as, for example, an optical disc or a cartridge; or both of such a storage unit and such a storage medium.

In the example embodiment, in the information processing device 3, at least two types of programs, namely, an application program and a communication program, are stored on the storage unit 15. The application program is a program for executing an optional application of performing data communication with the tag 2. The application program may be, for example, a game program of reading game data from the tag 2 and performing a game process by use of the game data. The communication program is a program for performing near field communication with the tag 2. The communication program may be, for example, firmware for causing the communication chip 12 to operate, and may be prepared in the information processing process 3 as a library in advance. As described later in detail, the communication program receives an instruction from the application and causes the communication chip 12 to perform an operation for communication. In the case where the information processing device 3 is capable of executing a plurality of application programs, the communication program is shared by the plurality of applications. Namely, the communication program (communication control unit 32 described later) can accept an instruction on communication from a plurality of applications.

The information processing device 3 also includes an input unit 16 for accepting an instruction from a user such as a button, a touch panel or the like. The information processing device 3 further includes a display unit 17 for displaying an image generated by an information process as described above.

The information processing device 3 may include a plurality of devices. For example, the information processing device 3 may include a device including the CPU 13 and the memory 14 and a device including the communication unit 11 and the communication chip 12, and the latter device may be detachably connected to the former device. The information processing device 3 may include a main body device including the CPU 13 and a separate device including the input unit 16 and/or the display unit 17. For example, in another embodiment, the information processing device 3 may include a main body device and a terminal device including the input unit 16 and the display unit 17. Alternatively, the information processing device may include a main body device and an operation device including the input unit 16. In this case, the communication unit 11 and the communication chip 12 may be included in the main body device or the terminal device. Still alternatively, the information processing device 3 may not include the display unit 17 and may use a TV as a display device.

In another embodiment, at least a part of the information process to be executed by the information processing device 3 may be executed in a distributed manner by a plurality of devices communicable with each other via a network (wide area network and/or local area network).

Figure 2:
FIG. 2 shows an example of external appearance of a tag.

FIG. 2 shows an example of external appearance of the tag 2. As shown in FIG. 2, the tag 2 in the example embodiment is a figure-type tag having an external appearance representing a character. The character represented by the tag 2 is a character appearing in a specific application (e.g., game) executable by the information processing device 3. A user can use the tag 2 to cause the character to appear in the specific application. Namely, when executing the program of the specific application, the information processing device 3 uses the data stored on the tag 2 to cause the above-described character to appear in a virtual space generated by the program of the specific application. The figure-type tag 2 represents an optional object appearing in the application. The figure-type tag 2 is not limited to representing a character, and may represent an item in the game application.

As described above, the tag 2 is used in a specific application program. As described later in detail, the tag 2 can store data usable only in a specific application program (dedicated data described later). Hereinafter, such a specific application program will be referred to as a "specific application program". There may be one type of specific application program or a plurality of types of specific application programs corresponding to one type of tag. In the case where, for example, a plurality of types of applications are provided for one series, the plurality of types of applications may be specific application programs.

As described later in detail, the tag 2 is usable in a specific application program and also is usable in another application program. Namely, the tag 2 stores data usable only in a specific application program and also store data usable in another application program. Hereinafter, an example of data stored on the tag 2 will be described.

Figure 3:
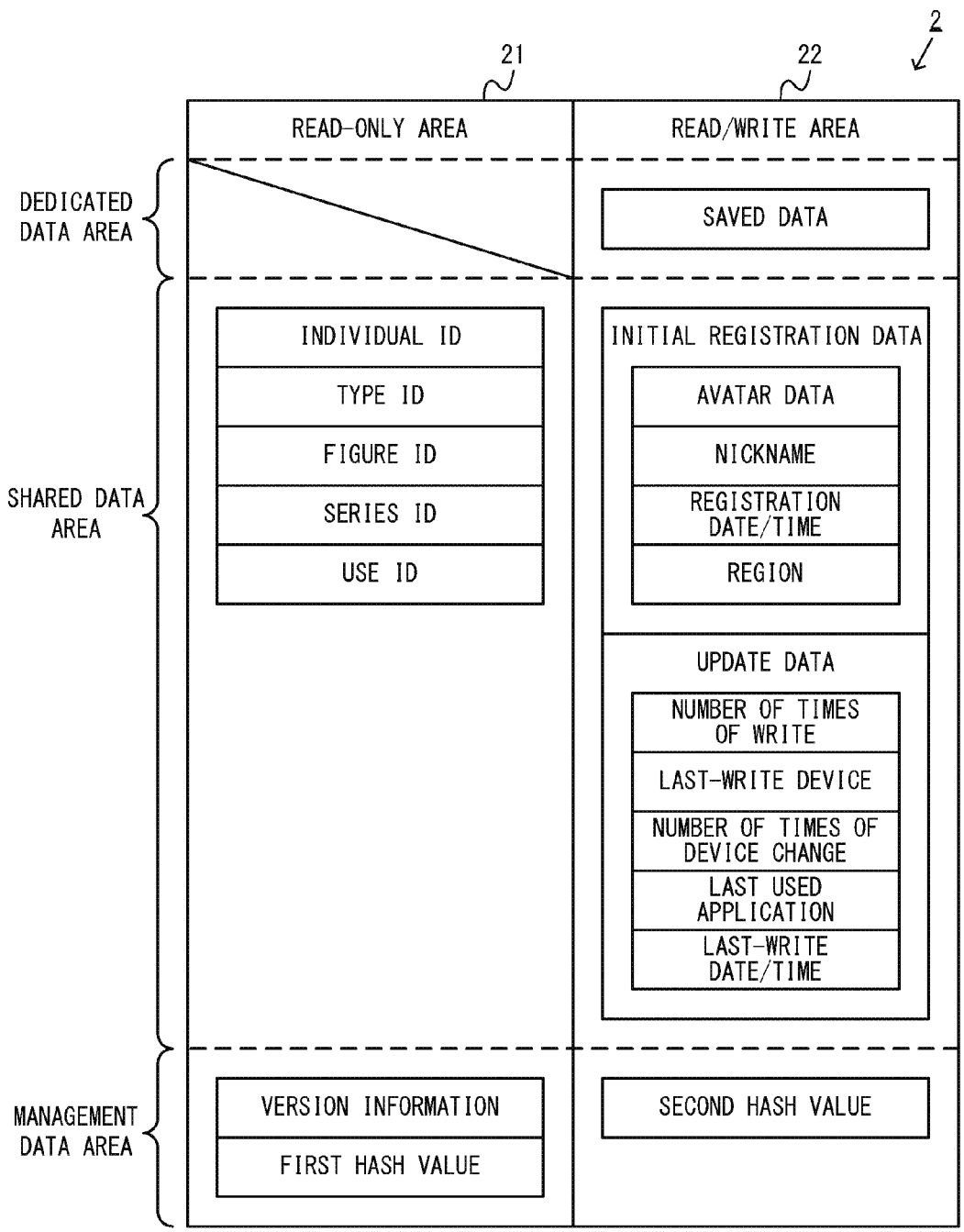
FIG. 3 shows an example of data stored on the tag.

FIG. 3 shows an example of data stored on the tag 2. In the example embodiment, as shown in FIG. 3, the tag 2 includes a read-only area 21 and a read/write area 22. The read-only area 21 is a storage area that only allows data stored thereon to be read. The read/write area 22 is a storage area that allows data stored thereon to be read and also allows data to be written thereto. Data is stored in the read-only area 21 during the production of the tag 2, and after that (after the tag 2 is shipped), data write to the read-only area 21 is prohibited. Namely, the information processing device 3 (application program to be executed by the information processing device 3) cannot write data to the read-only area 21. By contrast, the information processing device 3 (application program to be executed by the information processing device 3) can read and write from and to the read/write area 22. At the time of shipping of the tag 2, data may or may not be stored in the read/write area 22. In either case, when the tag 2 and the information processing device 3 communicate with each other, data is written to the read/write area 22 by the information processing device 3 and stored therein.

In the example embodiment, roughly three types of data, namely, dedicated data, shared data and management data, are stored on the tag 2. As shown in FIG. 3, in the example embodiment, storage areas in which respective types of data are stored (dedicated data area, shared data area and management data area) are predefined. In another embodiment, such storage areas may not be predefined.

The dedicated data is data usable only in a specific application program as described above. In the example embodiment, the dedicated data includes saved data of the specific application program (see FIG. 3). Data stored as saved data includes, for example, data representing a parameter on the character represented by the tag 2, data representing how the game of the specific application program is progressing, and/or data on a player of the game of the specific application program. In the example embodiment, the dedicated data is stored in the read/write area 22 and is not stored in the read-only area 21 (see FIG. 3).

Now, the shared data will be described. The shared data is data usable in a specific application program and also an application program that is not a specific application program. In the example embodiment, the shared data is stored in both of the read-only area 21 and the read/write area 22. The tag 2 may store the shared data in only either one of the read-only area 21 and the read/write area 22.

In the read-only area 21, at least the following data (information) is stored as the shared data.
Individual ID (data representing the individual ID)
Type ID (data representing the type ID)
Figure ID (data representing the figure ID)
Series ID (data representing the series ID)
Use ID (data representing the use ID)

The individual ID is identification information specific to the tag. An NFC tag such as the tag 2 in the example embodiment stores identification information specific to the tag that is called a UID (Unique ID). The individual ID is different from the UID. The individual ID is an ID that is different from the UID and is assigned so that a provider of a service using the tag can manage the tag easily.

The figure ID is identification information specific to the external appearance (shape, color) of the figure-type tag 2. The figure ID is identification information that allows the type of the figure of the tag 2 to be uniquely specified. In the case where, for example, there are a plurality of tags having different external appearances (e.g., different poses or clothes) for one character, each tag is assigned a figure ID of a different value. In this case, the figure ID may include an ID specific to the character (character ID) and also an ID representing a pose, clothes or the like (numbering ID) of the corresponding tag. In the case where there are a plurality of types for one character (e.g., in the case where one character is transformed into one of a plurality of forms by acquiring an item), the figure ID (character ID) may include an ID representing the plurality of types of the character as one group and an ID that is different by type).

An application program executable by the information processing device 3 includes a figure ID of a tag to be used (usable) by the application program itself. As described later in detail, in the case where the value of the figure ID included in the application program matches the value of the figure ID stored on the tag, the application program can use the dedicated data stored on the tag. Namely, the figure ID can be considered as identification information for managing the use of the dedicated data stored on the tag 2.

The series ID is identification information specific to a group to which the object (character) represented by the tag 2 belongs. In the case where, for example, the character represented by the tag 2 appears in a plurality of types of applications (e.g., a series of game applications), the plurality of types of applications may be set as one group, and a series ID representing the group may be set.

The type ID is identification information that represents the type of the tag 2. In the example embodiment, the information processing device 3 can use a card-type tag as well as a figure-type tag such as the tag 2. The tag ID is identification information that represents whether the tag is a figure-type tag or a card-type tag. In another embodiment, the type of tag identified by the type ID is optional. For example, each of tag providers may be assigned a different type ID.

The use ID is identification information that specifies an application program that can use the dedicated data (described later in detail) stored on the tag 2 (i.e., specifies the above-described specific application program). Herein, an application program executable by the information processing device 3 is assigned a use ID. In the example embodiment, the figure ID is used to manage the use of the dedicated data stored on the tag 2 (see a specific application/non-specific application determination process described later). In another embodiment, a use ID may be used to manage the use of the dedicated data stored on the tag 2.

As shown in FIG. 3, in the read/write data 22, initial registration data and update data are stored as the shared data. The content of the shared data stored on the tag 2 is optional. For example, in another embodiment, the tag 2 may store only either one of the initial registration data and the update data as the shared data.

The initial registration data is data registered by the user at the start of the use of the tag 2 by the information processing device 3. The initial registration data is typically stored on the tag 2 at the timing when the tag 2 is first used, but may be stored on the tag 2 at an optional timing. Namely, the user 2 may register the tag 2 at an optional timing.

In the example embodiment, the initial registration data includes the following data.
Avatar data
Nickname (data representing the nickname)
Registration date/time (data representing the registration date/time)
Region (data representing the region)

The avatar data is data on an avatar of the user. The avatar data includes data usable by the information processing device 3 to generate an avatar and display the avatar on the display unit 17. Specifically, the avatar data includes data representing each of sites of the avatar (shapes of the eye, nose and the like, body shape, etc.). In the example embodiment, the information processing device 3 stores a program for generating an avatar by use of the avatar data. In the example embodiment, the program for generating an avatar is stored in advance as a system program or a library of the information processing device 3. The avatar can be displayed in each of the application programs (by use of the avatar generation program).

In the example embodiment, the information processing device 3 stores, in advance, a plurality of types of parts data (image data or three-dimensional model data) on each site of the avatar (the avatar generation program may include the parts data). Each type of parts data is assigned a number, and the avatar data represents the number assigned to the parts data on each of the sites that form the avatar. The information processing device 3 can execute the avatar generation program to generate an avatar by use of the parts data of the number represented by the avatar data. By contrast, an image of the character represented by the tag 2 is generated by the information processing device 3 by use of, for example, data on the character included in the application program (see step S46 described later). As can be seen, in the example embodiment, an image of the avatar stored on the tag 2 and an image of the character represented by the tag 2 are generated by different methods (processes).

The nickname is a nickname given to the tag 2 by the user. In the case where, for example, one user possesses two or more tags having the same external appearance, the user can give different nicknames to the tags so as to distinguish the tags.

As described later in detail, at the time when an initial registration process is executed on the tag (see FIG. 7 and FIG. 8 described later), the information processing device 3 causes the user to input the avatar data and the nickname. The input data and data on the registration date/time and on the region (described later) are stored on the tag 2 as the initial registration data.

The registration date/time is the date/time when the initial registration is performed. The region is the region where the initial registration is performed. As described later in detail, in the example embodiment, the data on the registration date/time and on the region is automatically written to the tag 2 by the information processing device 3 in the initial registration process.

Now, information included in the update data will be described. The update data is data that is updated when the tag 2 and the information processing device 3 communicate with each other (under a certain condition). In the example embodiment, the update data includes the following data.

Number of times of write (data representing the number of times of write)

Last-write device (data representing the last-write device)

Number of times of device change (data representing the number of times of device change)

Last-used application (data representing the last-used application)

Last-write date/time (data representing the last-write date/time)

As described later in detail, in the example embodiment, the update data stored on the tag 2 is updated (overwritten) at the timing when the dedicated data is written.

The number of times of write is the number of times the dedicated data has been written on the tag 2.

The last-write device is the information processing device that wrote the dedicated data to the tag 2 most recently. In the example embodiment, each of a plurality of information processing devices is assigned identification information specific thereto. Data on a hash value on the identification information on the information processing device that wrote data most recently is stored as the data on the last-write device (alternatively, data on the identification information itself on the information processing device that wrote data most recently may be stored).

The number of times of device change is the number of times the information processing device that wrote the dedicated data was changed. As described later in detail, in the case where, for example, an information processing device possessed by the user writes data to the tag 2 and then an information processing device different from the information processing device possessed by the user (e.g., an information processing device installed in a store the user visits or an information processing device possessed by a friend of the user) writes data to the tag 2, the number of times of device change is updated.

The last-used application is the application program that wrote the dedicated data to the tag 2 most recently. In the example embodiment, the data stored as the data on the last-used application is the identification information specific to the application program (may be data on the use ID described above).

The last-write date/time is the date/time when the dedicated data was written to the tag 2 most recently.

Now, the management data will be described. The management data is data used for management of the tag, and is used in, for example, an access permission/non-permission determination process or the like. Basically, the management data is not used in an application.

As shown in FIG. 3, the tag 2 stores data on version information in the read-only area 21 as the management data. The version information represents a version of a data format (storage format) of the tag 2. In the example embodiment, the data storage format of the data on the tag 2 varies on a version-by-version basis and that the same version has the same data storage format. Specifically, in the example embodiment, which data is stored at which address of the tag 2 is defined on a version-by-version basis (it should be noted that the address at which the data on the version information is stored is the same among different versions). Therefore, the information processing device 3 can specify the address at which each piece of data is stored by referring to the version information. For example, a data size of each piece of data (size of a storage area of each piece of data) may be defined by the version information, so that an address can be specified based on the version information.

The tag 2 stores a first hash value and a second hash value as the management data (see FIG. 3). The first hash value corresponds to the data in the read-only area 21. The second hash value corresponds to the data in the read/write area 22. The hash values are obtained by applying a predetermined algorithm (hash function) to the corresponding data. The contents of the data in the read-only area 21 are not changed, and the first hash value is not changed. Therefore, in the example embodiment, the data on the first hash value is stored in the read-only area 21. When the contents of the data in the read/write area 22 are changed, the second hash value is changed. Therefore, the data on the second hash value is stored in the read/write area 22.

In the example embodiment, the dedicated data and the shared data, among the data shown in FIG. 3, are encrypted by a method which allows the encrypted data to be decrypted by the information processing device 3 (in the example embodiment, the communication control unit 32 described later). The dedicated data and the shared data may be encrypted by the same method or different methods. Because of the encryption, even if the data is read from the tag 2 by a device that does not have a decryption function of the above-described method, such a device cannot decipher the contents of the data. This can improve the security of the data stored on the tag 2. In another embodiment, the management data may also be encrypted, or at least one of the three types of data does not need to be encrypted.

2. Processing Operations of the Information Processing System

Figure 4:
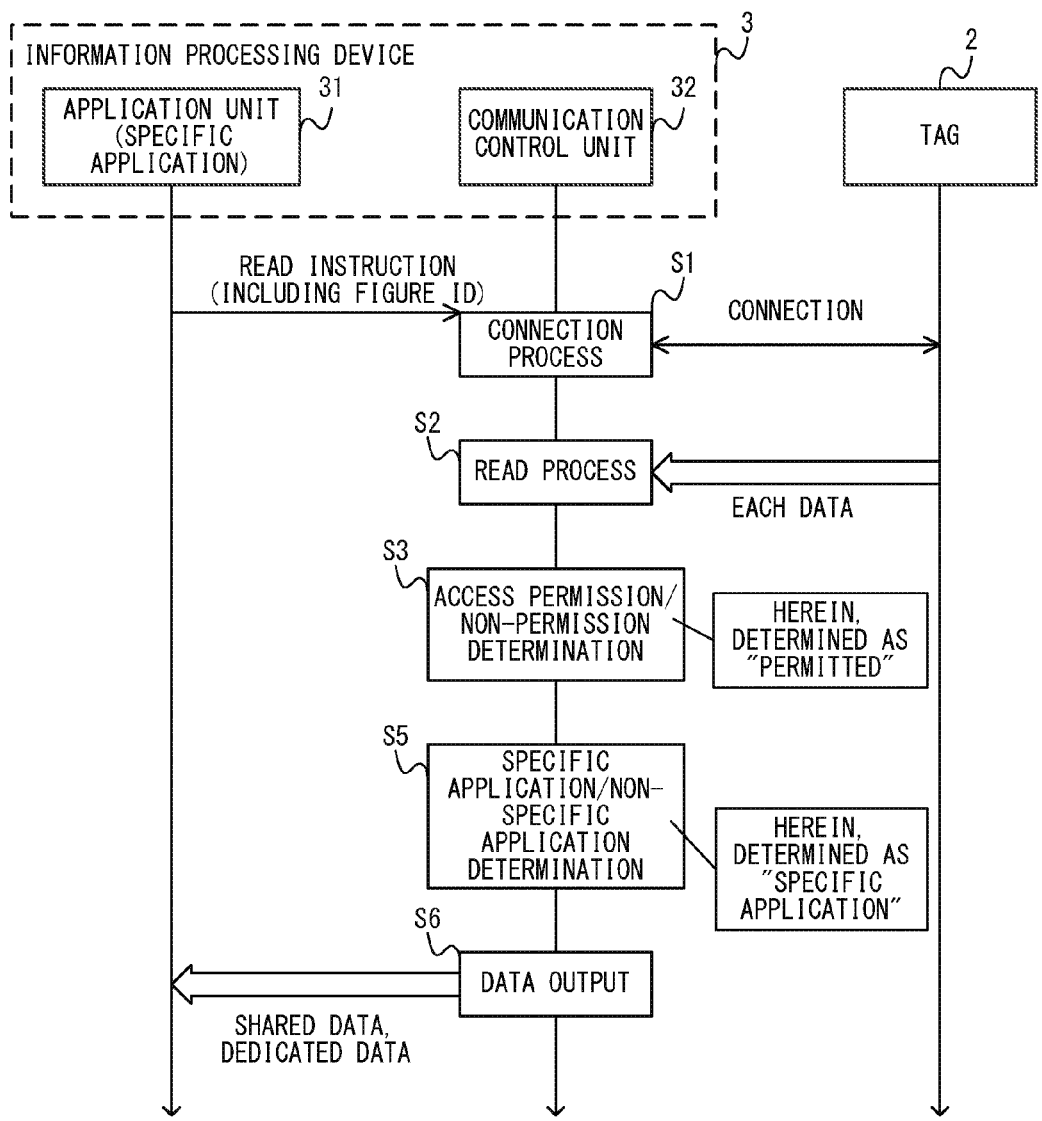
FIG. 4 shows an example of flow of a process, executed by the information processing system, of reading data from the tag by a specific application program.

Now, with reference to FIG. 4 through FIG. 12, processing operations of the information processing system 1 regarding data read and write from and to the tag 2 will be described. As shown in FIG. 4 and the like, in the example embodiment, the operations of the information processing device 3 will be described as being divided by function into the operations of an application unit 31 and operations of the communication control unit 32. In the example embodiment, the application unit 31 is the CPU 13 for executing an application program as described above. The communication control unit 32 is realized by the CPU 13 for executing a communication program as described above, the communication chip 12 and the communication unit 11. In another embodiment, the information process performed by the information processing device 3 does not need to be realized by two types of programs, namely, the application program and the communication program, and may be realized by a single program.

2-1: Operation of Reading Data

Figure 5:
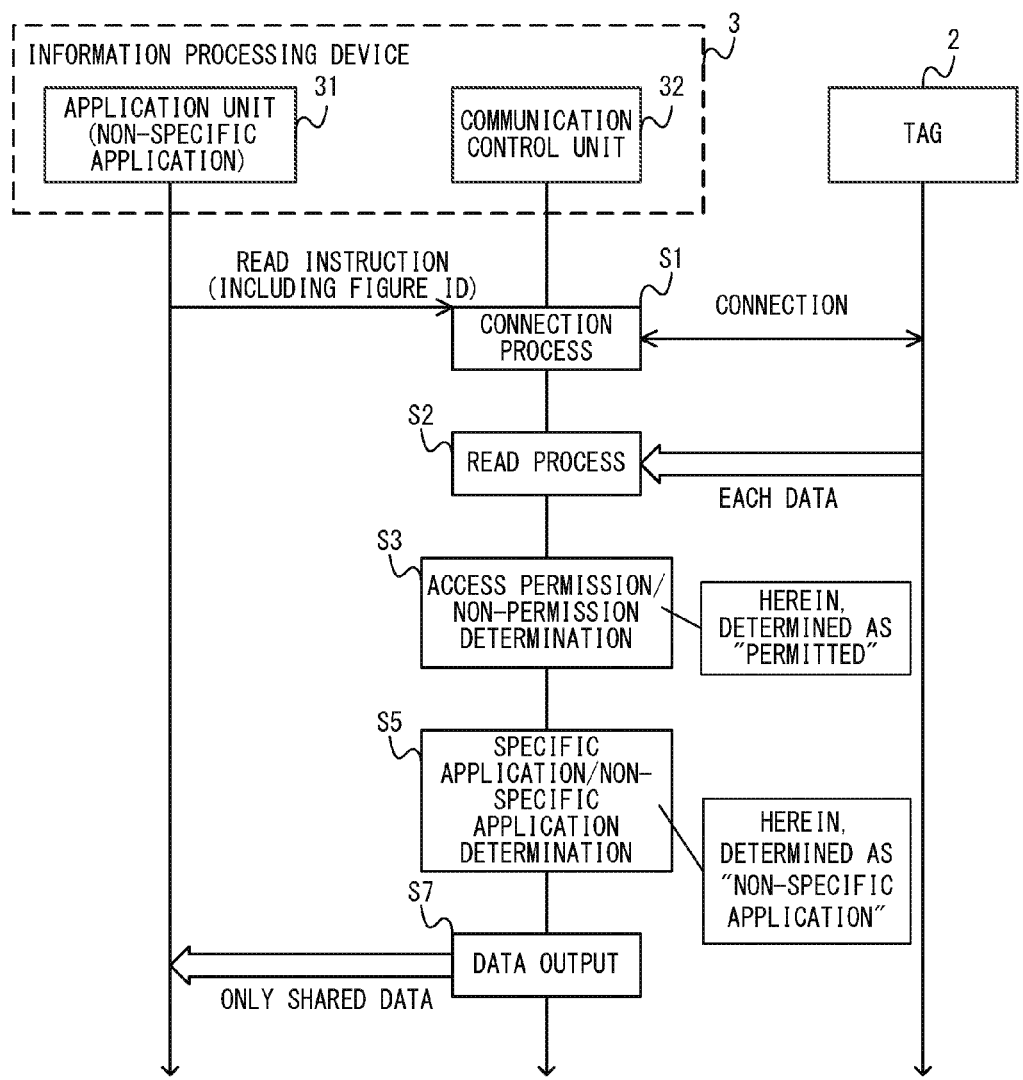
FIG. 5 shows an example of flow of a process executed by the information processing system for reading data from the tag by the specific application program.

Hereinafter, with reference to FIG. 4 through FIG. 6, an operation of reading data from the tag 2 will be described. FIG. 4 and FIG. 5 each show an example of flow of a process executed by the information processing system 1 for reading data from the tag 2 by a specific application program. FIG. 4 shows a flow in the case where a specific application program is executed by the information processing device 3, namely, in the case where the application unit 31 is realized by the CPU 13 that executes the specific application program. FIG. 5 shows a flow in the case where another application program that is not the specific application program is executed by the information processing device 3, namely, in the case where the application unit 31 is realized by the CPU 13 that executes the another application program.

Figure 6:
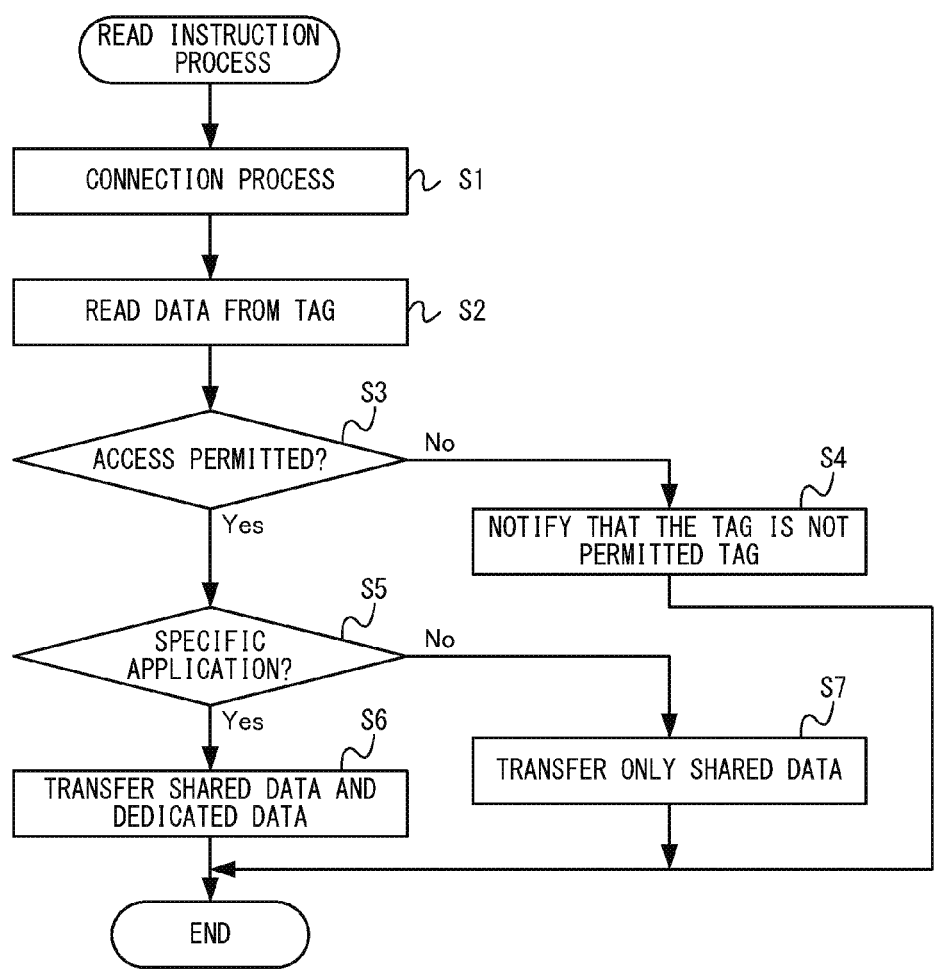
FIG. 6 is a flowchart showing an example of flow executed by a communication control unit when a read instruction is received (read instruction process)

FIG. 6 is a flowchart showing an example of flow of a process executed by the communication control unit 32 that has accepted a read instruction (i.e., showing a read instruction process). The process in each of steps in the flowchart shown in FIG. 6 (also the flowcharts in FIG. 8, FIG. 10 and FIG. 12 described later) is merely exemplary. As long as substantially the same results are obtained, the order of the processes of the steps may be changed, or another process may be executed in addition to (or instead of) the process of each step. In the example embodiment, the process of each step in the flowcharts will be described as being executed by the CPU 13. Alternatively, the process of a part of the steps in the flowcharts may be executed by a processor other than the CPU 13 or by a dedicated circuit.

First, the application unit 31 transmits a read instruction, which is to read data from the tag 2, to the communication control unit 32 (see FIG. 4 and FIG. 5). In the example embodiment, the read instruction includes the figure ID. As described above, the specific application program includes information on the figure ID of the tag storing the dedicated data usable in the specific application program itself. Therefore, the application unit 31 transmits the figure ID included in the specific application program together with the read instruction to the communication control unit 32.

The application program 31 transmits all the figure IDs included in the specific application program. In the case where the type of the tag can be specified, the application program 31 may transmit, to the communication control unit 32, only the figure ID of the tag among one or more figure IDs included in the specific application program. For example, in the case where in a game situation of using a tag representing a character operated by a player, data on the tag is to be read, the tag 2 connected to the information processing device 3 can be specified as the tag representing the character. Therefore, in this case, the application unit 31 may transmit only the figure ID of the tag 2 representing the character to the communication control unit 32.

In another embodiment, the application unit 31 may transmit the figure ID to the communication control unit 32 at a different timing from the timing when the read instruction is transmitted (this is applicable to other instructions including a write instruction). For example, in another embodiment, the communication control unit 32 may request the application unit 31 to transmit the figure ID in a specific application/non-specific application determination process described later, and the application unit 31 may transmit the figure ID to the communication control unit 32 in response to the request.

Upon acceptance of the read instruction, the communication control unit 32 starts execution of a series of processes of steps S1 through S7 shown in FIG. 4 through FIG. 6 (read instruction process). First, in step S1, the communication control unit 32 executes a connection process in order to start communication with the tag 2. The specific content of the connection process is optional. For example, the communication control unit 32 executes a process of detecting the tag 2 present in the vicinity of the communication unit 11 (e.g., polling process) and a process of establishing communication with the detected tag 2 (e.g., process of acquiring information to be used for data communication from the tag 2). Although not shown, in the case where the tag 2 is distanced from the information processing device 3 and it is made impossible to perform near field communication during the read instruction process (also in a registration instruction process or the write instruction process described later), the communication control unit 32 terminates the read instruction process and discontinues data transfer with the application unit 31.

In step S2, the communication control unit 32 executes a data read process. Specifically, the communication control unit 32 first reads the management data from the tag 2. Based on the version information included in the read management data, the communication control unit 32 specifies the address of each piece of data (data included in the dedicated data and the shared data) in the tag 2. The method for specifying the address based on the version information may be optional. For example, the version information itself may include information that represents the correspondence between each piece of data and the address. Alternatively, the communication control unit 32 may store a table associating the correspondence and the version information in advance, so that the communication control unit 32 can specify the correspondence by use of the version information read from the tag 2 and the table.

Once the address of each piece of data included in the dedicated data and the shared data is specified, the communication control unit 32 reads the shared data and the dedicated data from the tag 2. The communication control unit 32 decrypts and stores the read data on the memory 14. In this manner, in the example embodiment, the communication control unit 32 reads the shared data and the dedicated data from the tag 2 regardless of the content of the read instruction from the application unit 31 (which of the data stored on the tag 2 is to be read) and the type of the application program (whether or not the application program is the specific application program).

In step S3, the communication control unit 32 executes the access permission/non-permission determination process. The access permission/non-permission determination process is a process of determining whether or not an access by the application program to be executed by the information processing device 3 to the tag with which the communication has been established is permissible. In other words, the access permission/non-permission determination process is a process of determining whether or not the tag with which the communication has been established is a permitted tag. The "permitted tag" refers to a tag, an access to which by the application program to be executed by the information processing device 3 is permitted. The permitted tag is, for example, a tag permitted by a provider of the information processing device 3 (and/or of the application program executable by the information processing device 3). Namely, in the example embodiment, the application program on the information processing device 3 can access only the tag permitted by the provider, and cannot read/write data from/to an NFC tag that is not permitted by the provider.

In the example embodiment, the determination in the access permission/non-permission determination process is made by use of the hash values on the data stored on the tag 2 (first hash value and second hash value). Specifically, the communication control unit 32 calculates a hash value (first hash value) on the data that has been read in step S2 from the read-only area 21 by use of the predetermined algorithm. The communication control unit 32 determines whether or not the calculated hash value matches the first hash value read in step S2. In the case where these two hash values match each other, the communication control unit 32 makes a similar determination on the data that has been read from the read/write area 22 and the second hash value. Namely, the communication control unit 32 calculates a hash value (second hash value) on the data that has been read in step S2 from the read/write area 22 by use of the predetermined algorithm, and determines whether or not the calculated hash value matches the second hash value read in step S2.

In the case where the calculated hash value matches the read second hash value, the communication control unit 32 determines that the tag 2 is a permitted tag. In this case, the communication control unit 32 executes a process of step S5. By contrast, in the case where the hash values do not match each other in one of the determinations, the communication control unit 32 determines that the tag 2 is not a permitted tag. In this case, the communication control unit 32 executes a process of step S4.

As described above, in the example embodiment, the tag 2 stores the hash values (first hash value and second hash value) on a part of, or the entirety of, the data stored thereon. The communication control unit 32 determines whether or not the tag 2 is a permitted tag based on the hash value calculated based on the data read from the tag 2 and the hash value read from the tag 2. The hash values are stored on the tag 2 as described above, so that the determination on whether or not the tag 2 is a permitted tag can be made easily.

In another embodiment, the determination in the access permission/non-permission determination process may be made by another method. For example, the communication control unit 32 may store, in advance, predetermined information stored on the tag 2 (also on the side of the information processing device 3) and make the determination based on whether or not the information read from the tag matches the information stored in advance. The predetermined information usable for the determination may be, for example, the following information. Information that is stored on an NFC tag and represents the type of the tag defined by the NFC standards (Type 1, Type 2, etc.)

Information (exclusive code) that represents that the tag 2 is a tag permitted by the provider of the information processing device 3 (and/or of the application program executable by the information processing device 3)

Version information as described above

Alternatively, for example, the determination in the access permission/non-permission determination process may be made based on whether or not the data stored in the read-only area 21 is adapted to the setting specified by the version information. Still alternatively, for example, the determination in the access permission/non-permission determination process may be made based on whether or not the size of the predetermined data read by the communication control unit 32 (e.g., data stored in the read-only area 21) is within a predetermined range.

In step S4, the communication control unit 32 notifies the application unit 31 that the tag 2 is not a permitted tag. Upon receipt of this notification, the application unit 31 may perform an optional process. For example, the application unit 31 notifies the user that the tag 2 is not a permitted tag and therefore data cannot be read. After the process of step S4, the communication control unit 32 terminates the read instruction process shown in FIG. 6.

In step S5, the communication control unit 32 executes a specific application/non-specific application determination process. The specific application/non-specific application determination process is a process of determining whether or not the application program that issued the instruction to the communication control unit 32 (herein, the read instruction) is a specific application program.

The determination in the specific application/non-specific application determination process is made by use of the figure ID. Namely, the communication control unit 32 compares the figure ID acquired from the application unit 31 together with the instruction (in the case where there a plurality of figure IDs, one of the figure IDs) against the figure ID read from the tag 2 in step S2. In the case where the figure IDs match each other, the communication control unit 32 determines that the application program that issued the instruction is a specific application program. In this case, the communication control unit 32 executes a process of step S6. By contrast, in the case where the figure IDs do not match each other, the communication control unit 32 determines that the application program that issued the instruction is a non-specific application program (application program that is not a specific application program). In this case, the communication control unit 32 executes a process of step S7.

In step S6, the communication control unit 32 transfers (outputs) the dedicated data and the shared data to the application unit 31 (see FIG. 4). Namely, in the case where the application program that issued the instruction is a specific application program, the communication control unit 32 permits the application unit 31 to receive the dedicated data. After the process of step S6 is finished, the communication control unit 32 terminates the read instruction process shown in FIG. 6.

Upon receipt of the dedicated data and the shared data from the communication control unit 32, the application unit 31 executes an information process by use of the received data. The content of the information process is optional. For example, the application unit 31 executes a game process by use of the saved data, which is the dedicated data. In the example embodiment, the specific application program uses the saved data, which is the dedicated data. Alternatively, the specific application program may use the shared data in addition to (or instead of) the dedicated data.

In step S7, the communication control unit 32 transfers (outputs) the shared data to the application unit 31 (see FIG. 5). Namely, in the case where the application program that issued the instruction is a non-specific application program, the communication control unit 32 restricts (prohibits) the application unit 31 from receiving the dedicated data. After the process of step S7 is finished, the communication control unit 32 terminates the read instruction process shown in FIG. 6.

Upon receipt of the shared data from the communication control unit 32, the application unit 31 executes an information process by use of the received data. The content of the information process is optional. For example, the application unit 31 may execute the following processes.

Figure 12:
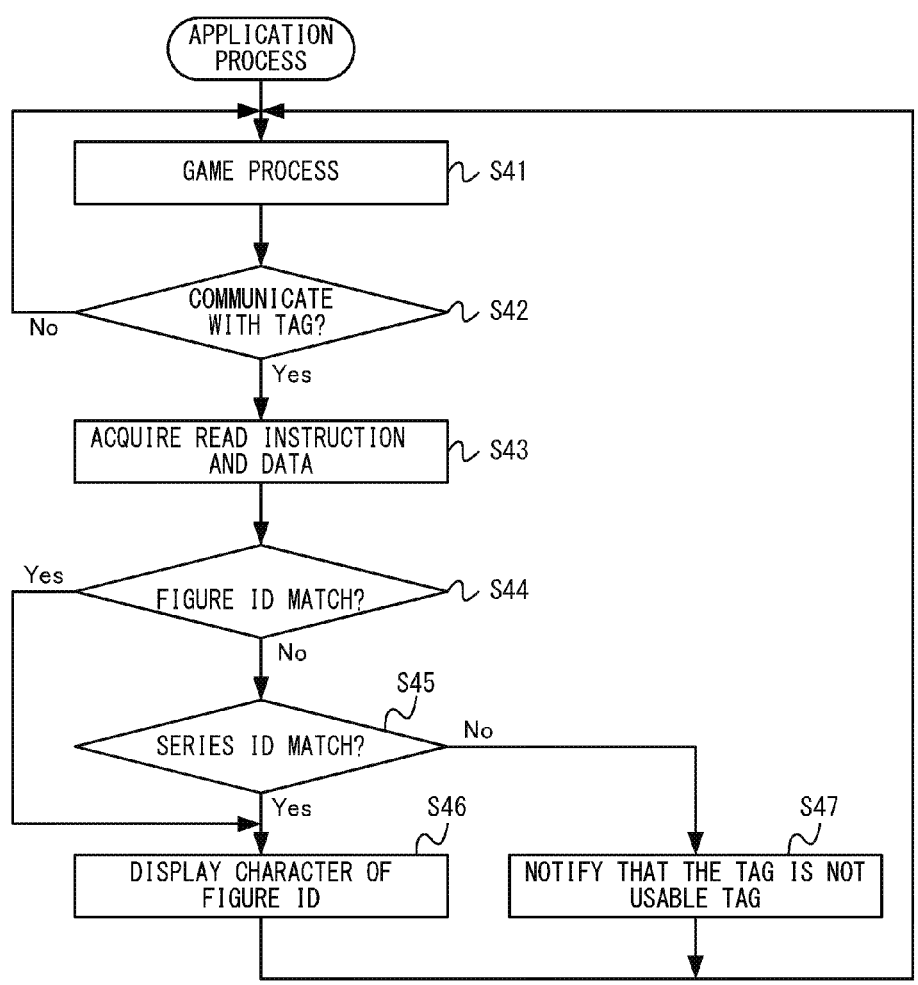
FIG. 12 is a flowchart showing an example of flow of a process executed by a CPU by an application program.

Process of using the figure ID to display a character represented by the figure ID (see FIG. 12)

Process of using the avatar data to display an avatar of the user (e.g., process of executing a game using the avatar as a player character)

Process of storing the nickname on the information processing device 3 and displaying the nickname at an appropriate timing Process in accordance with the content of the update data (e.g., process of providing a benefit for the game in the case where the number of times of write is equal to or greater than a predetermined number of times; process of displaying the message "long time no see" in the case where the last-write date/time is before a predetermined time; etc.)

In the example embodiment, in the data output process of step S6 or S7, the communication control unit 32 outputs all of the shared data (and the dedicated data) stored on the tag 2 to the application unit 31. In another embodiment, the application unit 31 may specify, in the read instruction, the data to be acquired, and output the data specified in the read instruction to the application unit 31 in the process of S6 of S7. In the case where the data specified in the read instruction is the dedicated data and it is determined in step S4 that the application program that issued the read instruction is a non-specific application program, the communication control unit 32 may notify the application unit 31 in step S7 that the data output (read) is restricted.

2-2: Operation for Initial Registration

Figure 7:
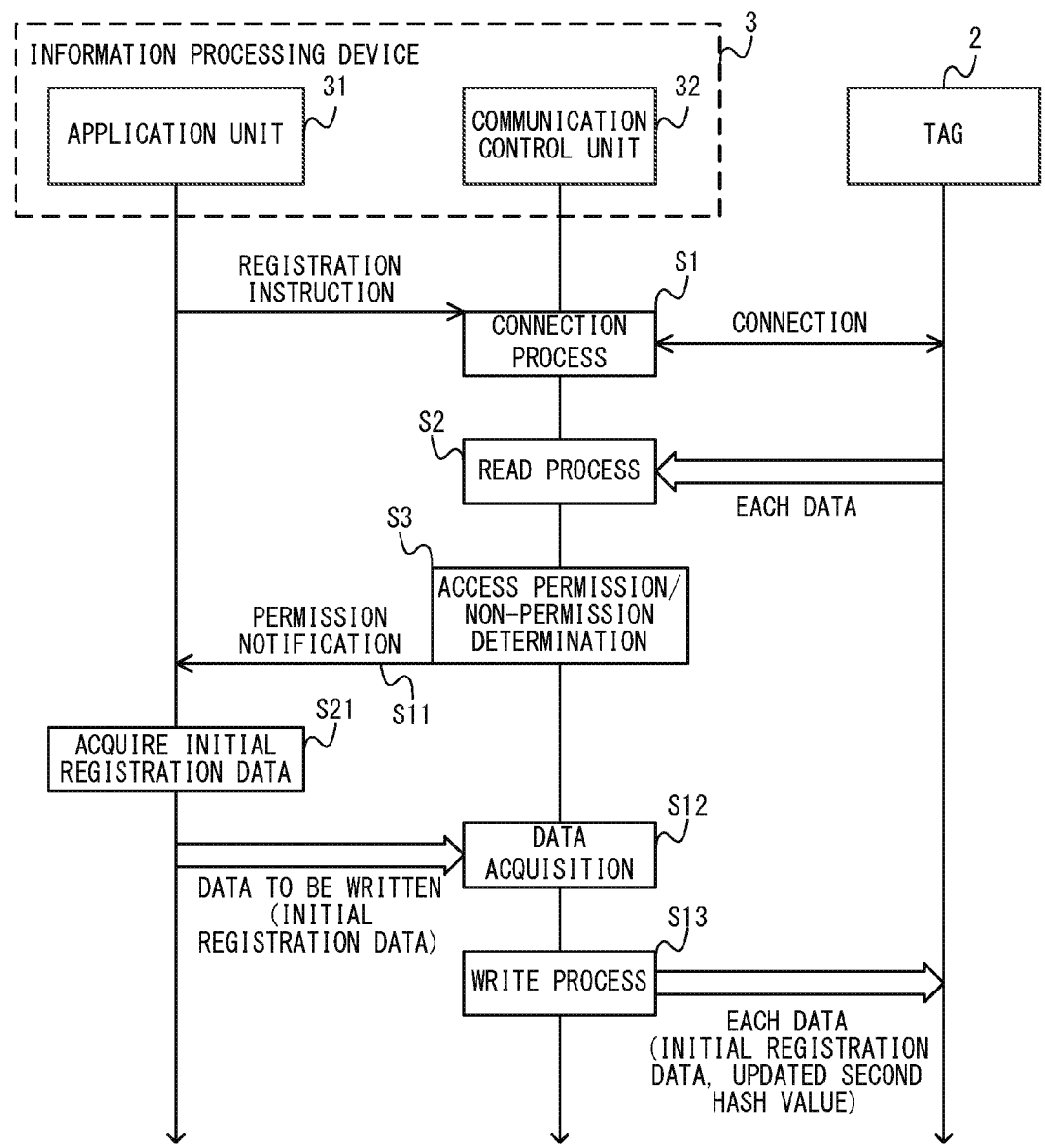
FIG. 7 shows an example of flow of a process executed by the information processing system for writing initial registration data to the tag.
Figure 8:
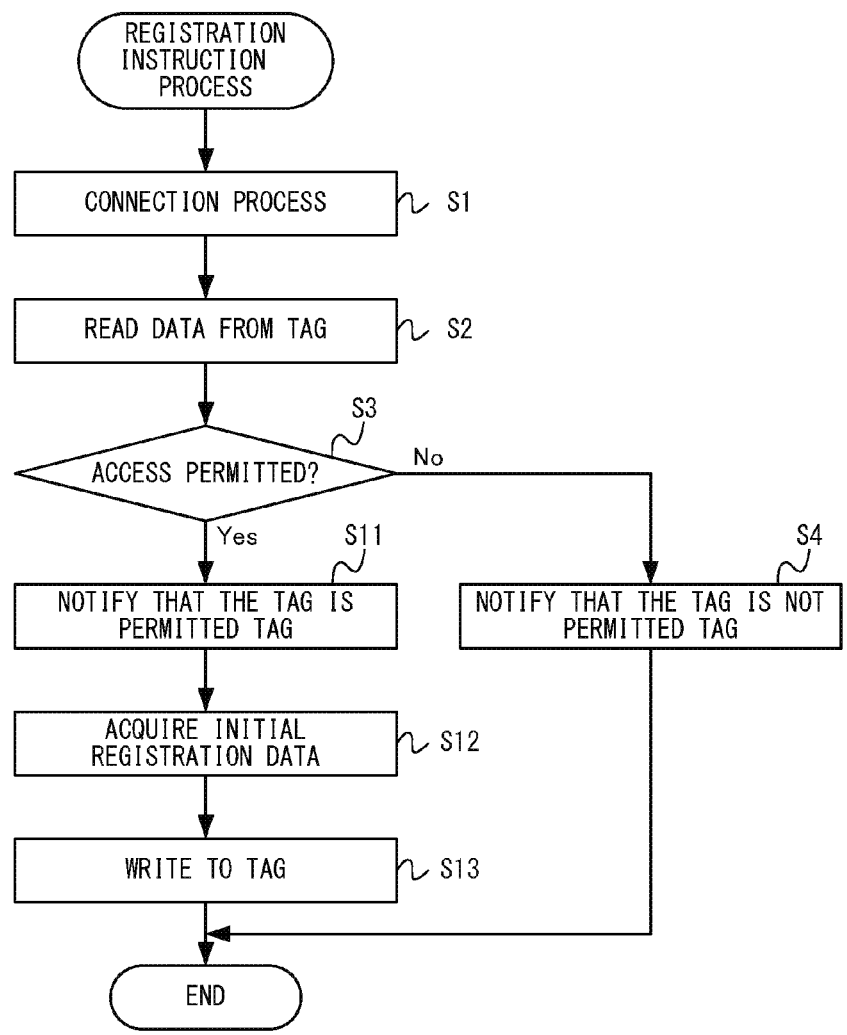
FIG. 8 is a flowchart showing an example of flow executed by the communication control unit when a registration instruction is received (registration instruction process)

Now, with reference to FIG. 7 and FIG. 8, an operation of writing the initial registration data to the tag 2 will be described. FIG. 7 shows an example of flow of a process executed by the information processing system 1 for writing the initial registration data to the tag 2. FIG. 8 is a flowchart showing an example of flow of a process executed by the communication control unit 32 that has accepted a registration instruction (i.e., showing a registration instruction process).

First, the application unit 31 outputs a registration instruction to the communication control unit 32, and the communication control unit 32 accepts the registration instruction. The registration instruction is an instruction to write the initial registration data to the tag 2. In the example embodiment, the application unit 31 issuing the registration instruction is realized by a system application program (OS program) in the information processing device 3. Namely, the initial registration data is written by the system application program (as a function of the information processing device 3). For example, an instruction to make an initial registration to the tag 2 is issued by the user while the system application program is executed (e.g., while a menu screen is displayed). In response to this instruction being accepted, the application unit 31 outputs the registration instruction.

In the example embodiment, only the system application can write the shared data. In another embodiment, another application (specific application and/or non-specific application) can write the shared data.

Upon acceptance of the registration instruction, the communication control unit 32 starts execution of a series of processes of steps S1 through S3 and steps S11 through S13 shown in FIG. 7 and FIG. 8 (registration instruction process). The processes in steps S1 through S3 shown in FIG. 8 are the same as those shown in FIG. 6.

In the registration instruction process, in the case where the determination result in step S3 is positive (in the case where the tag 2 is a permitted tag), a process of step S11 is executed.

By contrast, in the case where the determination result in step S3 is negative (in the case where the tag 2 is not a permitted tag), a process of step S4 shown in FIG. 6 is executed.

In the registration instruction process, upon receipt of the notification that the tag 2 is not a permitted tag as a result of the process of FIG. 4, the application unit 31, for example, notifies the user that the tag 2 is not a permitted tag and therefore data cannot be registered. After the process of step S4, the communication control unit 32 terminates the registration instruction process shown in FIG. 8

By contrast, in step S11, the communication control unit 32 outputs a notification that the tag 2 is a permitted tag (permission notification) to the application unit 31. FIG. 7 shows a process executed in the case where the permission notification is output to the application unit 31.

Upon receipt of the permission notification, the application unit 31 acquires the initial registration data to be written to the tag 2 (step S21 shown in FIG. 7). In the example embodiment, the application unit 31 accepts the avatar data and data on the nickname from the user, and also acquires the data on the registration date/time and on the region. Specifically, the application unit 31 prepares in advance a plurality of candidates of each site of the avatar (eyes, nose, etc.) and causes the user to choose a desirable shape from the candidates. In this manner, the avatar data conformed to the instruction of the user can be acquired. The application unit 31 causes the user to input desired letter information, so that the nickname can be acquired. Data representing the current date/time and data representing the region (country) where the information processing device 3 exists are stored on the information processing device 3, so that the application unit 31 acquires these types of data. The application unit 31 transfers (outputs) the initial registration data thus acquired to the communication control unit 32.

In step S12, the communication control unit 32 acquires the initial registration data from the application data 31. In another embodiment, the communication control unit 32 may acquire data specified by the user (avatar data and data on the nickname) from the application unit 31 and acquire the data stored on the information processing device 3 (data on the current date/time and on the region) by the communication control unit 32 itself.

In step S13, the communication control unit 32 executes a write process to the tag 2. In the example embodiment, the entirety of the data to be stored in the read/write area 22 is written to the tag 2 as one unit. Namely, the communication control unit 32 writes the dedicated data read in step S2, new shared data which includes the shared data read in step S2 and the initial registration data, and the data on the second hash value to the tag 2. As the shared data excluding the initial registration data, the data read and stored on the memory 14 in step S2 is used. The addition of the initial registration data changes the contents of the shared data. Therefore, in step S13, the communication control unit 32 calculates a hash value on the post-change shared data (shared data including the initial registration data), and writes the calculated hash value to the tag 2 as a new second hash value. After the process of step S13, the communication control unit 32 terminates the registration instruction process.

The above description is provided with an assumption that the initial registration data is not stored on the tag 2. In the case where the initial registration data is stored on the tag 2 also, substantially the same registration instruction process as described above can be executed to update the contents of the initial registration data. In this case, in step S13, the communication control unit 32 writes the dedicated data read in step S2, and new shared data obtained as a result of the initial registration data included in the shared data read in step 2 being updated, to the tag 2. As described above, the application unit 31 may transmit the registration instruction to the application unit 31 in order to update the initial registration data already registered on the tag 2 as well as in order to newly write the initial registration data to the tag 2.

In another embodiment, the communication control unit 32 may execute the process of writing the initial registration data at the time of performing the near field communication with the tag in response to the read instruction or the write instruction. In the case where, for example, data is read from the tag 2 in step S2 in the read instruction process, the communication control unit 32 may determine whether or not the initial registration data is stored on the tag 2, and in the case where the initial registration data is not stored on the tag 2, the communication control unit 32 may make a notification to the application unit 31. In response to this notification, the application unit 31 may execute the process of step S21 and the communication control unit 32 may execute the processes of steps S12 and S13. In this manner, the communication control unit 32 can write the initial registration data to the tag 2 in the read instruction process (in the case where the initial registration data has not been registered).

2-3: Operation of Writing Data

Figure 9:
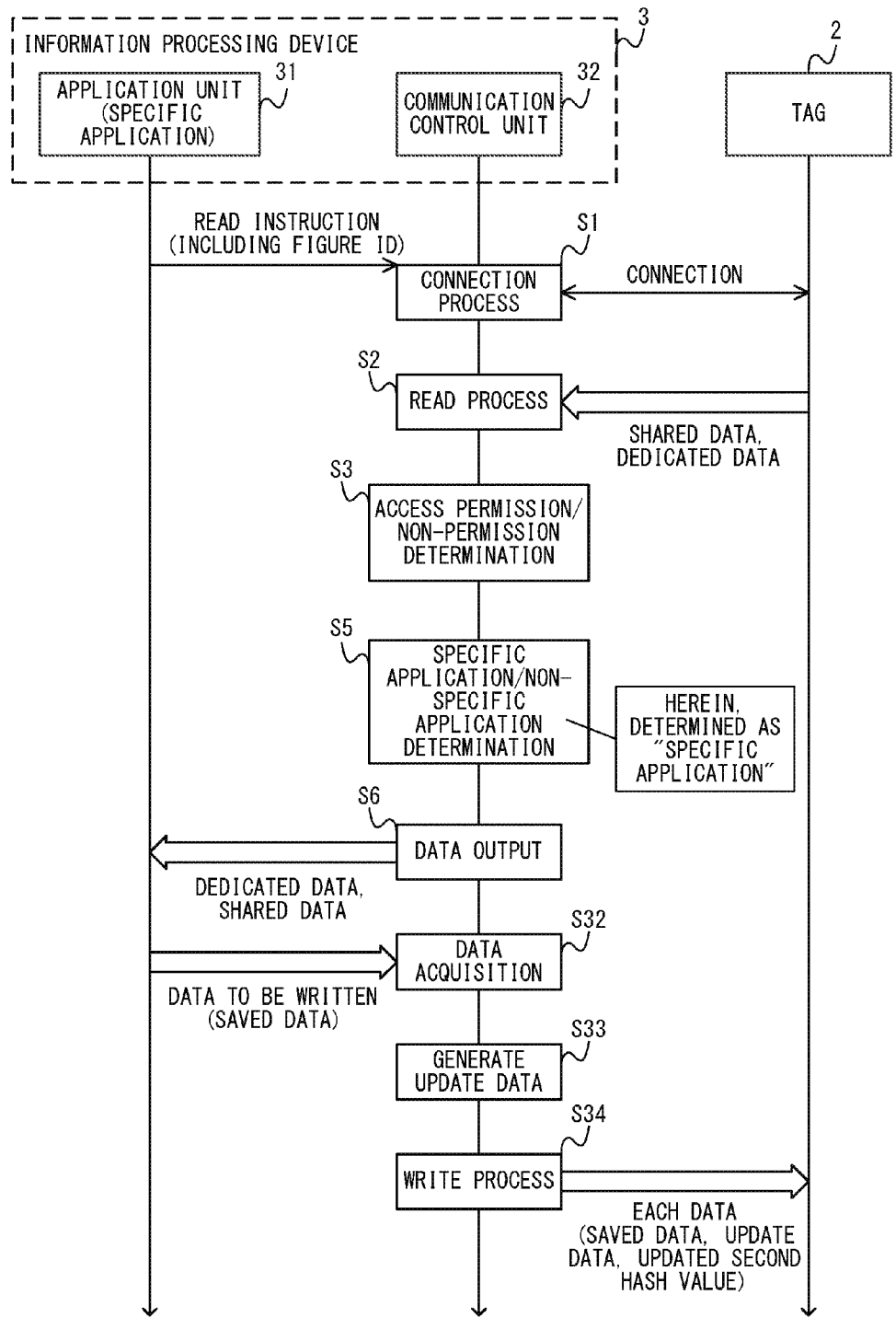
FIG. 9 shows an example of flow of a process executed by the information processing system for writing dedicated data to the tag.
Figure 10:
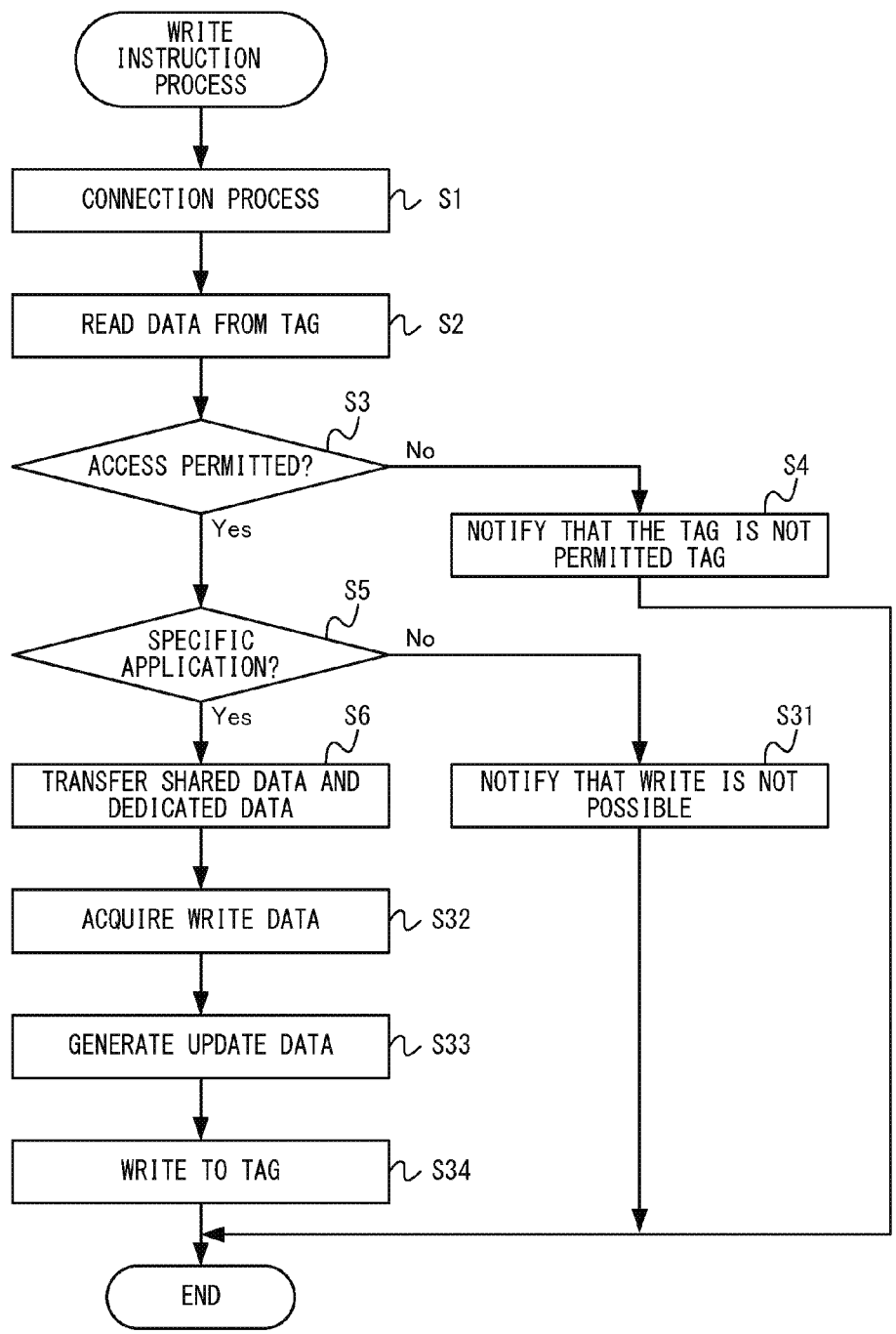
FIG. 10 is a flowchart showing an example of flow executed by the communication control unit when a write instruction is received (write instruction process)

Now, with reference to FIG. 9 and FIG. 10, an operation of writing the dedicated data (and the update data) to the tag 2 will be described. FIG. 9 shows an example of flow of a process executed by the information processing system 1 for writing the dedicated data to the tag 2. FIG. 10 is a flowchart showing an example of flow of a process executed by the communication control unit 32 that has received a write instruction (i.e., showing a write instruction process).

First, the application unit 31 transmits a write instruction, which is to write data to the tag 2, to the communication control unit 32 (see FIG. 9 and FIG. 10). The write instruction includes the figure ID included in the application program in the application unit 31, like the read instruction described above.

Upon acceptance of the write instruction, the communication control unit 32 starts execution of a series of processes shown in FIG. 10 (write instruction process). The processes of steps S1 through S6 in the write instruction process are substantially the same as those in the read instruction process described above. As can be seen, in the example embodiment, data is read from the tag 2 before data is written to the tag 2. As described later in detail, the read data is appropriately changed, and the post-change data is written to the tag 2.

In the write instruction process, in the case where the determination result in step S5 is negative (in the case where the application program that issued the write instruction is not a specific application program), a process of step S31 is executed. In step S31, the communication control unit 32 notifies the application unit 31 that the data cannot be written. Upon receipt of this notification, the application unit 31 executes an optional process. For example, the application unit 31 executes a process of notifying the user that the connected tag 2 is a not tag to which the application program that is being executed can write data. After the process of step S31, the communication control unit 32 terminates the write instruction process.

By contrast, in the case where the determination result in step S5 is positive (in the case where the application program that issued the write instruction is a specific application program), a process of step S6 is executed. Namely, the communication control unit 32 transfers (outputs) the dedicated data and the shared data to the application unit 31 (see FIG. 9 and FIG. 10). As described above, the data to be transferred to the application unit 31 in step S6 is not limited to the dedicated data and the shared data. For example, only the dedicated data (saved data) may be transferred. In the write instruction process, the communication control unit 32 may execute a process of notifying the application unit 31 that the data write is permitted instead of the process of step S6.

Upon receipt of the dedicated data and the shared data, the application unit 31 transfers the data to be written to the tag 2 (herein, saved data) to the communication control unit 32. Namely, in step S32, the communication control unit 32 acquires the data to be written to the tag 2 from the application unit 31.

In step S33, the communication control unit 32 generates update data to be written to the tag 2. As described above, in the example embodiment, the update data is updated at the time when the dedicated data (saved data) is written to the tag 2. Therefore, the communication control unit 32 acquires (generates) data on the number of times of write, the last-write device, the number of times of device change, the last-used application, and the last-write date/time. Specifically, as the data on the number of times of write, the communication control unit 32 generates data representing a value that is obtained as a result of 1 being added to the number of times of write represented by the update data read in step S2. As the data on the last-write device, the communication control unit 32 acquires data on the identification information on the information processing device 3, which is stored on the information processing device 3 itself (e.g., on the memory 14). As the data on the last-used application, the communication control unit 32 acquires the data on the identification information on the application program that issued the write instruction (application ID) from this application program. As the data on the last-write date/time, the communication control unit 32 acquires the current date/time. The data on the number of times of device change is calculated as follows.

Figure 11:
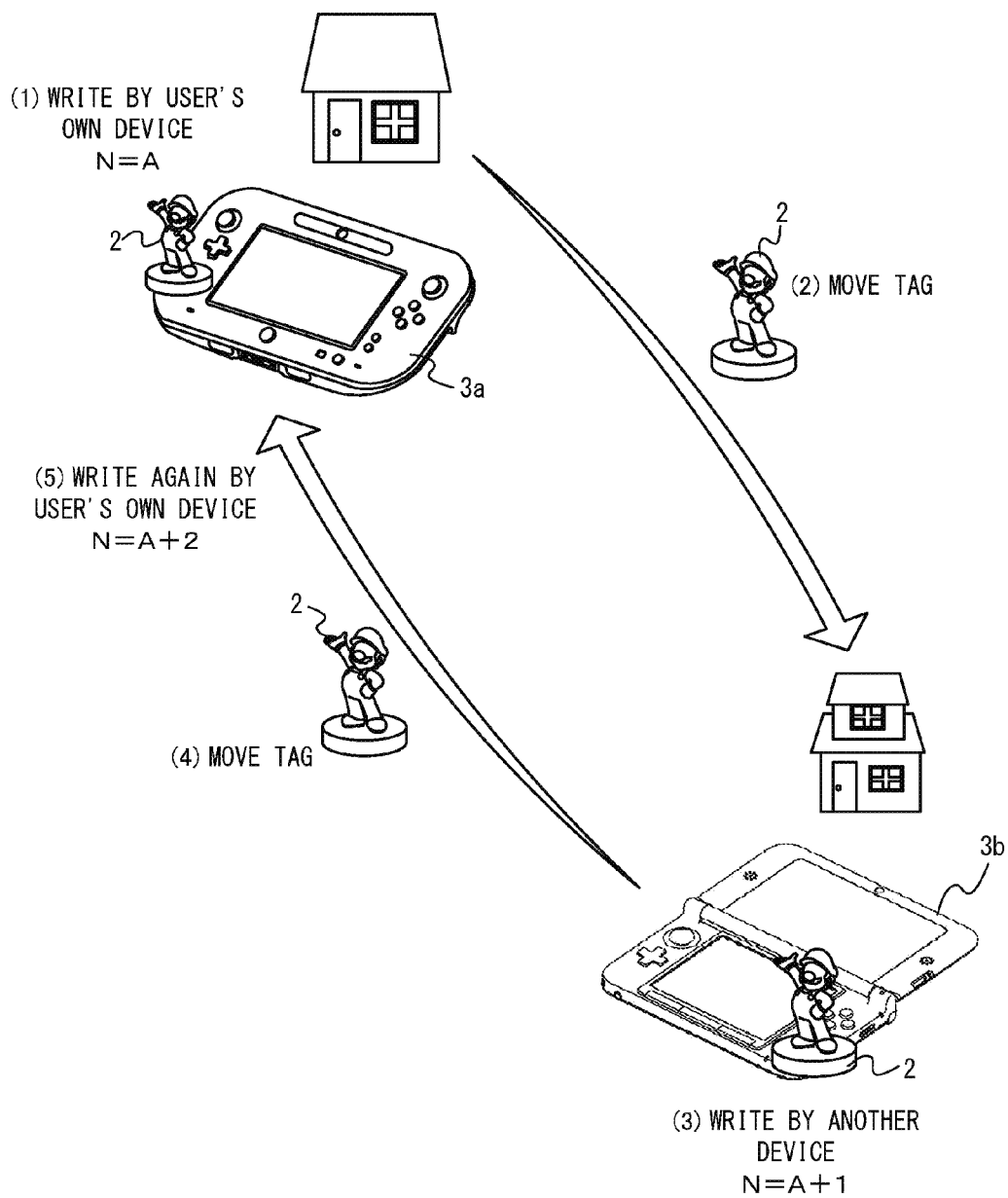
FIG. 11 shows an example of method for counting the number of times of device change.

FIG. 11 shows an example of method for counting the numbed of times of device change. FIG. 11 shows a case where the user first writes data (saved data) to the tag 2 by use of an information processing device 3a possessed by the user at home. It is assumed that the number of times of device change N at this point is "A". Even if the user writes saved data to the tag 2 by use of the information processing device 3a after this, the number of times of device change N remains "A".

As shown in FIG. 11, after the saved data is written to the tag 2 by the information processing device 3a, the user (moves with the tag 2 and) writes saved data to the tag 2 by use of another information processing device 3b. The another information processing device 3b is, for example, an information processing device possessed by a friend of the user, or an information processing device installed in a store for the purpose of sales promotion or the like. At the time when the saved data is written to the tag 2 by the another information processing device 3b, the number of times of device change N is updated to "A+1". Even if saved data is written to the tag 2 by the another information processing device 3*b* after this, the number of times of device change N remains "A+1".

As shown in FIG. 11, after this, the user (moves with the tag 2) and writes saved data to the tag 2 by use of the information processing device 3*a* possessed by the user. At the time when the saved data is written to the tag 2 by the information processing device 3*a*, the number of times of device change N is updated to "A+2".

As described above, in the example embodiment, in the case where the information processing device used to write data (saved data) the immediately previously time is different from the information processing device used to write data (saved data) currently, the number of times of device change is incremented by 1. By contrast, in the case where such information processing devices are the same, the value of the number of times of device change is kept the same.

Therefore, in the process of step S33, the communication control unit 32 determines whether or not the information on the last-write device included in the shared data (update data) read in step S2 represents the information processing device 3 that issued the current write instruction. Namely, the communication control unit 32 determines whether or not the information on the last-write device included in the update data read in step S2 matches the information on the last-write device acquired in step S33 in the current cycle of operation. In the case where the information processing devices match each other, the communication control unit 32 determines that the information processing device that wrote data was not changed, and keeps the value of the number of times of device change. Namely, the communication control unit 32 sets the value of the number of times of device change read in step S2 as the value of the number of times of device change to be written to the tag 2. By contrast, in the case where the information processing devices do not match each other, the communication control unit 32 determines that the information processing device that wrote data was changed, and increments the value of the number of times of device change. Namely, the communication control unit 32 sets a value that is obtained as a result of 1 being added to the number of times of device change read in step S2 as the value of the number of times of device change to be written to the tag 2.

In the example embodiment, the update data to be updated is acquired or generated as described above.

In step S34, the communication control unit 32 executes the write process to the tag 2. As described above, in the example embodiment, the entirety of the data to be stored in the read/write area 22 is written to the tag 2 as one unit. Namely, the communication control unit 32 writes the new dedicated data acquired from the application unit 31 in step S32, and the shared data including the new update data acquired in step S33 to the tag 2. As the shared data excluding the update data, the data read and stored on the memory 14 in step S2 is used. The change of the update data changes the contents of the shared data. Therefore, in step S34, the communication control unit 32 calculates a hash value on the post-change shared data (shared data including the changed update data), and writes the calculated hash value to the tag 2 as a new second hash value. After the process of step S34, the communication control unit 32 terminates the write instruction process.

As described above, in the example embodiment, the update data is updated in the wake of the dedicated data being written to the tag 2. Alternatively, the update data may be updated at an optional timing. For example, information on the read from the tag 2 may be included in the update date (see, "4. Modification examples" described later). In this case, the update data may be updated at the timing when the data is read from the tag 2. Namely, the communication control unit 32 may execute a process of generating new update data and writing the new update data to the tag 2 after the process of step S6 or S7 in the read instruction process.

In the example embodiment, the communication control unit 32 writes the update data to the tag 2 regardless of whether or not the initial registration data is stored on the tag 2. In the example embodiment, the information processing device 3 (communication control unit 32) may write the update data to the tag 2 under the condition that the initial registration data is stored on the tag 2. In this case, the update data (e.g., number of times of write, etc.) from the time point when the initial registration is performed can be recorded.

As described above, in the example embodiment, the entirety of main data (dedicated data and shared data) as one unit is read from, or written to, the tag 2. Namely, when being read from the tag 2, the entirety of the main data is read (even when only a part of the main data needs to be read). When data is to be written to the tag 2 (when the main data on the tag 2 is to be rewritten), the entirety of the main data is rewritten (even when only a part of the main data needs to be rewritten).

In another embodiment, data write or data read to or from the tag 2 may be executed in predetermined units. For example, in the case where the storage area of the tag 2 is divided into a plurality of blocks, the data write or data read to or from the tag 2 may be executed on a block-by-block basis.

2-4: Example 1 of Process by the Application Program

Now, with reference to FIG. 12, an example of process executed by the CPU 13 (application unit 31) of the information processing device 3 in accordance with an application program will be described. FIG. 12 is a flowchart showing an example of flow of a process executed by the CPU 13 in accordance with an application program. The process shown in FIG. 12 is started in response to, for example, the user issuing an instruction to start the application.

FIG. 12 shows a game process as an example of process executed in accordance with an application program. In the example of process shown in FIG. 12, the character represented by the tag 2 is caused to appear in a game space by use of the shared data (figure ID and series ID) stored on the tag 2.

In step S41, the application unit 31 executes a game process in accordance with an application program. The contents of the game process are optional. The process that is executed is, for example, a process of controlling the operation of the character in a virtual space (game space) in response to an input of the user, or a process of controlling the operation of another character in accordance with an algorithm defined by the program.

In step S42, the application unit 31 determines whether or not to communicate with the tag 2. Namely, the application unit 31 determines whether or not a predetermined game condition for communicating with the tag 2 has been fulfilled. The predetermined game condition is that a game situation in which the character represented by the tag 2 can appear is obtained; more specifically, that a player character has advanced to a predetermined stage; that a player character has acquired a predetermined item; or the like. The process of step S42 is executed at an appropriate timing while the game process is executed in step S41. Therefore, in the case where the determination result in step S42 is negative, the process of step S41 is executed again, and the processes of steps S41 and S42 are repeated until the determination result in step S42 becomes positive. By contrast, in the case where the determination result in step S42 is positive, a process of step S43 described later is executed.

In step S43, the application unit 31 outputs a read instruction and reads data from the tag 2. Namely, as described above, the application unit 31 first outputs a read instruction to the communication control unit 32 (see FIG. 4, etc.). In response to this read instruction, the communication control unit 32 communicates with the tag 2 (step S1), and transfers the data read from the tag 2 to the application unit 31 (steps S2, S6, S7). In this manner, the application unit 31 acquires the data from the tag 2. As described above, in the case where the application program that is being executed is a specific application program, the dedicated data and the shared data are acquired. In the case where the application program that is being executed is a non-specific application program, the shared data is acquired. When the data from the tag 2 is acquired in step S43, a process of step S44 is executed.

Although not shown in FIG. 12, in the case where the tag 2 that is connected to the information processing device 3 is not a permitted tag (in the case where the determination result in step S3 is negative), the communication control unit 32 notifies the application unit 31 that the tag 2 is not a permitted tag. In this case, the application unit 31, for example, notifies the user that the data cannot be read, and restarts the process of step S1.

In step S44, the application unit 31 determines whether or not the figure ID acquired in step S43 corresponds to the character registered in the application program that is being executed. The application program includes data for generating characters caused to appear in the game by the tag 2. In the application program, information on a figure ID associated with each of the characters is registered in advance. The determination in step S44 is executed based on whether or not the figure ID acquired in step S43 matches any one of the figure IDs registered in the application program that is being executed. By contrast, in the case where the determination result in step S44 is positive, a process of step S46 described later is executed. In the case where the determination result in step S44 is negative, a process of step S45 described later is executed.

In step S45, the application unit 31 determines whether or not the series ID acquired in step S43 matches the series ID to be set for the application program that is being executed. In the application program, information on the series ID to be set for the application program is registered in advance. Therefore, the application unit 31 determines whether or not the series ID acquired in step S43 matches the series ID registered in the application program that is being executed. In the case where it is determined in step S45 that the two series IDs match each other, it is found that the character represented by the figure ID stored on the tag 2 is a character registered in the series to which the application program belongs (although not registered in the application program). In the case where the determination result in step S45 is positive, the process of step S46 described later is executed. By contrast, in the case where the determination result in step S45 is negative, a process of step S47 described later is executed.

In step S46, the application unit 31 executes a process of causing the character represented by the figure ID to appear in the virtual space. In the case where the application unit 31 knows the character represented by the figure ID stored on the tag 2 (in the case where the figure ID is registered in the application program, namely, in the case where the determination result in step S44 is positive), the application unit 31 can cause the character to appear in the virtual space by use of the information in the application program thereof. Namely, the application unit 31 generates the character in the virtual space by use of the information in the application program thereof.

By contrast, in the case where the application unit 31 does not know the character represented by the figure ID stored on the tag 2 (in the case where the figure ID is not registered in the application program, namely, in the case where the determination result in step S44 is negative and the determination result in step S45 is positive), the application unit 31 cannot cause the character to appear in the virtual space by use of the information in the application program thereof. Therefore, the application unit 31 uses the figure ID acquired from the tag 2 to specify the character represented by the figure ID and causes the specified character to appear in the virtual space. For example, the application unit 31 accesses an external server, transmits the figure ID acquired from the tag 2 to the server, and receives data on the character transmitted from the server in response thereto (data for generating the character). In the case where the application program that is being executed is a specific application program, the data for generating the character may be included in the saved data so that the application unit 31 can generate the character by use of the saved data.

The process of step S46 of causing the character to appear in the virtual space may be different between the case where the application program that is being executed is a specific application program and the case where application program that is being executed is a non-specific application program. For example, in the case where the application program that is being executed is a specific application program, the application unit 31 may display the entirety of the character represented by the tag 2 (displays the character as it is) on the display unit 17. By contrast, in the case where the application program that is being executed is a non-specific application program, the application unit 31 may display only a part of the character (e.g., the hat or the clothes of character represented by the tag 2 may be attached to another character). Alternatively, in the case where the application program that is being executed is a specific application program, the application unit 31 may display the character represented by the tag 2 on the display unit 17 in a normal display manner. By contrast, in the case where the application program that is being executed is a non-specific application program, the application unit 31 may display the character in a display manner different from the normal display manner (e.g., display the character as a two heads high figure).

In step S47, the application unit 31 notifies the user that the tag 2 is not usable in (does not correspond to) the application program that is being executed.

After step S46 or S47, the application unit 31 executes the process of step S1 again. After this, the series of processes shown in FIG. 12 are repeated until a condition for terminating the game is fulfilled (e.g., until the user issues an instruction to terminate the game).

2-5: Example 2 of Process by the Application Program

Figure 13:
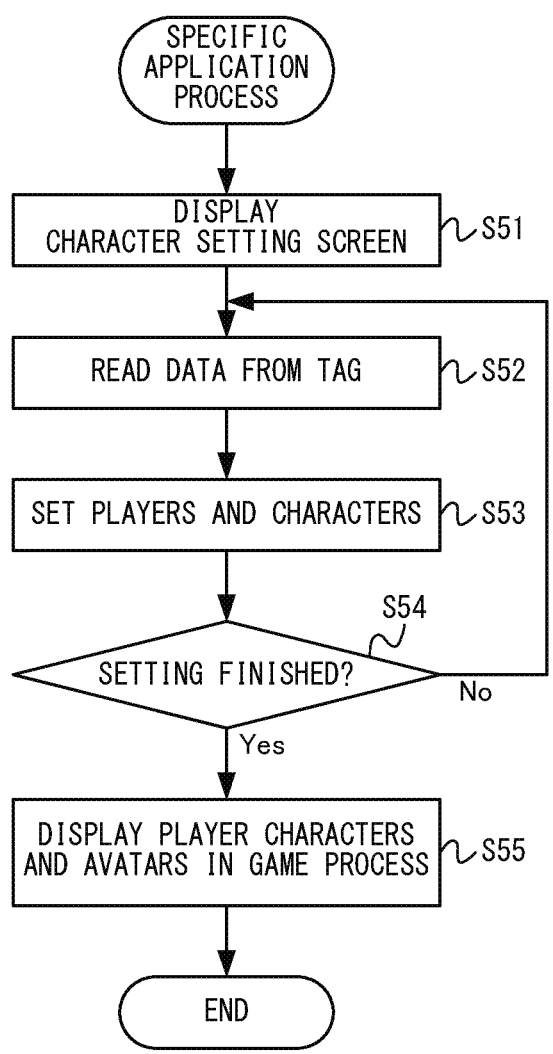
FIG. 13 is a flowchart showing an example of flow of a process executed by the CPU by the specific application program (specific application process)
Figure 15:
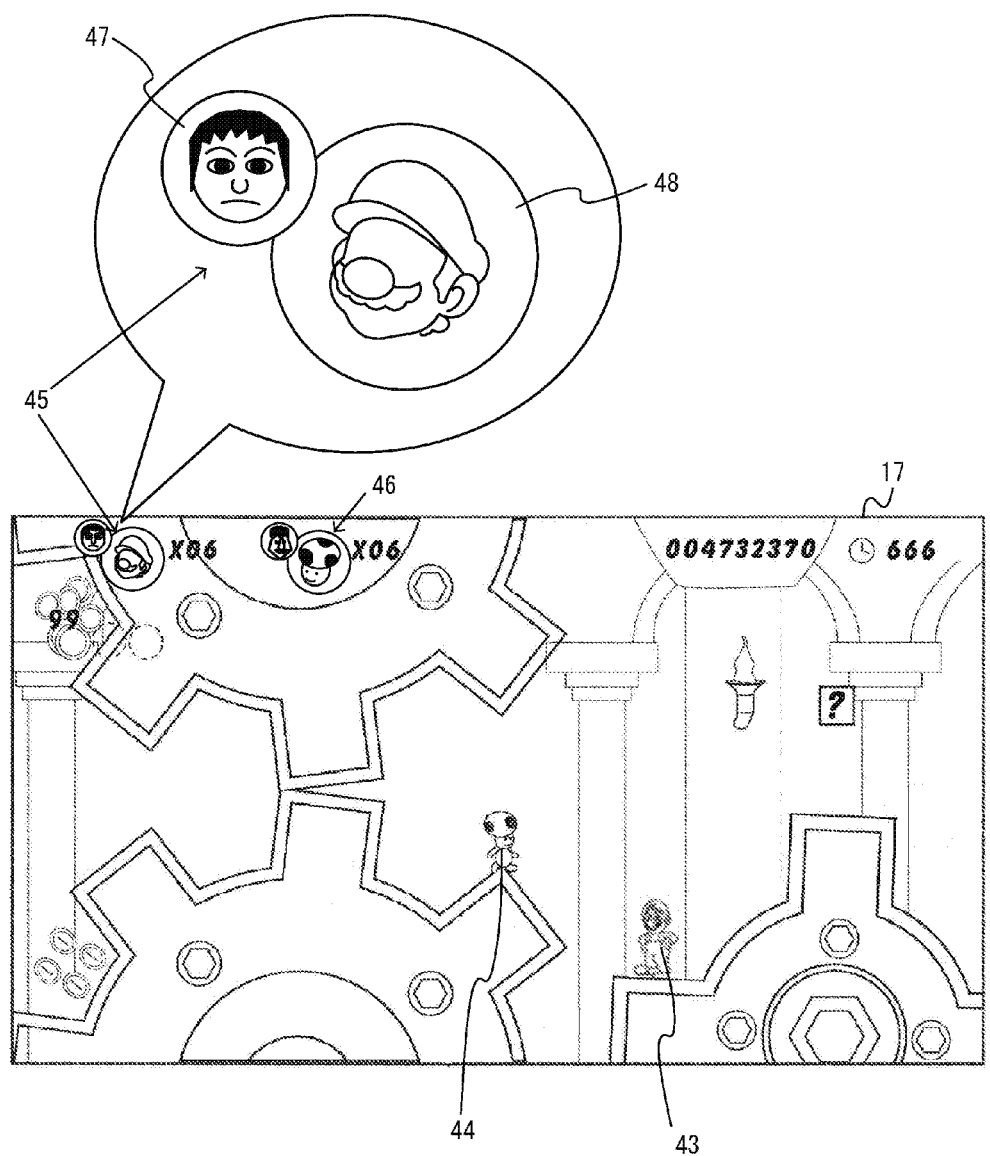
FIG. 15 shows an example of game image displayed on a display unit by the specific application program.
Figure 16:
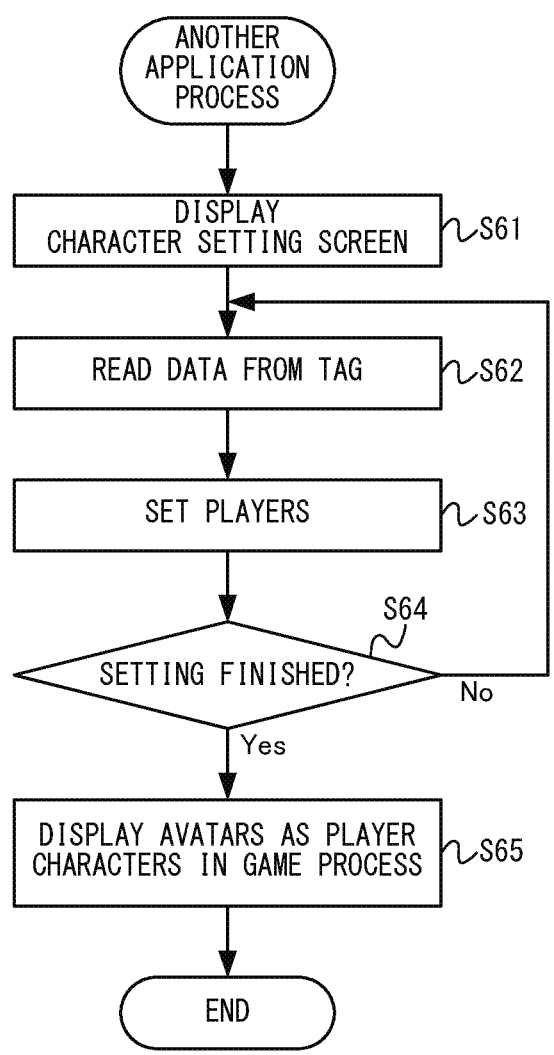
FIG. 16 is a flowchart showing an example of flow of a process executed by the CPU by an application program different from the specific application program (another application process)

Now, with reference to FIG. 13 through FIG. 17, another example of process executed by the CPU 13 (application unit 31) of the information processing device 3 in accordance with an application program will be described. FIG. 13 is a flowchart showing an example of flow of a process executed by the CPU 13 in accordance with a specific application program on the tag 2 (flow of a specific application program). FIG. 16 is a flowchart showing an example of flow of a process executed by the CPU 13 in accordance with another application program different from the specific application program on the tag 2 (flow of another application program). Hereinafter, an example of process performed for a game in accordance with the specific application program and an example of process performed for a game in accordance with the another application program, both of which use one, same tag 2, will be described. The processes shown in FIG. 13 and FIG. 16 are started in response to, for example, the user issuing an instruction to start the application.

First, with reference to FIG. 13 through FIG. 15, the specific application process will be described. The specific application process is performed as follows. First, in step S51, the application unit 31 displays a character setting screen on the display unit 17. The character setting screen is provided so that the user (player) can set a player character to be operated. As described in detail later, in the specific application process, an avatar/player character pair, i.e., a pair of an avatar of the player and a player character, is displayed in the character setting screen (see FIG. 14).

In the specific application process shown in FIG. 13, a tag is used to specify a player character. Specifically, in the state where the character setting screen is displayed, the user holds a tag of the character that he/she wishes to operate above the information processing device 3 (antenna part of the information processing device 3) to cause the tag and the information processing device 3 to perform near field communication with each other. It is assumed that an initial registration process for the tag has been performed and that the avatar data on the user is stored on the tag. When being permitted to perform the near field communication with the tag, the information processing device 3 reads the data from the tag, and sets the user corresponding to the avatar data read from the tag as the player, and also sets the character of the tag as the player character of the player. Thus, the player/player character pair is set. In the specific application process in the example embodiment, a process of setting the player/player character pair described above is performed in steps S52 and S53.

Specifically, in step S52, the application unit 31 executes a process of reading the data from the tag. This process is substantially the same as that described above with reference to FIG. 4 through FIG. 6. This will be described specifically. The application unit 31 transfers a read instruction to the communication control unit 32. In response thereto, the communication control unit 32 performs a communication process or the like (steps S1 through S3 and S5) with the tag and transfers shared data and dedicated data to the application unit 31. Thus, the application unit 31 can acquire (read) the data from the tag.

In step S53, the application unit 31 sets the player/player character pair. This will be described specifically. The application unit 31 sets the player based on the avatar data in the data read in step S52. Namely, the avatar data is stored on the memory 14 as the data specifying the player. The application unit 31 also sets the player character based on the figure ID in the data read in step S52. Namely, the data on the figure ID in the data read in step S52 is stored on the memory 14 as the data representing the player character corresponding to the player that has been set. The application unit 31 further displays the player/player character pair that has been set above in the character setting screen.

Figure 14:
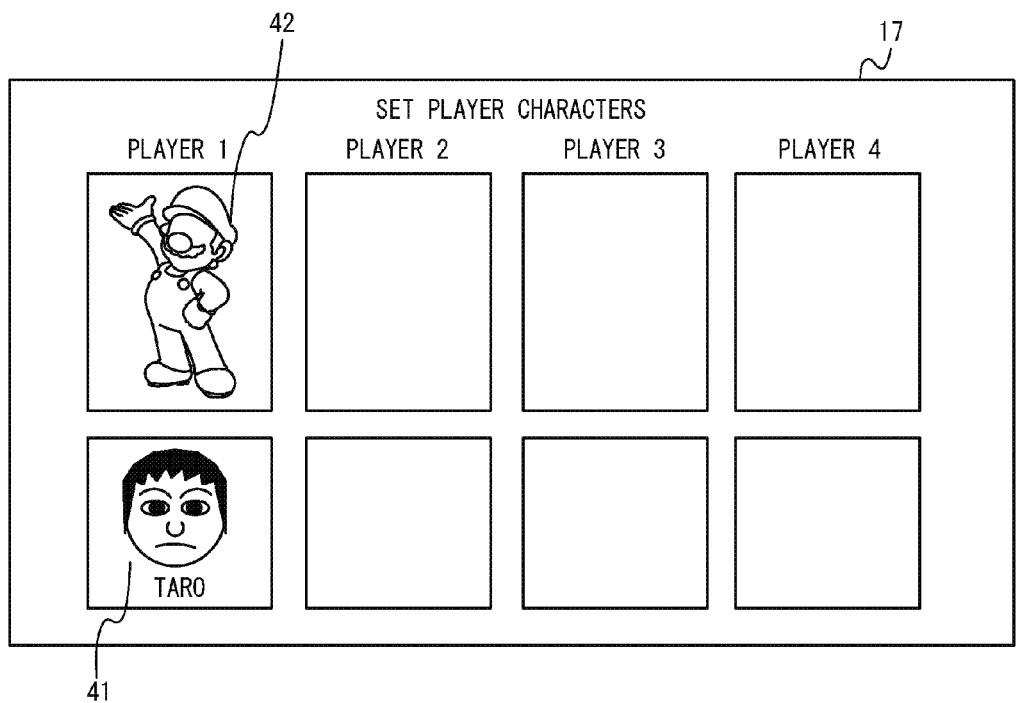
FIG. 14 shows an example of character setting screen in the specific application program.

FIG. 14 shows an example of character setting screen in the specific application process. As shown in FIG. 14, in the character setting screen, an avatar image 41 of the avatar of the player and a player character image 42 of the player character are displayed as being associated with each other. FIG. 14 shows a character setting screen in the state where a first player and a player character of the first player are set by use of the above-described tag 2. Therefore, the avatar image 41 and the player character image 42 are displayed in an area for the first player. (Areas for a second player and other players are blank.) It is assumed that the game played by use of the specific application process shown in FIG. 13 can be played by four players at the maximum. Therefore, areas for four players are provided in the character setting screen.

The avatar image 41 is generated by use of the avatar data read from the tag 2. As described above, the avatar (the image of the avatar) is generated by the CPU 13 executing the avatar generation program prepared in the information processing device 3 in advance. In the example embodiment, the entire body of the avatar can be displayed by use of the avatar data and the avatar generation program. In the specific application process, however, an image of a part of the avatar (face) is displayed. As shown in FIG. 14, a name of the player ("Taro" in FIG. 14) is displayed together with the avatar image 41. In the case where, for example, the avatar data includes data representing a name of a player, the name represented by the data may be displayed. In another embodiment, the above-described nickname included in the initial registration data may be displayed.

In step S54, the application unit 31 determines whether or not to terminate the setting of the player character. The application unit 31 determines to terminate the setting when, for example, the maximum number of player characters that can be set (four in this example) have been set or when user has issued an instruction to start the game. By contrast, when the maximum number of player characters that can be set have not been set and no instruction to start the game has been issued, the application unit 31 determines not to terminate the setting. In the case where the determination result in step S54 is negative, the process of step S52 is executed again. In this case, a player different from the player for whom the player character has been set holds his/her tag above the information processing device 3, and a new player/player character pair is set by the processes of steps S52 and S53. By contrast, in the case where the determination result in step S54 is positive, a process of step S55 is executed.

In step S55, the application unit 31 executes a game process. The contents of the game performed by the game process are optional. In the example embodiment, the correspondence between the players (avatars of the players) and the player characters are displayed even during the game. FIG. 15 shows an example of game image displayed on the display unit 17 by the specific application process. The game image shown in FIG. 15 indicates that two players are playing the game. Specifically, the game image shows a game space in which a first player character 43 and a second player character 44 appears. The game image also includes images 45 and 46 showing the player/player character pairs (pairs of avatars of the players and the player characters). FIG. 15 shows an enlarged view 45 in addition to the game image displayed on the display unit 17. The enlarged view 45 includes an avatar image 47 of the avatar and a player character image 48 of the player character, and the avatar image 47 and the player character image 48 are displayed as being associated with each other. As in the images 45 and 46, the avatar image and the player character image are displayed as being associated with each other for each player/player character pair.

The above-described game process is executed until a condition for terminating the game (e.g., the user issuing an instruction to terminate the game) is fulfilled. When the condition is fulfilled, the application unit 31 terminates the game and also the specific application process.

According to the specific application process, the user can easily set the player character in the game by performing an operation of holding the tag 2 above the information processing device 3. In the specific application process, the player character and the player (avatar of the player) are displayed as being associated with each other (see FIG. 14 and FIG. 15). Thus, each player can easily recognize the player character that he/she operates.

Now, with reference to FIG. 16 and FIG. 17, the another application process will be described. The another application process is performed as follows. First, in step S61, the application unit 31 displays a character setting screen on the display unit 17. As described later in detail, in the another application process, an avatar of the player is set as a player character, and an image of the avatar is displayed in the character setting screen (see FIG. 17).

In the another application process shown in FIG. 16, like in the specific application process, a player character is specified by use of the tag. Specifically, in the state where the character setting screen is displayed, the user holds a tag storing data on his/her avatar above the information processing device 3 (antenna part of the information processing device 3) to cause the tag and the information processing device 3 to perform near field communication with each other. When being permitted to perform the near field communication with the tag, the information processing device 3 reads the data from the tag, generates an avatar by use of the avatar data read from the tag, and sets the avatar as the player character. In the another application process in the example embodiment, a process of setting the player character described above is performed in steps S62 and S63.

In step S62, the application unit 31 executes a process of reading the data from the tag. The process of step S62 is substantially the same as that in step S52.

In step S63, the application unit 31 sets the player character based on the avatar data read in step S62. This will be described specifically. The application unit 31 acquires information identifying the avatar (e.g., name of the avatar) from the read avatar data and stores the information identifying the avatar on the memory 14 as the data representing the player character. The application unit 31 also displays the player character that has been set in the character setting screen.

Figure 17:
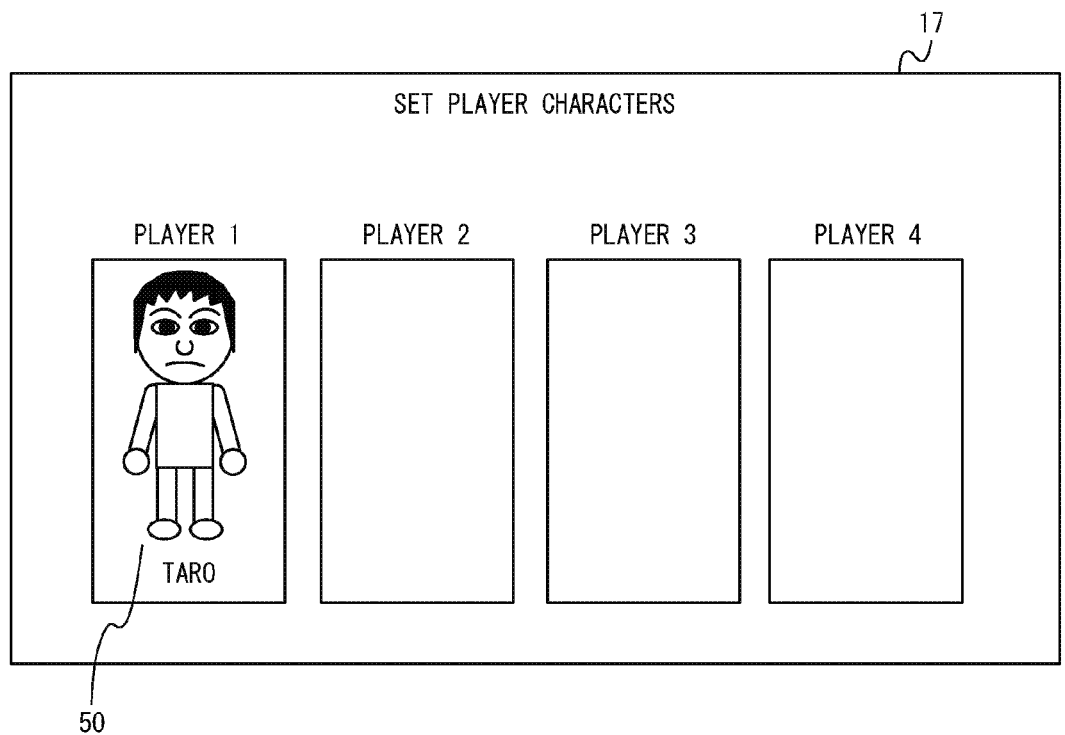
FIG. 17 shows an example of character setting screen in the another application process.

FIG. 17 shows an example of character setting screen in the another application process. As shown in FIG. 17, in the character setting screen, an avatar image 50 of the avatar of the player, namely, the player character is displayed. FIG. 17 shows a character setting screen in the state where a player character of a first player is set by use of the above-described tag 2. Therefore, the avatar image 50 is displayed in an area for the first player. (Areas for a second player and other players are blank.) It is assumed that the game played by use of the another application process shown in FIG. 16 can be played by four players at the maximum. Therefore, areas for four players are provided in the character setting screen.

Like in the case of the specific application process, the avatar image 50 is generated by use of the avatar data read from the tag 2 by execution of the avatar generation program prepared in the information processing device 3 in advance. In the another application process, the avatar is displayed in a different form from that in the specific application process. Specifically, in the another application process, the entire body of the avatar is generated and displayed. In the another application process, like in the specific application process, a name of the player ("Taro" in FIG. 17) is displayed together with the avatar image 50.

In step S64, the application unit 31 determines whether or not to terminate the setting of the player character. The determination in step S64 may be made in substantially the same manner as in step S54. In the case where the determination result in step S64 is negative, the process of step S62 is executed again. In this case, a player different from the player for whom the player character has been set holds his/her tag above the information processing device 3, and a player character of such a player is newly set by the processes of steps S62 and S63. By contrast, in the case where the determination result in step S64 is positive, a process of step S65 is executed.

In step S65, the application unit 31 executes a game process. The contents of the game performed by the game process are optional. In the example embodiment, the player character, which is the avatar, appears and is controlled by an operation of the player during the game. The above-described game process is executed until a condition for terminating the game (e.g., the user issuing an instruction to terminate the game) is fulfilled. When the condition is fulfilled, the application unit 31 terminates the game and also the another application process.

In another embodiment, in the another application process, like in the specific application process, the application unit 31 may display the character represented by the tag 2 and the avatar data (player information) stored on the tag 2 in association with each other. For example, the application unit 31 may cause an avatar dressed like the character of the tag 2 to appear as the player character. Alternatively, in the case where, for example, the tag 2 has an external appearance representing an item, the application unit 31 may cause the avatar to appear as the player character and cause the player character to carry the item represented by the tag 2.

According to the another application process, the user can easily set the player character (more specifically, set his/her avatar as the player character) in the game by performing an operation of holding the tag 2 above the information processing device 3. Each player can easily recognize the player character that he/she operates by setting his/her avatar as the player character. According to the another application process in the example embodiment, a player character different from the player characters in the specific application process can be caused to appear by use of the same tag 2 as in the specific application process.

In another embodiment, a character represented by a tag and also an avatar may be allowed to appear in the game space in one application program (specific application program or any other application program). Now, for example, a case where a first tag representing a character and a second tag representing an avatar are prepared will be discussed. The second tag does not represent any specific avatar but merely represents a general appearance of the avatar. For example, the second tag represents only the contours of the face and the body but does not represent sites (eyes, nose, mouth) in detail. It is assumed that avatar data is stored on the tag 2 and that information indicating that the character that is to appear in the game space is an avatar is stored on the tag 2 as a figure ID. In the case where the first tag and the information processing device 3 perform near field communication with each other and the application is executed by use of the first tag, the information processing device 3 causes the character represented by the first tag to appear in a virtual space (e.g., as a player character). By contrast, in the case where the second tag and the information processing device 3 perform near field communication with each other and the application is executed by use of the second tag, the information processing device 3 generates an avatar by use of the avatar data stored on the second tag 2 and causes the avatar to appear in the virtual space (e.g., as a player character). In the above-described cases, the application program may be compatible to only the second tag and may not be compatible to the first tag (the character represented by the first tag may not appear).

In the example embodiment, the avatar data is stored on the tag 2. This allows the avatar data to be transferred (merely transferred, copied, or exchanged) between information processing devices by use of the tag 2 (via the tag 2). Specifically, after an information processing device stores the avatar data on the tag 2 (see the above-described registration instruction process), another information processing device can acquire the avatar data by reading the data from the tag 2 by near field communication. For example, the user may store the avatar data on his/her tag and, when visiting a friend, may allow the information processing device of the friend to acquire the data from the user's tag. Thus, the avatar data of the user can be stored on the information processing device of the friend.

The transfer of the data on the user such as the avatar data or the like between information processing devices may be performed by another method in addition to (or instead of) the above-described method using the tag 2. For example, in the case where information processing devices each include a network communication unit for performing network communication via a network such as the Internet or the like, data may be transmitted and received between the information processing devices by the network communication. In the case where the information processing devices each include a wireless communication unit for performing wireless communication such as infrared communication, the Bluetooth (registered trademark) communication or the like, data may be directly transmitted and received between the information processing devices by the wireless communication. In the case where the information processing devices are capable of performing near field communication with each other as described above, data may be directly transmitted and received between the information processing devices by the near field communication. In the case where an information processing device that is to acquire data includes a camera (unit for reading a two-dimensional bar code), data may be transmitted and received between the information processing devices by use of the two-dimensional bar code. Specifically, one of the information processing devices may generate a two-dimensional bar code representing avatar data, and the other information processing device may read the two-dimensional bar code to acquire the avatar data. The method using the tag as in the example embodiment allows the user to transfer data by a simple operation of holding the tag above the information processing device.

3. Functions and Effects of the Example Embodiment

As described above, in the example embodiment, the tag 2 includes a storage unit that stores application data that is usable in a specific application program (dedicated data) and shared data usable in an application program regardless of whether the application program is a specific application program. The communication control unit 32 receives an instruction regarding data read/write from/to the tag 2 from the application program to be executed by the information processing device 3. In the case where the received instruction relates to the dedicated data (e.g., instruction to read the dedicated data), under the condition that the instruction is from a specific application program (step S5: Yes), the communication control unit 32 passes the dedicated data read from the tag 2 to the specific application program (step S6). In the case where the received instruction relates to the shared data (e.g., instruction to read the shared data), the communication control unit 32 passes the shared data read from the tag 2 to the specific application program that issued the instruction regardless of whether the instruction is from a specific application program (steps S6, S7).

Therefore, according to the example embodiment, the tag 2 is usable to use the dedicated data in the specific application program, and is also usable to use the shared data in an application program that is not limited to the specific application program. Owing to this, the number of applications that can use the tag 2 is increased, and thus the tag 2 can be used in a more versatile manner. The shared data is usable in another application program other than the specific application program as well as in the specific application program, whereas the dedicated data can be restricted from being used in the another application program. Therefore, fraudulent use of the dedicated data in the another application program can be prevented.

In the example embodiment, the tag 2 stores the identification information set for each type of tag (figure ID). The specific application program includes the figure ID set for the tag that stores the dedicated data usable in the specific application program itself. The communication control unit 32 determines whether the received instruction is from the specific application program based on the figure ID read from the tag 2 and the figure ID acquired from the application program. Owing to this, it can be determined easily whether the received instruction is from the specific application program.

For making the above-described determination using the figure ID, the specific application program may access only a predetermined type of tag among the tags usable in the specific application program itself. Namely, the specific application program may transmit, to the communication control unit 32, the figure IDs of all the tags usable in the application program itself, so that the specific application program can access an optional tag usable in the specific application program itself. Alternatively, the application program may transmit, to the communication control unit 32, a part of the figure IDs of the tags usable in the application program itself, so that the specific application program can limit the tag(s) accessible by the specific application program itself among the tags usable in the specific application program itself. In this manner, for executing the specific application/non-specific application determination process using use of the figure ID, it can be determined whether the tag connected to the information processing device 3 is permitted to be accessed by the specific application program, in addition to determining whether the application program that has issued the instruction is a specific application program.

In the example embodiment, the tag 2 stores the shared data that relates to the object (character) appearing in a predetermined application program (specific application program) and is usable in the specific application program or a non-specific application program. For executing the specific application program, the information processing device 3 uses the shared data read from the tag 2 and thus executes a first process of displaying the object on the display unit 17 (process of displaying the entirety of the character) (step S46). For executing an application program that is not the specific application program (non-specific application program), the information processing device 3 uses the shared data read from the tag 2 and thus executes a second process different from the first process (executes a process of displaying another character wearing the clothes of the above character) (step S46).

According to the above, the tag 2 is usable to use the shared data in the predetermined application program and also in another application program. Owing to this, the number of applications that can use the tag 2 is increased, and thus the tag 2 can be used in a more versatile manner.

The first process and the second process are not limited to being a process of displaying an object, and may be an optional process of outputting information relating to the object. The information relating to the object may be, for example, an image representing the object, or a sound on the object (voice or theme tune of the character). In the case where, for example, a theme tune is set for the character represented by the tag 2, the first process and/or the second process may be a process of outputting the theme tune from the speaker (e.g. as BGM).

When near field communication is possible between the communication control unit 32 and a certain tag 2, the communication control unit 32 determines whether the tag is a permitted tag, an access to which by the application program to be executed by the information processing device 3 is permitted (step S3). In the case where it is determined that the tag with which near field communication is possible is a permitted tag, the communication control unit 32 executes a process conforming to the instruction (read instruction, etc.) from the application program to be executed by the information processing device 3 (steps S6, S7). In other words, the communication control unit 32 permits the shared data to be used in the application program to be executed by the information processing device 3 under the condition that the tag with which near field communication is possible is a permitted tag. Owing to this, data on the permitted tag is usable in another application program different from the specific application program, whereas the another application program can be prevented from reading data from a tag that is not a permitted tag.

In the example embodiment, the information processing device 3 executes, as the second process, a process of displaying an object (character) displayed in the first process in a manner different from in the first process (e.g., displays only a part of the object, or displays the object as a two heads high figure) (step S46). Owing to this, the object can be displayed in a display state suitable to the application, and thus the versatility of the tag (versatility of the data stored on the tag) can be further improved.

In another embodiment, when executing a game application program different from the predetermined application program (non-specific application program), the information processing device 3 may execute a process that does not influence the progress of the game as the second process. For example, as described in the above embodiment, the information processing device 3 may execute a process of changing only the appearance of a character different from the character represented by the tag 2 (e.g., changing the clothes) but not changing a game parameter that influences the progress of the game (e.g., parameter of the strength of the character, etc.). As can be seen, the second process may use the shared data in a supplementary manner unlike the first process. This allows a developer of the application program to make the shared data usable in a more versatile manner in the second process, and thus the versatility of the tag is improved.

In the example embodiment, the tag 2 has an external appearance that represents, three-dimensionally (or two-dimensionally), the object (character) appearing in the virtual space that is generated by executing a predetermined application program (specific application program) by the information processing device 3 (FIG. 2). The tag 2 stores first identification information (figure ID) relating to the object and second identification information (series ID) relating to the group to which the object belongs. The information processing device 3 uses the figure ID read from the tag 2 to execute a predetermined process (process of displaying the character represented by the figure ID (step S46)) and also uses the series ID read from the tag 2 to execute the predetermined process.

According to the above, the application program to be executed by the information processing device 3 can execute the predetermined process using either the figure ID or the series ID. Namely, even in the case where the figure ID is not usable (the figure ID is not registered), the series ID can be used to execute the predetermined process (as long as the series ID is registered). As can be seen, the example embodiment allows the application program to execute the predetermined process more easily and allows the tag to be used more easily by a larger number of applications. Thus, the versatility of the tag is improved.

While executing the application program, the information processing device 3 determines whether the figure ID read from the tag 2 represents the value registered in the application program that is being executed (step S44). The information processing device 3 also determines whether the series ID read from the tag 2 represents the value registered in the application program that is being executed (step S45). The predetermined process (step S46) is executed in the case where at least one of the figure ID and the series ID read from the tag 2 represents the value registered in the application program that is being executed (FIG. 12). Owing to this, as long as one of the figure ID and the series ID is registered in the application program, the application program can execute the predetermined process. This allows the tag to be used more easily by a larger number of applications. Thus, the versatility of the tag is improved.

In the example embodiment, the predetermined process is a process regarding the object (character). In the case where the figure ID read from the tag 2 represents the value registered in the application program that is being executed, the information processing device 3 specifies the object using the figure ID (step S46). In the case where the figure ID read from the tag 2 does not represents the value registered in the application program that is being executed (step S45: No) and the series ID read from the tag 2 represents the value registered in the application program that is being executed (S45: Yes), the information processing device 3 specifies the object using the series ID. Owing to this, even in the case where the figure ID is not usable, the object can be specified using the series ID, and the predetermined process regarding the object can be executed.

(Functions and Effects of the Application Processes Shown in FIG. 13 and FIG. 16)

In the example embodiment, the tag 2 stores object information (figure ID, etc.) relating to the object represented by the external appearance thereof. The information processing device 3 writes, to the tag 2, character image information (avatar data) specifying the image of the character (avatar) created based on the instruction of the user (step S13). The information processing device 3 executes a predetermined process (game process of step S53, S55, S63 or S65) using at least one of the object information and the character image information read from the tag 2.

According to the above, information specifying the image of the avatar of the user can be written to a tag having an external appearance of an object. Then, a process is executed using the information relating to the object and the information relating to the avatar. This allows the tag having the information relating to the object to be used in a wider variety of uses; namely, in a more versatile manner. In the case where, for example, an object represented by the tag is used as a player character, the avatar of the player operating the player character can be displayed together with the player character (see FIG. 14 and FIG. 15), or the avatar of the player can be used as a player character (FIG. 17).

In the example embodiment, the above-described predetermined process is performed by executing the specific application program. In another embodiment, the above-described predetermined process may be performed by executing an application program other than the specific application program. Alternatively, the above-described predetermined process may be performed using both of the object information and the character image information. The information processing device may execute a first process using the object information (read from the tag) and a second process using the character image information (read from the tag).

The "tag having an external appearance representing an object which appears in a virtual space" is not limited to a tag representing one object appearing in the virtual space in detail, and may be a tag representing a general appearance of the object appearing in the virtual space. Namely, the "tag having an external appearance representing an object which appears in a virtual space" may have an external appearance representing the object to a degree at which the object is distinguishable from another object. For example, the above-described second tag representing the avatar does not represent any specific avatar but represents a general appearance of an avatar. Namely, the second tag does not need to represent each of sites represented by the avatar data accurately, but may have, for example, an external appearance having only contours of the face and the body with no eyes, nose or mouth. Alternatively, the second tag may have an external appearance representing sites each having a predetermined standard shape. In this case, the second tag does not accurately match the avatar generated based on the avatar data, but represent a general appearance of the avatar. The "tag having an external appearance representing an object which appears in a virtual space" conceptually encompasses such a second tag.

In the example embodiment, the information processing device 3 executes a process of causing the display device to display at least a part of the object (player character) and at least a part of the character (avatar) in association with each other (steps S53, S55) as the above-described predetermined process. Owing to this, the relationship between the object stored on the tag and the user (character of the user) can be presented in an easy-to-see manner. The above-described process may be a process of displaying the player character and the avatar in association with each other in the character setting screen as shown in FIG. 14, or may be a process of displaying the player character and the avatar in association with each other during the game. Alternatively, in the case where the avatar is the player character, the above-described process may be a process of causing the player character dressed like the object represented by the tag to appear, or a process of causing the player character carrying an item represented by the tag to appear.

In the example embodiment, the object represented by the tag is the player character operated by the user, and the character created based on an instruction of the user is the character corresponding to the user operating the player character. Owing to this, the tag is usable in a more versatile manner; for example, an operation of setting the player/player pair can be performed using the tag.

In the example embodiment, the character image information is information specifying the image of the avatar of the user. More specifically, the information (avatar data) specifying the image of the avatar is information specifying an image of each of sites of the avatar. Owing to this, the information processing device can easily generate the avatar based on the information.

In the example embodiment, the information processing device 3 executes the predetermined application program (specific application program) to execute a process of causing the object to appear in the virtual space (game space) using the object information read from the tag 2 (step S55). This makes the user feel as if a real object represented by the tag appeared in the virtual space. Thus, the application can be more entertaining.

The information processing device 3 executes an application program different from the predetermined application program (specific application program) to cause the character (avatar) to appear in the virtual space using the character image information (avatar data) read from the tag 2 (step S65). Owing to this, the character (avatar) stored on the tag can appear in the virtual space, which makes the application more entertaining. In addition, one, same tag is usable to cause different characters to appear in the virtual space in the predetermined application program from in the application different from the predetermined application program.

In the example embodiment, the tag 2 stores the object information (figure ID, etc.) relating to the object represented by the external appearance thereof and the user information (avatar data) relating to the user. The information processing device 3 uses the object information and the user information read from the tag to cause the display device to display the object and the information representing the user corresponding to the object in association with each other (steps S53, S55). Owing to this, the relationship between the object and the user (character of the user) stored on the tag can be presented in an easy-to-see manner.

In the example embodiment, the user information specifies the character (avatar) corresponding to the user, the character being different from the object represented by the external appearance of the tag 2. The information processing device 3 executes an application program different from the predetermined application program (specific application program) to cause the character (avatar) specified by the user information read from the tag 2 to appear in the virtual space (step S65). Owing to this, the character (avatar) of the user stored on the tag can appear in the virtual space, which makes the application more entertaining. In addition, one, same tag is usable to cause different characters to appear in the virtual space in the predetermined application program from in the application different from the predetermined application program.

The above-described user information may be any information representing the user. The user information is not limited to the avatar data as in the example embodiment, and may be, for example, the name, nickname, ID or the like of the user.

4. Modification Examples

Modification Example of the Specific Application/Non-Specific Application Determination Process In the above example, the determination in the specific application/non-specific application determination process is executed by use of the figure ID. In another embodiment, the determination may be executed by use of the use ID described above. Hereinafter, a modification example in which the specific application/non-specific application determination process is executed by use of the use ID will be described.

In this modification example, for reading or writing the dedicated data from or to the tag 2, the application unit 31 first causes the use ID to be included in an instruction (read instruction, write instruction, etc.) and transmits the instruction to the communication control unit 32. Namely, the application program includes information on the use ID to be set therefor. When issuing an instruction to the communication control unit 32, the application unit 31 transfers (outputs) an instruction including the use ID to the communication control unit 32. Owing to this, the communication control unit 32 can acquire the use ID of the application program. The application unit 31 may transfer the use ID to the communication control unit 32 at an optional timing. For example, in another embodiment, the communication control unit 32 may request the application unit 31 for the use ID in the specific application/non-specific application determination process, and in response to the request, the application unit 31 may transmits the use ID to the communication control unit 32.

In another embodiment, the communication control unit 32 may specify the use ID by use of a table that associates an application ID specific to an application program (different from the use ID) and the use ID set for the application program regarding each of the application programs. Namely, the communication control unit 32 may store the table in advance, acquire the application ID together with the read instruction from the application unit 31, and determine that the use ID associated with the acquired application ID as the use ID of the application program.

In the specific application/non-specific application determination process, the communication control unit 32 compares the use ID acquired together with the instruction from the application unit 31 against the use ID read from the tag 2 in step S2. In the case where the use IDs match each other, the communication control unit 32 determines that the application program that issued the instruction is the specific application program. By contrast, in the case where the use IDs do not match each other, the communication control unit 32 determines that the application program that issued the instruction is a non-specific application program.

As in the modification example described above, the tag 2 may store at least one type of identification information specifying the specific application program that can use the dedicated data (use ID). The communication control unit 32 accepts the use ID, corresponding to the application program that issued the instruction, from this application program. The communication control unit 32 determines whether or not the accepted instruction is from the specific application program based on the use ID stored on the tag 2 and the use ID acquired from the application program that issued the instruction (step S5). Owing to this, it can be easily determined whether or not the accepted instruction is from the specific application program.

Modification Example in which a Free Data Area is Set on the Tag

In another embodiment, the tag 2 may include a free data area in addition to the data areas shown in FIG. 3 (dedicated data area, shared data area, and management data area). Hereinafter, with reference to FIG. 18, an example in which a free data area is set on the tag 2 will be described as an example of the above embodiment.

Figure 18:
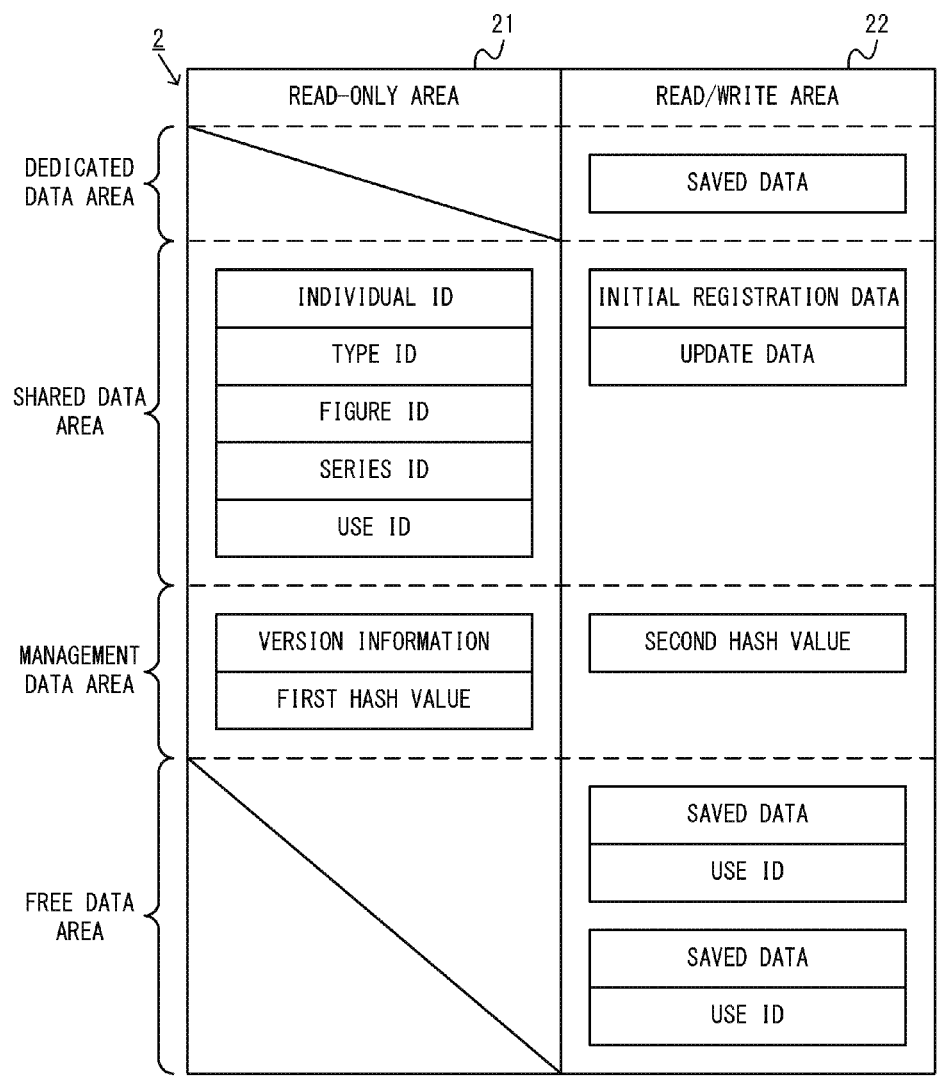
FIG. 18 shows an example of data stored on the tag in a modification example of the example embodiment.

FIG. 18 shows an example of data stored on the tag 2 in a modification example of the example embodiment. As shown in FIG. 18, in this modification example, a free data area is set in the read/write area 22 of the tag 2. The free data area is an area to which an application program other than the specific application program (non-specific application program) can write data. At the time of shipping of the tag 2, no data is basically stored in the free data area. In the case where, for example, game data is to be provided as a benefit to a user who purchases the tag, some data may be stored in the free data area.

The application unit 31 that executes a non-specific application program writes data (saved data) to the tag 2 as follows. First, the application unit 31 transmits a write instruction to the communication control unit 32. Like in the specific application/non-specific application determination process in the above modification example, the write instruction includes the use ID of the application program. In response to the write instruction, the communication control unit 32 executes processes substantially the same as those in the above embodiment (steps S1 through S6, S31) (in step S5, the communication control unit 32 executes a process substantially the same to that in the specific application/non-specific application determination process using the use ID in the above modification example). Namely, the communication control unit 32 accesses the tag 2, reads the data and transfers the read data (shared data) to the application unit 31. The application unit 31 transfers the saved data to be written to the tag 2 to the communication control unit 32.

Upon receipt of the saved data from the application unit 31, the communication control unit 32 writes the use ID acquired together with the write instruction and the received saved data to the tag 2 in the state where the use ID and the saved data are associated with each other (see FIG. 18). In the tag 2, the data to be written and the use ID may be associated with each other in an optional method. For example, a method by which the free data area is managed as being divided into a plurality of blocks may be used. One block includes a data area to which the saved data is to be written and an ID area to which the use ID of the application program corresponding to the saved data is to be written. The communication control unit 32 writes the saved data to the data area of one block and also writes the use ID to the ID area of the block. As a result, the saved data and the use ID are stored as being associated with each other. Depending on the data size of the saved data, the communication control unit 32 may write the data to two or more blocks. In this case, the same use ID is written to the ID area of each of the blocks to which the saved data is written.

In this modification example also, the update data may be updated at the timing when the saved data is written, like in the above embodiment.

The application unit 31 that executes a non-specific application program reads the saved data from the tag 2 as follows. The application unit 31 transmits a read instruction to the communication control unit 32. Like in the above modification example, the read instruction includes the use ID of the application program. In response to the read instruction, the communication control unit 32 executes processes substantially the same as those of steps S1 through S4.

In this modification example, in the case where it is determined that the tag 2 is not a permitted tag in the access permission/non-permission determination process of step S3 in the above embodiment, the communication control unit 32 executes the following determination process as the specific application/non-specific application determination process of step S5. The communication control unit 32 determines whether or not the use ID included in the read instruction matches the use ID stored in the free data area of the tag 2. The determination process is executed in order to determine whether or not the application program that issued the read instruction is the application program corresponding to the saved data in the free data area of the tag 2.

It is determined that the two use IDs match each other in the determination process, the communication control unit 32 transfers the shared data and the saved data stored in association with the matching use IDs to the application unit 31. Owing to this, the application program that wrote the saved data to the free data area of the tag 2 can read the saved data from the tag 2. By contrast, in the case where the two use IDs do not match each other, the communication control unit 32 transfers the shared data (only the shared data) to the application unit 31.

As described above, in another embodiment, an application program other than the specific application program may be allowed to write the data to the tag 2. Namely, the tag 2 may include a storage area (dedicated data area) from/to which data can be read/written by the predetermined application program (specific application program), a storage area (shared data area) from which data can be read by an application program regardless of whether or not the application program is the predetermined application program, and a storage data (free data area) to which data can be written by an application program regardless of whether or not the application program is the predetermined application program. Owing to this, the number of types of application programs that can write data to the tag 2 is increased. Thus, the versatility and the convenience of the tag 2 can be further improved.

In the above modification example, the communication control unit 32 writes data to the free data area of the tag 2 in response to an instruction to the application program as follows. The communication control unit 32 stores the data to be written and the use ID of the application program on the tag 2 in the state where the data and the use ID are associated with each other. When accepting, from the application program, a read instruction on the data stored in the free data area, the communication control unit 32 determines whether or not to transfer the data to the application program based on the use ID included in the accepted read instruction and the use ID that is associated, with the data to be read, in the free data area of the tag 2. Owing to this, the data stored in the free data area of the tag 2 can be managed to be read by the application programs corresponding to the data (application program that wrote the data and application program for which the same use ID as that of the former application program is set).

In the above modification example, the data (and the use ID) written to the free data area may be allowed to be deleted by the information processing device 3. For example, in response to an instruction from the system application program that received a delete instruction, the communication control unit 32 may delete the data indicated by the delete instruction from the tag 2. Owing to this, even when the free data area of the tag 2 becomes full, a new free area can be generated so that another piece of data can be written. In another embodiment, the tag 2 may store information indicating whether or not the data stored in the free data area can be deleted, in the state where the information is associated with the data.

Modification Example Regarding the External Appearance of the Tag

In the above embodiment, the tag 2 is a figure-type tag that represents a character three-dimensionally. The shape of the tag is not limited to this, and the tag may have an optional shape. For example, the tag 2 may be a card-type tag on which a picture of the character is drawn (tag which represents the character two-dimensionally). As can be seen, the tag may have an external appearance that represents, three-dimensionally or two-dimensionally, an object appearing in a predetermined application program (in other words, an object represented by the data stored on the tag (dedicated data and/or shared data)). Owing to this, an object that can be cause to appear in an application by use of the tag 2 is recognizable by the user in an easy-to-understand manner. In the case where the object is displayed on the display unit 17, the user feels as if a real object appeared in the virtual space. Thus, the application can be more entertaining.

Modification Example Regarding the Application Data

In another embodiment, the information processing device 3 may write application data to the tag 2 in the state where application data reflects information specific to the tag 2. For example, the information processing device 3 (application unit 31 and/or communication control unit 32) may set, for a predetermined parameter included in the application data, a value reflecting information (e.g., figure ID) specific to the tag 2 to which the data is to be written. In this case, the application data including the game parameter having such a value may be written to the tag 2. The predetermined game parameter may be any parameter usable in a game process performed by an application corresponding to the application data. For example, the predetermined parameter may be a parameter regarding the object (character or item) represented by the external appearance of the tag (for example, may be a parameter representing the strength of the character or a parameter representing the external appearance of the character).

This will be described specifically. For initially writing the application data to the tag 2, the application unit 31 sets a predetermined initial value as the game parameter. The communication control unit 32 writes the application data including the game parameter having such a predetermined initial value to the tag 2. The initial value may be any value; for example, may be a random value, a numerical value based on the information (individual ID) specific to the tag 2, or a fixed value. Then, for updating the application data stored on the tag 2, the application unit 31 updates the game parameter included in the pre-update application data stored on the tag 2, by use of the individual ID. For example, a post-update value of the game parameter may be calculated by multiplying a coefficient based on the individual ID stored on the tag 2 by the pre-update value. The communication control unit 32 writes the application data including the game parameter having the post-update value (post-update application data) to the tag 2 to update the application data. As described above, the above-described game parameter is included in the application data. This allows the application data stored on the tag 2 to include the information specific to the tag 2. Thus, the application data can be made information specific to the tag 2.

According to the above, even if two tags represent the same character (character ID) and the game proceeds in the same manner for the two tags, the contents of the application data stored on the two tags (game parameters included in the application data stored on the two tags) are different from each other because the tags have different individual IDs. For example, even if the game proceeds in the same manner for the two tags, the game characters corresponding to the tags have different appearances, have different levels of strength, or grow at different degrees. The application data stored on each tag is specific to the tag, and therefore the tags are individually different (even having the same external appearance). This makes the user to feel attached to his/her tag more easily. In addition, even though having the same external appearance, the tags can be distinguished more certainly by the difference in the game parameter.

According to the above process for updating the game parameter, the user can change the game parameter by use of the tag 2. Each time when updating the application data, the information processing device 3 may update the value of the game parameter such that the game is more advantageous to the user. In this case, the user is motivated and thus urged to use the tag 2.

Modification Example Regarding the Shared Data

In the above embodiment, FIG. 3 shows an example of data included in the shared data. The data included in the shared data is optional. In another embodiment, the initial registration data may include data on a message input by the user. The message is, for example, read by the application program executed by the information processing device 3 and displayed on the display unit 17.

For example, the initial registration data may include identification information on the user of the information processing device 3. The identification information on the user is, for example, a use ID on a network service using the information processing device 3 (e.g., service providing an application via a network). When, for example, the user accesses an information processing device available outside his/her house by use of a tag, the information processing device reads the ID of the user from the tag and notifies the server that the user accessed the information processing device. In this manner, the server can manage the information processing device accessed by the user by use of the tag. For example, an information processing device may be installed at the venue of an event. When the user accesses the information processing device by use of the tag, the server learns that the user is participated in the event. For example, the server may provide the user with a predetermined service or benefit on the network service in response to the notification from the information processing device.

As described above, the tag 2 stores the identification information on the user regarding the network service accessible by use of the information processing device 3. The information processing device 3 is communicable with the server providing the network service. When being permitted to communicate with the tag 2, the information processing device 3 accesses the server by use of the identification information read from the tag 2 under a certain condition, regardless of whether or not there is an instruction of the user. The expression "access the server" indicates that the information processing device 3 logs in to the network service provided by the server and also indicates that the information processing device 3 communicates with the server. According to the above, the user can communicate with the server by merely holding the tag 2 above the information processing device 3 with no need to perform any other operation. This improves the convenience of the tag 2.

In the case where the information processing device 3 logs in to the network service, the server may permit the login under the condition that the identification information and also a password are input. This prevents a person who is not the owner of the tag 2 from logging in to the network service fraudulently by use of the tag 2 of the user. The server may accept login to the network service made by use of the tag 2 or may also accept login to the network service made by input of the identification information (and the password) of the user to the information processing device 3 with no use of the tag 2. When the tag 2 is used for login to the network service, the server acquires the identification information on the user stored on the tag 2 that is communicable with the information processing device 3 which has accessed the server, and requests the user to input the password of the user. Under the condition that the correct password is input by the information processing device 3, the server permits the login.

The identification information on the user may be stored on the tag 2 by any method. In the case where, for example, the identification information on the user is registered to (stored on) a storage unit (e.g., memory) of the information processing device 3, the information processing device 3 (communication control unit 32) may acquire the identification information stored on the information processing device 3 and store the identification information on the tag 2 in the above-described initial registration process. Alternatively, for example, the communication control unit 32 may accept, from the user, input of the identification information on the user in the initial registration process, and store the input identification information on the tag 2. In the case where the identification information on the user is stored on the information processing device 3, the information processing device 3 can log in to the network service by use of the identification information stored thereon. Therefore, the user can log in to the network service with no use of the tag 2 through an information processing device storing the identification information on the user (e.g., terminal dedicated to the network service), and can log in to the network service by use of the tag 2 through an information processing device not storing the identification information on the user (e.g., general-purpose information processing terminal different from the dedicated terminal).

The information processing device not storing the identification information on the user, when being permitted to communicate with the tag 2, may read the identification information on the user stored on the tag 2 and store the identification information on a storage unit thereof. In this case, the identification information on the user can be registered, by use of the tag 2, to the information processing terminal on which the identification information was not stored. This is performed as follows, for example. The tag 2 is caused to access a first information processing device storing the identification information on the user (the tag 2 is held above the first information processing device) to register the identification information to the tag 2. Then, the tag 2 is caused to access a second information processing device not storing the identification information on the user, so that the identification information can be registered to the second information processing device. In this manner, the identification information on the user can be easily registered by use of the tag 2. The two information processing devices may each be any information processing device that is capable of performing near field communication with the tag 2 and includes a storage unit. The first information processing device and the second information processing device may be of different types.

In the above embodiment, the update data includes information regarding the write to the tag 2 (number of times of write, last-write device, number of times of device change, last-used application, and last-write date/time). In another embodiment, the update data may include information on the read from the tag 2. For example, the update data may include information such as the number of times of data read from the tag 2 (number of times the tag has been accessed), the information processing device that read data from the tag 2 most recently, the number of times the information processing device that read the data has been changed, the application program that read data from the tag 2 most recently, the date/time when the data read from the tag 2 was performed most recently, and/or the like.

In the above embodiment, information on the most recent write to the tag 2 (last-write device, last-used application, and last-write date/time) is included in the update data. In another embodiment, the update data may include information on the history of the data write to the tag 2. For example, the update data may include information on the history of the information processing devices that wrote data to the tag 2 (the data may be dedicated data), the history of the application programs that wrote data to the tag 2 (the data may be dedicated data), and/or the history of the date/time when the data was written to the tag 2 (the data may be dedicated data). In still another embodiment, information on the history of the data read from the tag 2 may be included in the update data.

For example, in another embodiment, the information processing devices that wrote data to the tag 2 may be managed as being divided into a "home" information processing device and an "away" information processing device, by use of the update data. The "home" information processing device is the information processing device that wrote the initial registration data, and is typically the information processing device possessed by the user. The "away" information processing device is an information processing device other than the "home" information processing device, and is typically an information processing device possessed by a friend of the user or an information processing device installed in a store or at a venue of an event. The update data may include the number of times of write made by the "home" information processing device and the number of times of write made by the "away" information processing device. Owing to this, an information process suitable to the state of use of the "home" information processing device and the "away" information processing device can be executed.

In another embodiment, the update data may include flag data that is set "ON" when a predetermined condition is fulfilled. The predetermined condition is that, for example, a specific information processing device installed in a store or at a venue of an event accesses the tag. Namely, the flag data stored on the tag 2 is updated to a value representing "ON" by the specific information processing device. Owing to this, information indicating that the user visited the store or the event is stored on the tag. Therefore, the application program can execute a process using such information (e.g., process of providing a benefit to the user who visited a specific event).

Modification Example Regarding the Structure of the Information Processing System In another embodiment, in the case where the tag 2 includes an information processing unit, a part of the process which would otherwise be executed by the information processing device 3 may be executed on the tag 2 side. For example, the process which would otherwise be executed by the communication control unit 32 (a part of, or the entirety of, the process) may be executed by the information processing unit of the tag 2. In the above embodiment, the communication control unit 32 actually reads dedicated data from the tag 2 and manages the transfer of the dedicated data to the application unit 31, and thus the read of the dedicated data from the tag 2 by the application unit 31 is restricted. By contrast, in the case where the process which would otherwise be executed by the communication control unit 32 is executed on the tag 2 side, the read of the dedicated data from the tag 2 by the information processing device 3 is literally restricted.

Modification Example in which the Use ID is Stored on the Read/Write Area

In the example embodiment, the use ID is stored in the read-only area (FIG. 3). Alternatively, the use ID may be stored in the read/write area 22. Namely, the use ID may be set or changed on the side of the user (on the side of the application). Hereinafter, a modification example of storing the use ID in the read/write area 22 of the tag 2 will be described.

Figure 19:
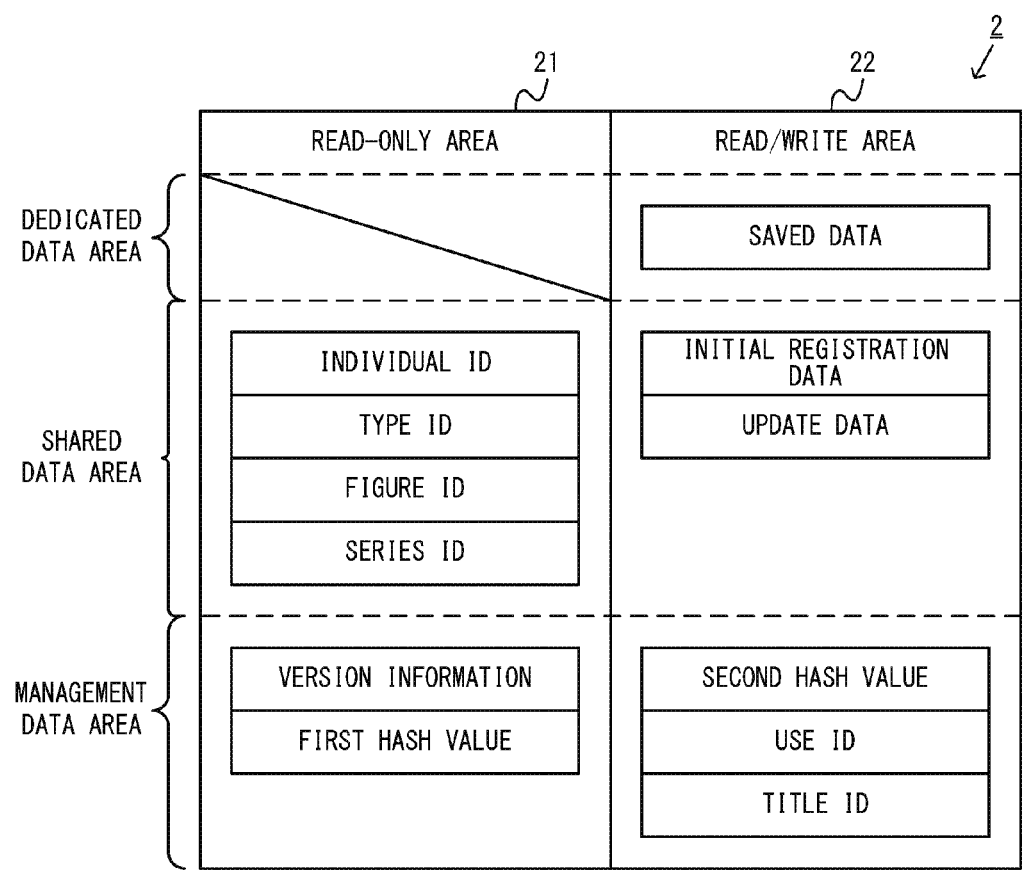
FIG. 19 shows an example of data stored on the tag in a modification example of the example embodiment.

FIG. 19 shows an example of data to be stored on a tag in a modification in the example embodiment. As shown in FIG. 19, the use ID is stored in the read/write area 22. In this modification example, the use ID is stored in a management data area. As described above, the use ID is identification information specifying an application program which can use dedicated data (saved data) stored on the tag 2 (the use ID is identification information specifying the specific application program).

In this modification example, the title ID (data on the title ID) is stored in the read/write area 22 of the tag 2. The title ID is identification information specifying the name of the application (in the case of, for example, a game application, the title of the game, etc.). The title ID is different from the series ID as follows. In the case where, for example, a plurality of applications are provided for one series, the plurality of applications are assigned different IDs so as to be distinguished from each other. In another embodiment, the title ID does not need to be stored together with the use ID, and the title ID may not be stored.

In this modification example, it is assumed that the use ID and the title ID are not stored at the time of shipping. Namely, neither the use ID nor the title ID is stored on the tag 2 which has just been purchased by the user (like other data to be stored in the read/write 22). It is assumed that the application program includes information on the use ID that is set for the application program itself. In another embodiment, the use ID (and the title ID) may be stored on the tag 2 at the time of shipping. Even in this case, the information processing device 3 may perform a process of deleting the use ID stored on the tag 2 (initialization process described later), so that a new use ID can be set by a process described later (see FIG. 20 and FIG. 21).

Regarding data other than the above-described data, substantially the same data as in the example embodiment is stored on the tag 2.

Figure 20:
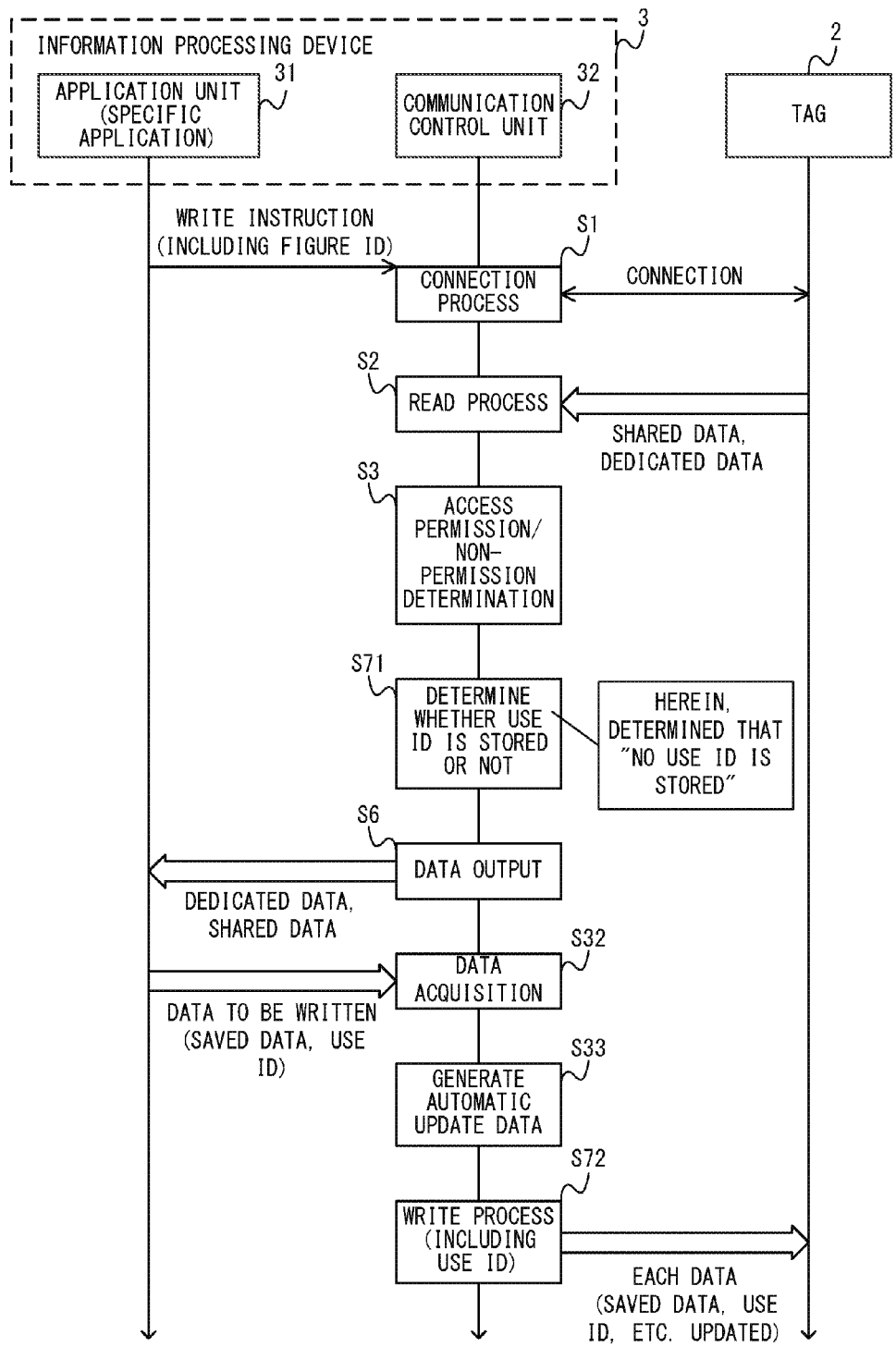
FIG. 20 shows an example of flow of an information processing system for writing data to the tag by an application program in the modification example of the example embodiment.

Now, with reference to FIG. 20 and FIG. 21, a processing operation executed by the information processing system 1 in this modification example will be described. FIG. 20 shows an example of flow of a process executed by the information processing system 1 for writing data to the tag 2 in accordance with the application program. In the following example, an instruction is issued to write dedicated data (saved data) to the tag 2 not storing a use ID.

In this modification example, as shown in FIG. 20, when being permitted to access the tag 2 in the access permission/non-permission determination process of step S3, the communication control unit 32 determines whether or not a use ID is stored on the tag 2 (step S71). As described later in detail, in the case where an access to the dedicated data area of a tag has not been made, for example, in the case of a tag which has been just purchased by the user, no use ID is stored on the tag. Therefore, it is determined in step S71 that no use ID is stored on such a tag.

In the case where it is determined that no use ID is stored, the communication control unit 32 executes the processes of steps S6, S32 and S33 in substantially the same manner as in the example embodiment, and then writes a use ID to the tag 2 at the time of writing the saved data or the like to the tag 2 (step S72). The use ID may be transmitted from the application unit 31 to the communication control 32 at an optional timing to be acquired by the communication control unit 32. For example, the use ID may be transmitted to the communication control unit 32 in step S1 as being included in the write instruction, or may be transmitted to the communication control unit 32 in step 32 together with the data to be written to the tag 2.

Figure 21:
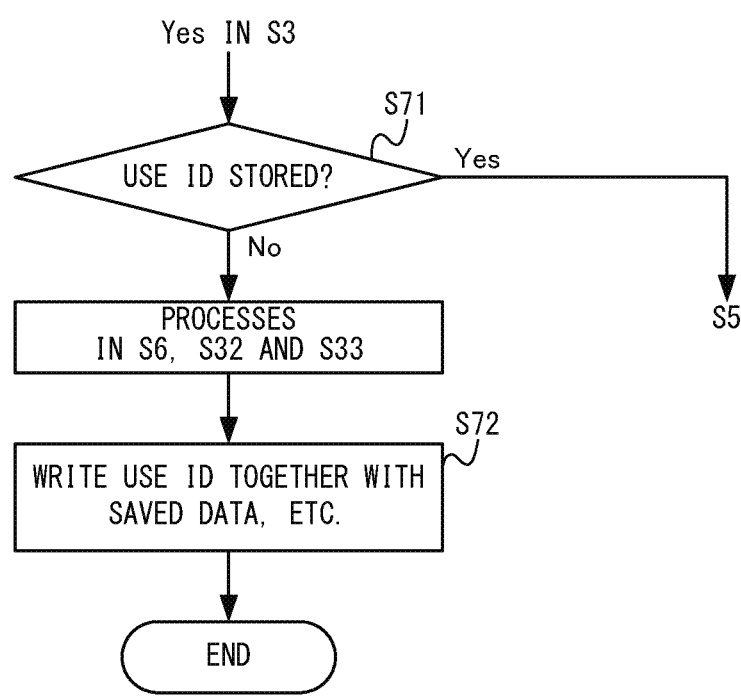
FIG. 21 is a flowchart showing an example of flow of a write instruction process in the modification example of the example embodiment.

FIG. 21 is a flowchart showing an example of flow of a write instruction process in this modification example. The flowchart in FIG. 21 shows differences between the flow in this modification example and the flow in FIG. 10. The write instruction process in this modification example is substantially the same as that in the example embodiment except for the processes shown in FIG. 21.

As shown in FIG. 21, in the case where the determination result in step S3 is positive, the process of step S71 is executed. In step S71, the communication control unit 32 determines whether or not a use ID is stored on the tag 2. The communication control unit 32 can make this determination by referring to the data read from the tag 2 in step S2. In the case where the determination result in step S71 is negative, the processes in steps S6, S32 and S33 are executed as described above. In step S72 subsequent to step S71, the communication control unit 32 writes a use ID to the tag 2 together with the saved data or like (data written to the tag 2 in step S34).

By contrast, in the case where the determination result in step S71 is positive, the process of step S5 is executed. In this modification example, the determination in step S5 is performed by use of the use ID (see the "Modification example of the specific application/non-specific application determination process"). Therefore, when a use ID is written to the tag 2 based on an instruction from a certain application, the certain application (and application(s) corresponding to the same use ID) is permitted to access the dedicated data area, whereas other applications are restricted from accessing the dedicated data area.

In the above, a process performed when the communication control unit 32 accepts a write instruction from the application unit 31 is described. When accepting an instruction other than the write instruction (e.g., read instruction, etc.), the communication control unit 32 may write a use ID to the tag 2 as in the case of the write instruction.

In the case where the determination result in the access permission/non-permission determination process (step S3) made by the communication control unit 32 upon acceptance of another instruction is positive, the communication control unit 32 executes the determination process of step S71. In the case where the determination result in step S71 is negative, the communication control unit 32 writes a use ID to the tag 2. The communication control unit 32 executes a process conformed to the instruction from the application unit 31 before or after performing the process of writing the use ID to the tag 2. By contrast, in the case where the determination result in step S71 is positive, the communication control unit 32 executes the specific application/non-specific application determination process of step S5 by use of the use ID.

Upon acceptance of the read instruction, the communication control unit 32 may write the use ID to the tag 2 under the condition that the accepted instruction is an instruction to read the dedicated data (saved data). Namely, in the case where the instruction from the application unit 31 is to read the shared data, even if the use ID is not stored on the tag 2, the use ID may not be written to the tag 2. In this case, the communication control unit 32 writes the use ID to the tag 2 when the dedicated data area of the tag 2 is accessed for the first time. Therefore, when the application unit 31 merely uses (reads) the shared data, the use ID is not written to the tag 2. As a result, there is no limitation on accesses to the dedicated data area of the tag 2, which improves the convenience.

As described above, in this modification example, when being made accessible to the tag 2 during execution of a predetermined application, the information processing device 3 determines whether or not the use information (use ID), indicating whether or not the application data (dedicated data) that is stored, or is to be stored, on the tag 2 is usable in the predetermined application, is stored on the tag 2 (step S71). At least under the condition that the use information is determined as not being stored on the tag 2, the information processing device 3 writes, to the tag 2, the use information indicating that the application data that is stored, or is to be stored, on the tag 2 is usable in the predetermined application (step S72). Under the condition that the use information indicating that the application data is usable in a certain application is stored on the tag 2, the information processing device 3 permits the certain application to use the application data stored on the tag 2 (step S5).

In the above, the information processing device 3 may write the use information at least under the condition that the user information is not (is determined as not being) stored on the tag 2. Namely, in the case where the use information is not stored on the tag 2, the information processing device 3 may write the use information to the tag 2 automatically (regardless of whether or not there is an instruction of the user), or may check with the user on whether or not to write the use information. In the case where as a result of the checking, the user issues an instruction not to write the use information to the tag 2, the information processing device 3 may restrict the storage of the application data on the tag 2. Namely, under the condition that use information corresponding to a certain application is stored on the tag 2, the information processing device 3 may permit application data for the certain application to be stored on the tag 2.

According to the above, the use information for the tag 2 can be set on the side of the user. Specifically, the user uses a tag on which no use information is stored during execution of a certain application, so that the tag can be used to store application data for the certain application. Owing to this, the user can determine the application for which the tag is to be used (the application, the application data for which the tag is to be used to store). This improves the convenience of the tag.

In the above, an optional tag is usable to store application data for an optional application. In another embodiment, the information processing system 1 may restrict applications corresponding to the application data which the tag is usable to store as follows, for example.

In the above-described modification example, the communication control unit 32 may execute an application compatible/incompatible determination process before the process of step S71. The application compatible/incompatible determination process is to determine whether or not the tag 2 which is in communication with the information processing device 3 is compatible to the application that issued the instruction. The communication control unit 32 can make this determination by, for example, incorporating, into an application program, information on the tag that is usable to store the application data for the application program (i.e., incorporating usability information). This will be described specifically. The communication control unit 32 acquires the usability information from the application unit 31 and determines whether or not the tags represented by the usability information include the tag 2 which is in communication with the information processing device 3. This determination is to determine whether or not the tag which is in communication with the information processing device 3 is usable for the application that is being executed. This determination can be made based on the identification information stored on the tag 2 and the acquired usability information. Specifically, this determination can be made based on whether or not the identification information stored on the tag 2 is included in the identification information (list of the identification information) represented by the usability information. The usability information may represent identification information on the tag 2 usable to store the application data for an application. For example, the usability information may represent the figure ID (list of usable figure IDs), which is identification information identifying the type of the tag 2.

In the case where the tag 2 which is in communication with the information processing device 3 is included in the tags represented by the usability information, the communication control unit 32 determines that the tag 2 which is in communication with the information processing device 3 is compatible to the application that issued the instruction, and executes the process of step S71. By contrast, in the case where the tag 2 which is in communication with the information processing device 3 is not included in the tags represented by the usability information, the communication control unit 32 determines that the tag 2 which is in communication with the information processing device 3 is incompatible to the application that issued the instruction. In this case, the application unit 31, for example, notifies that the user that the tag 2 is not usable to store the application data for the application.

As described above, the information processing system 1 may determine whether or not the tag 2 which is in communication with the information processing device 3 is compatible to the application that issued the instruction (that is being executed), and at least under the condition that the tag 2 is determined as being compatible, may store the use ID on the tag 2. This will be described specifically. The information processing device 3 acquires the usability information from the predetermined application which is being executed, and determines whether or not the tag 2 is usable for the predetermined application. In the case where the determination result is positive, under the condition that use ID is determined as not being stored on the tag 2 (No in step S71), the information processing device 3 writes, to the tag 2, the use ID indicating that the application data that is stored, or is to be stored, on the tag 2 is usable for the predetermined application.

If a tag representing a character that is not related at all to the contents of the application (e.g., character that does not appear in the application) is usable for the application, the relationship between the tag and application is not understood from the external appearance of the tag. When this occurs, it is possible that on a later stage, the user himself/herself does not recognize the application, the application data for which was stored on the tag. By contrast, in this modification example, the use of a tag that is not related to the application can be restricted. This improves the convenience of the tag.

The application compatible/incompatible determination process is to determine whether or not the tag is compatible to an application as a tag for storing the corresponding application data. Namely, even in the case where the tag is determined as being incompatible to a certain application in the application compatible/incompatible determination process, the shared data stored on the tag may be used in the certain application.

Modification Example in which the User is Urged to Perform Initial Registration

In the example embodiment, in response to the user issuing an instruction to perform the initial registration, the initial registration data is registered (written) to the tag 2. In another embodiment, in the case where no initial registration data is registered in the tag 2 made accessible by the information processing device 3, the information processing device 3 may urge the user to perform initial registration. Hereinafter, a modification example of urging the user to perform initial registration will be described.

Figure 22:
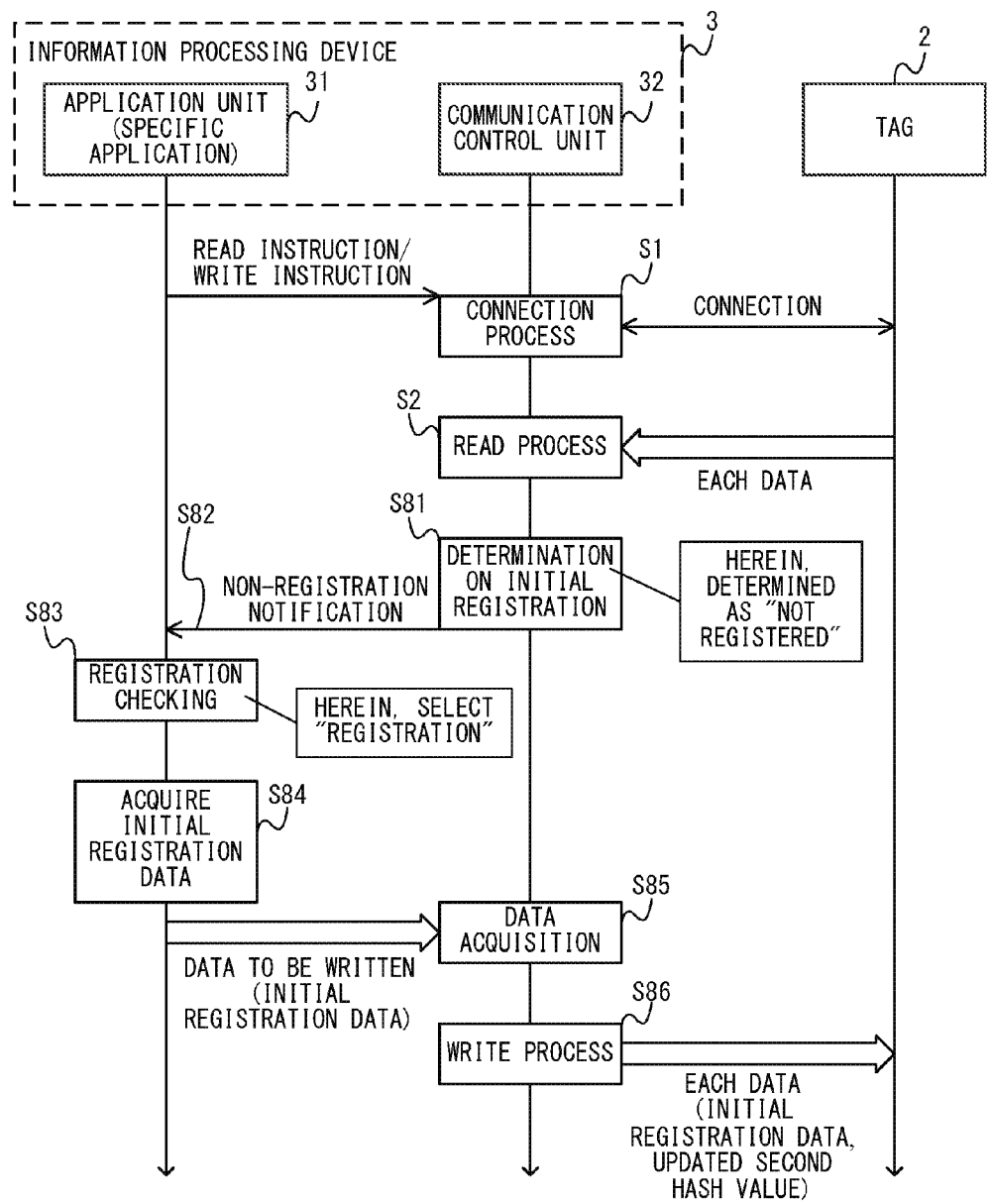
FIG. 22 shows an example of flow of a process executed by an information processing system for writing initial registration data to the tag in a modification example of the example embodiment.

FIG. 22 shows an example of flow of a process executed by the information processing system for writing initial registration data to the tag 2 in this modification example. FIG. 22 shows a flow of a process executed in the case where the information processing device 3 and the tag 2 are made communicable to each other during execution of an application program (specific application program or any other application program).

First, the communication control unit 32 executes a connection process of step S1 described above. The connection process may be started at an optional timing. In this modification example, the connection process is started in response to an instruction (specifically, a read instruction or a write instruction) issued from the application unit 31. In another embodiment, the connection process may be executed at a certain time interval. After step S1, the process of step S2 is executed. The contents of the processes of steps S1 and S2 are substantially the same as those in the example embodiment.

In this modification example, after step S2, the communication control unit 32 executes an initial registration/non-registration determination process (step S81). The initial registration/non-registration determination process is to determine whether or not the initial registration to the tag 2 has been performed, namely, whether or not the initial registration data is stored on the tag 2. The communication control unit 32 can make this determination by referring to the data read from the tag 2 in step S2 described above. In the case where it is determined that the initial registration to the tag 2 has not been performed, the communication control unit 32 transmits, to the application unit 31, a notification that the initial registration has not been performed (non-registration notification) (step S82). Although not shown in FIG. 22, in the case where it is determined that the initial registration to the tag 2 has been performed, the communication control unit 32 executes a process conformed to an instruction from the application unit 31.

Upon receipt of the non-registration notification, the application unit 31 executes a process of checking with the user regarding the registration (step S83). Specifically, the application unit 31 displays an image for checking with the user regarding the registration (registration checking image) on the display unit 17. In addition, the application unit 31 accepts an input of the user regarding the registration, and acquires initial registration data (step S84). Specific contents of the processes of steps S83 and S84 are optional. In this modification example, the processes of steps S83 and S84 are as follows.

Figure 23:
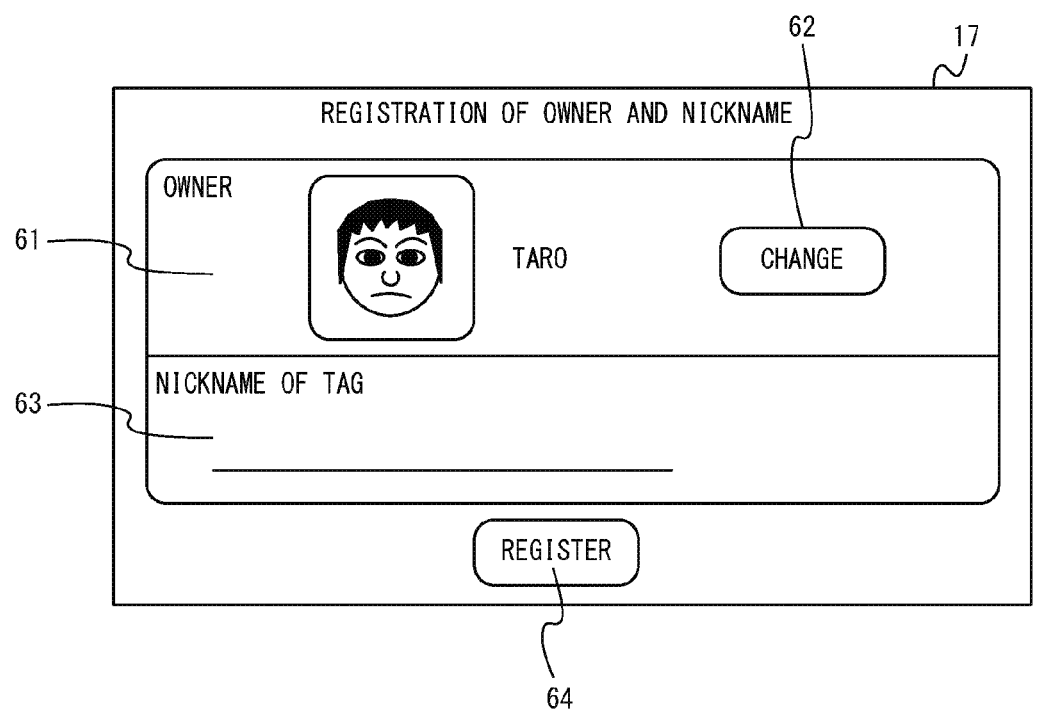
FIG. 23 shows an example of registration checking image in the modification example of the example embodiment.

FIG. 23 shows an example of registration checking image. The registration checking image shown in FIG. 23 is to urge the user to input avatar data and nickname data. As shown in FIG. 23, the registration checking image includes an owner input area 61 and a nickname input area 63. The owner input area 61 is provided for an input of information representing the owner of the tag 2 (in this example, avatar).

In this modification example, as shown in FIG. 23, the information on the avatar (in this example, face and name of the avatar) is occasionally displayed in advance. Namely, in the case where the avatar data is stored on the tag 2 (but the nickname data is not stored on the tag 2), the application unit 31 displays the information on the avatar in the registration checking image based on the avatar data stored on the tag 2.

The series of processes shown in FIG. 22 may be executed in repetition for each tag, or the initial registration may be executed continuously for a plurality of tags. The application 31 displays the information on the avatar, set in the immediately previous initial registration, in the registration checking image for the current initial registration. Specifically, the application unit 31 stores the avatar data that was set in the latest initial registration (immediately previous avatar data) on the memory 14, and when displaying the registration checking image the next time, displays the information on the avatar based on the immediately previous avatar data stored on the memory 14.

In the case where avatar data (different from the immediately previous avatar data) is registered in the information processing device 3 as the avatar of the user, the application unit 31 may display information on the avatar based on the avatar data. Namely, in the case where no avatar data is stored on the tag 2 and no immediately previous avatar data is stored on the memory 14 either, the application unit 31 displays information on the avatar based on the avatar data registered in the information processing device 3.

As described above, in this modification example, in the case where there is a registered avatar or an avatar expected to be input by the user (immediately previous avatar, or avatar data registered in the information processing device 3), information on such avatar data is displayed. This makes it unnecessary for the user to input such information. In another embodiment, information on such avatar data may not be displayed.

In FIG. 23, the owner input area 61 includes a change button 62, In the case where the user makes an input to specify the change button 62, the application unit 31 accepts an input of changing the avatar displayed in the owner input area 61 to another avatar. This allows the owner to change the avatar already displayed to another avatar.

The nickname input area 63 is provided for an input of information representing a nickname of the tag. The user inputs letters, symbols or the like to an input area of the nickname input area 63 to input the nickname of the tag 2. The input letters, symbols or the like are displayed in the above-described input area.

As shown in FIG. 23, the registration checking image includes a registration button 64. In the case where the user makes an input to specify the registration button 64, the application unit 31 acquires data on the avatar and the nickname displayed at the time of the input as initial registration data. In this modification example, it is not necessary that the user should perform initial registration in the state where the registration checking image is displayed. The user may specify the registration button 64 with the area(s) for the avatar and/or the nickname being blank. In this case, initial registration is not performed for the blank area(s) and is performed on only the information that is displayed.

Like in the example embodiment, the application unit 31 acquires data representing the current date/time and data representing the region (country) where the information processing device 3 exists. The initial registration data acquired as described above is transmitted from the application unit 31 to the communication control unit 32. Namely, the communication control unit 32 acquires the initial registration data from the application unit 31 (step S85). The process of step S85 is substantially the same as the process of step S12 in the example embodiment. Then, the communication control unit 32 writes the initial registration data or the like to the tag 2 (step S86). The process of step S86 is substantially the same as the process of step S13 in the example embodiment.

As described above, in the modification example, in the case where initial registration data (part of the initial registration data) is not registered to the tag 2, the registration checking image for urging the user to perform initial registration is displayed. When the initial registration is performed, the initial registration data is written to the tag 2. In this manner, the information processing system 1 can urge the user to perform initial registration. As described later in detail, in this modification example, dedicated data is restricted (prohibited) from being stored on a tag 2 on which initial registration has not been performed. This strengthens the motivation of the user to perform initial registration.

Figure 24:
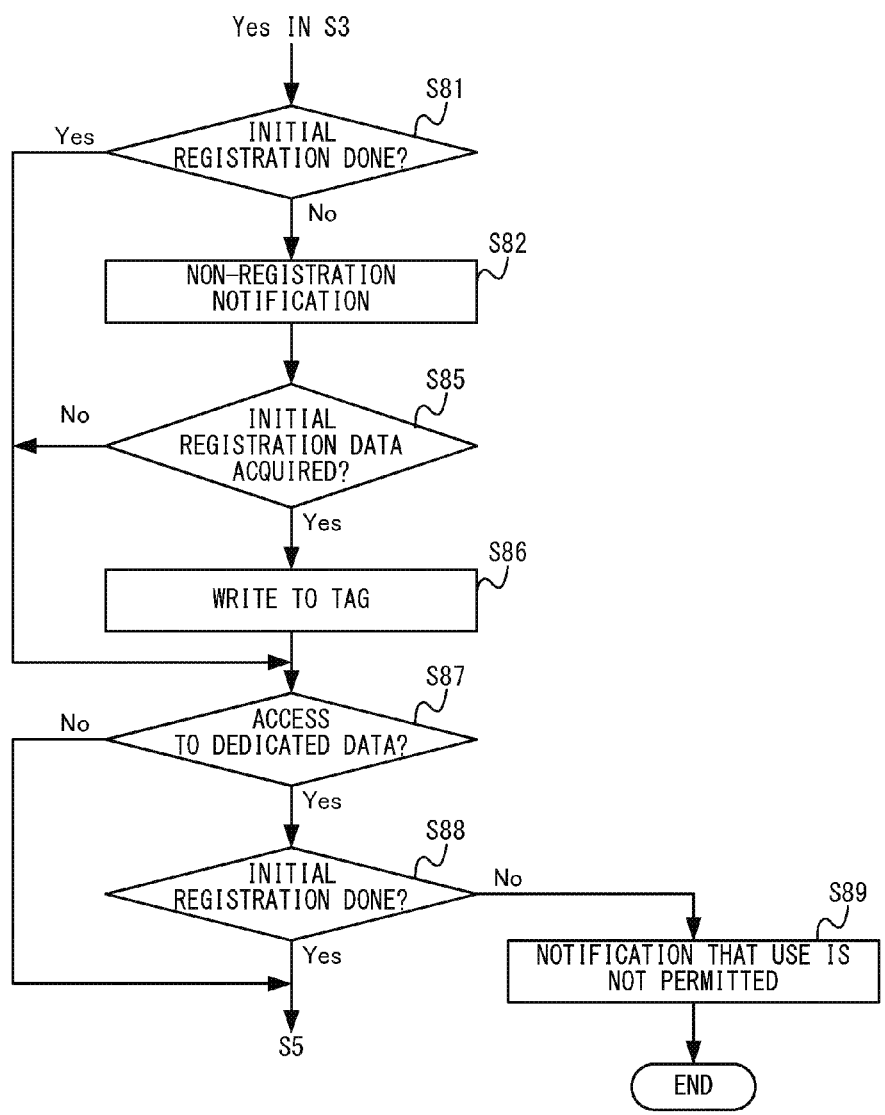
FIG. 24 is a flowchart showing an example of flow of a process for performing initial registration in the modification example of the example embodiment.

FIG. 24 is a flowchart showing an example of flow of a process for performing initial registration in this modification example. In this modification example, the process shown in FIG. 24 is executed in the read instruction process and the write instruction process described above.

In the case where the determination result in step S3 is positive in the read instruction process or the write instruction process, the process of step S81 described above is executed. In step 81, the communication control unit 32 executes the initial registration/non-registration determination process described above. In the case where the determination result in step S81 is positive, a process of step S87 described later is executed. By contrast, in the case where the determination result in step S81 is negative, the process of step S82 is executed. In step S82, the communication control unit 32 transmits a non-registration notification to the application unit 31. After step S82, the communication control unit 32 executes the process of step S85.

In step S85, the communication control unit 32 determines whether or not the initial registration data has been acquired from the application unit 31. In the case where the determination result in step S85 is negative, the process of step S86 is skipped, and the process of step S87 described later is executed. By contrast, in the case where the determination result in step S85 is positive, the process of step S86 is executed. In step S86, the communication control unit 32 writes the initial registration data and the like acquired from the application unit 31 to the tag 2.

In step S87, the communication control unit 32 determines whether or not the read instruction or the write instruction from the application unit 31 is an instruction to access dedicated data, namely, is an instruction to read or write dedicated data. In the case where the determination result in step S87 is negative, the process of step S5 described above is executed. Specifically, in the case where the application unit 31 is to access data (shared data) other than the dedicated data, a process conformed to the instruction (read instruction or write instruction) is executed in substantially the same manner as in the example embodiment.

By contrast, in the case where the determination result in step S87 is positive, a process of step S88 is executed. In step S88, the communication control unit 32 executes the initial registration process in substantially the same manner as in step S81 described above. In the case where the determination result in step S88 is positive, the process of step S5 is executed. Specifically, in the case where the initial registration data is stored on the tag 2, a process conformed to the instruction (read instruction or write instruction) is executed in substantially the same manner as in the example embodiment.

In the case where the determination result in step S88 is negative, a process of step S89 is executed. In step S89, the communication control unit 32 notifies the application unit 31 that the dedicated data area of the tag 2 is not usable. Upon receipt of this notification, the application unit 31 may execute any process; for example, executes a process of notifying the user that the dedicated data area is not usable because initial registration has not been performed. After step S89, the communication control unit 32 terminates the read instruction process or the write instruction process.

As described above, in this modification example, the tag 2 stores the shared data that is usable regardless of whether or not the application program is the predetermined application program. The information processing device 3 permits a predetermined process (process of accessing the dedicated data) in the predetermined application under the condition that the registration data (initial registration data) on the user and/or the information processing device 3 is stored on the tag 2 (steps S87 through S89). The information processing device 3 determines whether or not the registration data is stored on the tag 2. In the case where it is determined that the registration data is not stored on the tag 2, the information processing device 3 executes a process for storing the registration data on the tag 2 (step S83).

The "registration data" may be either the initial registration data in the example embodiment or any other data on the user and/or the information processing device 3 to be registered to (recorded on) the tag 2. The "predetermined process" is a process of accessing the dedicated data area in the example embodiment. Specific contents of the "predetermined process" are optional. For example, in another embodiment, the "predetermined process" may be a process of writing data to the tag 2, or a process of accessing the tag 2. In other words, in the case where the registration data is not stored on the tag 2, the information processing device 3 may restrict data from being written to the tag 2 or may restrict the access itself to the tag 2.

The "process for storing the registration data on the tag 2" may be a process of checking with the user regarding the storage of the registration data (process of urging the user to store the registration data) (see the above-described modification example), or a process of storing the registration data on the tag 2 automatically with no checking with the user (regardless of whether or not there is an instruction of the user).

According to the above, the user is requested to store the registration data on the tag 2 in order to execute a predetermined process (in order to use the function of a predetermined process). Therefore, the information processing system 1 can urge the user to store the registration data on the tag 2. Also according to the above, it is not required to store the registration data on the tag 2 in order to allow an application other than the predetermined application to use the shared data. Therefore, the user can use the tag 2 without performing the registration, which improves the convenience of the tag 2. Namely, according to the above, it is possible to urge the user to perform the registration to the tag 2 and also to improve the convenience of the tag 2.

In this modification example, the determination on whether or not the registration data is stored on the tag 2 is executed commonly in a plurality of applications. Specifically, the information processing device 3 performs the above determination in the case where any one of the plurality of applications is being executed, not only in the case where the specific application (e.g., the predetermined application that accesses the dedicated data area of the tag 2) is being executed. The plurality of applications may be any applications communicable with the tag 2 while being executed. As can be seen, in this modification example, the above determination is performed commonly in the plurality of types of applications. This increases the number of opportunities for urging the user to perform initial registration and thus easily causes the user to perform the initial registration.

In this modification example, in the case where it is determined that no registration data is stored on the tag 2 at the time when the information processing device 3 is to read and/or write the registration data from/to the tag 2 (e.g., at the time when the application unit 31 it to transmit the read instruction and/or write instruction), the information processing device 3 executes a process for storing the registration data on the tag 2. Namely, the process for storing registration data on the tag 2 is executed when an access is made to the registration data to be stored on the tag 2. Therefore, the user is caused to perform the initial registration at an appropriate timing.

In this modification example, for storing the initial registration data on the tag 2, the information processing device 3 may store data on the application which is being executed (application that issued the instruction) on the tag 2 as the dedicated data. Namely, upon acquisition of the initial registration data in step S21 described above, the application unit 31 may transmit predetermined dedicated data to the communication control unit 32 together with the initial registration data. The contents of the dedicated data are optional. For example, the dedicated data may be data to be initially set in accordance with the tag 2 in an application; specifically, data representing initial parameters of a character appearing in a game application (character represented by the tag 2). The dedicated data may be generated based on the initial registration data (avatar data and/or nickname data).

Upon acquisition of the initial registration data and the dedicated data, the communication control unit 32 determines whether or not the application that issued the instruction is permitted to access the dedicated data area. This determination can be made in substantially the same manner as for the specific application/non-specific application determination process described above. In the case where it is determined that the application that issued the instruction is permitted to access the dedicated data area, the communication control unit 32 stores the initial registration data and the dedicated data acquired from the application unit 31 on the tag 2. By contrast, in the case where it is determined that the application that issued the instruction is not permitted to access the dedicated data area, the communication control unit 32 stores the initial registration data acquired from the application unit 31 on the tag 2. The dedicated data acquired from the application unit 31 is not stored on the tag 2.

As described above, the information processing device 3 determines whether or not the tag 2 made accessible to the information processing device 3 during execution of a predetermined application stores registration data on the user and/or the information processing device 3 (step S81). In the case where it is determined that the tag 2 does not store the registration data, the information processing device 3 writes, to the tag 2, the registration data based on the registration contents input by the user. At the time when the registration data is written to the tag 2, the information processing device 3 also writes information on the predetermined application (dedicated data) to the tag 2 regardless of whether or not there is an instruction of the user.

According to the above, at the time when the registration data is registered to (stored on) the tag 2, information on the predetermined application is also stored on the tag 2 automatically. Therefore, there is no need for the user to separately make an instruction to store the information on the tag 2, which can save the time and labor of the user.

In the above, the dedicated data is generated and transmitted to the communication control unit 32 automatically with no checking with the user (regardless of whether or not there is an instruction of the user). In another embodiment, the information processing device 3 may check with the user regarding whether or not to write the dedicated data to the tag 2.

Figure 25:
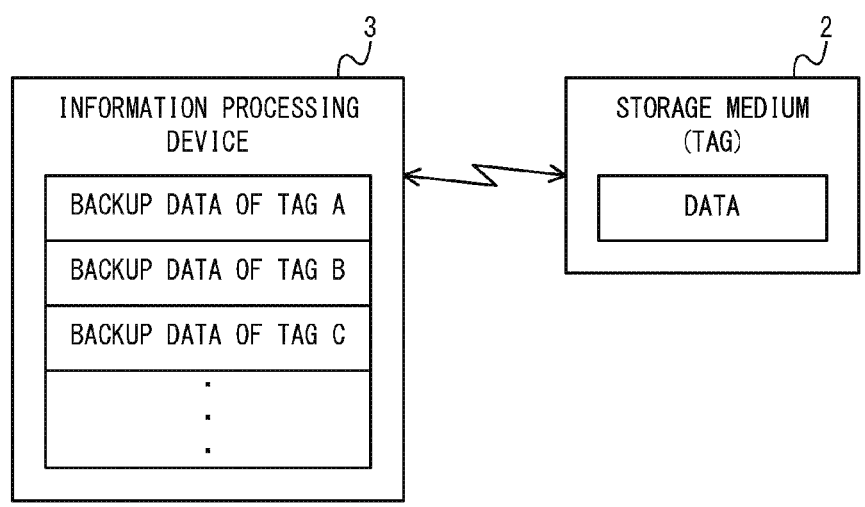
FIG. 25 shows an example of information processing system in the case where the information processing device stores backup data of data to be stored on the tag in a modification example of the example embodiment.

Modification Example in which Backup Data of Data that is Stored, or is to be Stored, on the Tag 2 is Stored The information processing device 3 may store backup data of data that is stored, or is to be stored, on the tag 2. FIG. 25 shows an example of information processing system 1 in which the information processing device 3 stores backup data of the data that is stored, or is to be stored, on the tag 2. As shown in FIG. 25, the information processing device 3 may store, on the information processing device 3 itself, the data that is stored, or is to be stored, on each of tags as backup data. Hereinafter, a modification example in which backup data of the data that is stored, or is to be stored, on each of the tags is generated will be described.

Figure 26:
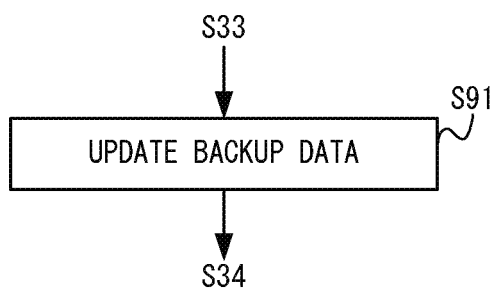
FIG. 26 is a flowchart showing an example of flow of a write instruction process in the modification example of the example embodiment.

In this modification example, at the time when data is written to the tag 2, the information processing device 3 backs up the data (the backup data is updated). FIG. 26 is a flowchart showing an example of flow of a write instruction process in this modification example. As shown in FIG. 26, in this modification example, the communication control unit 32 executes the process of generating update data to be written to the tag 2 (step S33) and then executes a process of step S91.

In step S91, the communication control unit 32 updates the backup data. Specifically, the communication control unit 32 stores identification information identifying the tag 2 which is in communication with therewith (i.e., UID or individual ID) and the backup data of the data to be stored on the tag 2 on a predetermined storage unit in association with each other. The backup data stored in this step is same as the data to be written to the tag 2 in the subsequent step S34. In this modification example, data to be written to the read/write area 22 is stored as backup data. Since the identification information and the backup data are stored in association with each other, the tag on which the data corresponding to the backup data is stored can be specified. The "predetermined storage unit" may be a storage device built in the information processing device 3 or an external storage device accessible by the information processing device 3.

After step S91, the process of step S34 is executed in substantially the same manner as in the example embodiment. As a result, data that is the same as the backup data is written to the tag 2. Therefore, the latest data written to the tag 2 is stored as the backup data.

Figure 27:
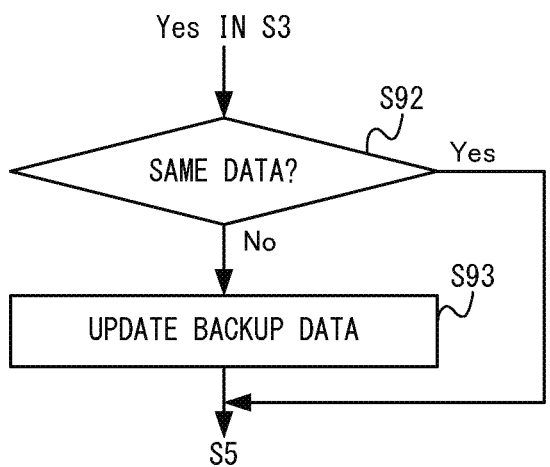
FIG. 27 is a flowchart showing an example of flow of a read instruction process in the modification example of the example embodiment.

In this modification example, at the time when data is read from the tag 2, it is determined whether or not the backup data is of the latest data on the tag 2. In the case where the backup data is not of the latest data on the tag 2, the backup data is updated. FIG. 27 is a flowchart showing an example of flow of a read instruction process in this modification example. As shown in FIG. 27, in this modification example, in the case where an access to the tag 2 is permitted in the access permission/non-permission determination process of step S3, a process of step S92 is executed.

In step S92, the communication control unit 32 determines whether or not the data read from the tag 2 in step S2 is the same as the backup data, stored on the storage unit, of the data stored on the tag 2. The determination can be made by, specifically, an optional method. For example, the communication control unit 32 may determine whether or not hash values (second hash values described above) of the two types of data are the same. The first time when the information processing device 3 accesses the tag 2, the backup data of the data stored on the tag 2 is not stored on the storage unit. In this case, the communication control unit 32 determines that the data read from the tag 2 is not the same as the backup data.

In the case where the determination result in step S92 is positive, the process of step S5 is executed in substantially the same manner as in the example embodiment. Specifically, in this case, the backup data is of the latest data on the tag 2, and therefore is not updated.

By contrast, in the case where the determination result in step S92 is negative, a process of step S93 is executed. In step S93, the communication control unit 32 updates the backup data of the data stored on the tag 2 which is in communication with the information processing device 3.

Specifically, the communication control unit 32 updates the backup data, among the backup data stored on the storage unit, which is associated with the tag 2 which is in communication with the information processing device 3, such that the backup data is same as the data read from the tag 2. In the case where the backup data associated with the tag 2 in communication with the information processing device 3 is not stored on the storage unit, the communication control unit 32 stores, on the storage unit, the identification information on the tag 2 and the data read from the tag 2 in step S2 in association with each other. After step S93, the process of step S5 is executed in substantially the same manner as in the example embodiment.

As described above, in this modification example, in the case where the backup data is not of the latest data on the tag 2 at the time when data is to be read from the tag 2, the backup data is updated. For example, in this modification example, in the case where data is written to a certain tag by the information processing device 3 and then data is written to the certain tag by another information processing device, the backup data stored on the information processing device 3 is not of the latest data stored on the certain tag. In order to avoid this, in this modification information, at the time when data is read from the tag 2, the backup data is updated to be of the latest data stored on the tag by the processes of steps S91 and S92 described above.

The information processing device 3 and the tag 2 perform near field communication with each other. Therefore, if the communication is disconnected while data is being written to the tag 2 (e.g., if the tag 2 is moved away from the information processing device 3), the data on the tag 2 may possibly be broken (the data may not possibly represent the correct content). In this modification example, when the data on the tag 2 is broken, the information processing device 3 can recover the data on the tag 2 by use of the backup data. Hereinafter, a data recovery process will be described.

Figure 28:
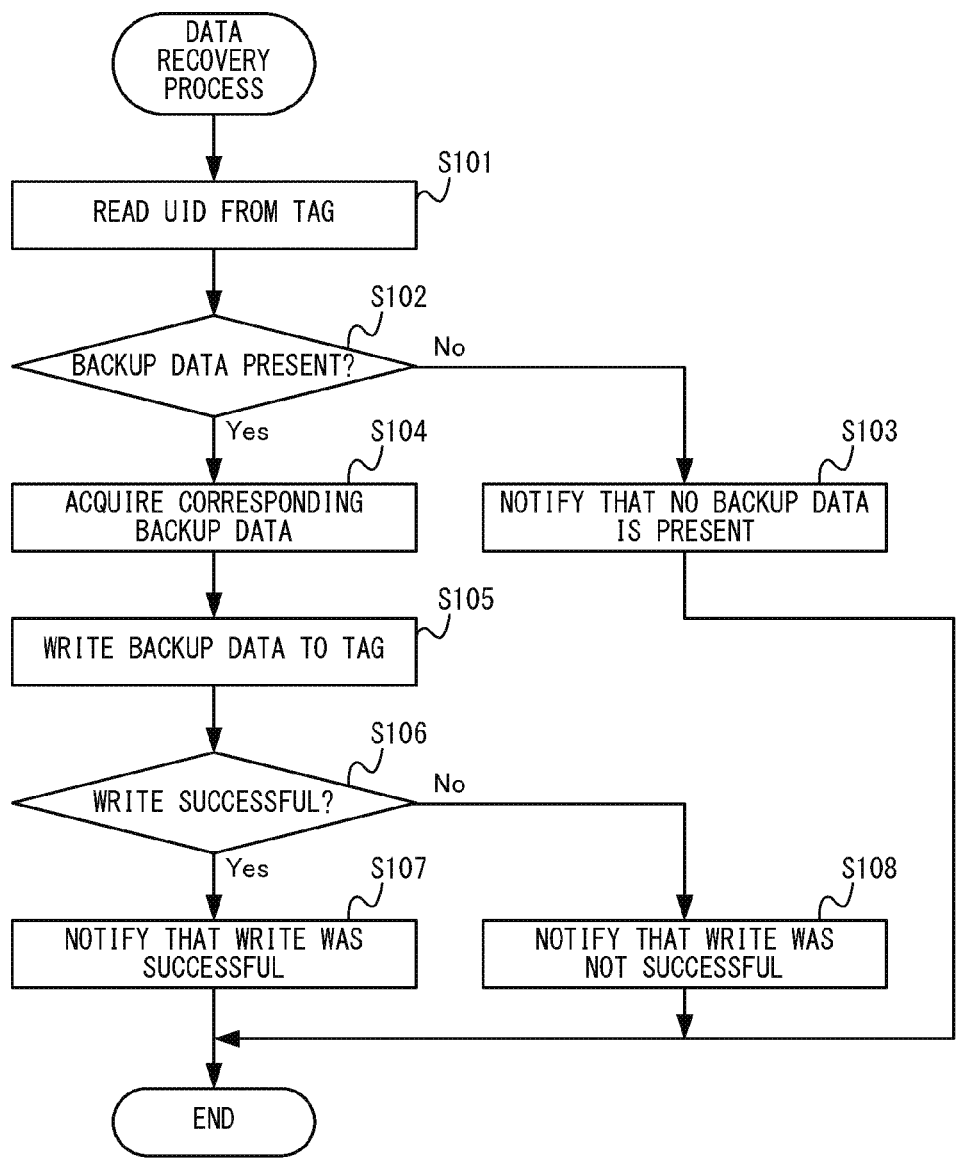
FIG. 28 is a flowchart showing an example of flow of a data recovery process in the modification example of the example embodiment.

FIG. 28 is a flowchart showing an example of flow of the data recovery process. In this modification example, the data recovery process is started in response to the application unit 31 outputting a recovery instruction. The application for outputting the recovery instruction may be a system application program or any other application program. For example, during execution of a system application program (e.g., while a menu screen is displayed), the user issues an instruction to recovery the data stored on the tag 2. In response to this instruction being accepted, the application unit 31 (system application program) outputs a recovery instruction. Alternatively, for example, in the case where data acquired by the application unit 31 from the tag 2 is broken during execution of an application, the application unit 31 outputs a recovery instruction.

First, in step S101, the communication control unit 32 reads identification information (UID) on the tag 2 from the tag 2 which is in communication with the information processing device 3. A read process in step S101 may be substantially the same as that in step S2 described above. The UID is stored in the read-only area 21, and therefore is not broken and is guaranteed to be correct. Namely, the above-described identification information may be stored in the read-only area 21 like the UID or the individual ID.

In step S102, the communication control unit 32 determines whether or not the backup data of the data stored on the tag 2 which is in communication with the information processing device 3 is stored on the storage unit of the information processing device 3. This determination can be made based on whether or not the backup data associated with the identification information read in step S101 is stored on the storage unit. In the case where the determination result in step S102 is negative, a process of step S103 is executed. By contrast, in the case where the determination result in step S102 is positive, a process of step S104 is executed.

In step S103, the communication control unit 32 notifies the application unit 31 that there is no backup data. In this case, for example, the application unit 31 notifies the user that the data cannot be recovered because there is no backup data. After step S103, the communication control unit 32 terminates the data recovery process.

In step S104, the communication control unit 32 acquires the backup data corresponding to the tag 2 which is in communication with the information processing device 3. Specifically, the communication control unit 32 reads, from the storage unit, the backup data associated with the identification information read in step S101. In step S105 subsequent thereto, the communication control unit 32 writes the backup data acquired step S104 to the tag 2.

In step S106, the communication control unit 32 determines whether or not the write of the data to the tag 2 was successful. This determination can be made based on, for example, whether or not the communication between the tag 2 and the information processing device 3 was disconnected during the write of the data.

In the case where the determination result in step S106 is positive, a process of step S107 is executed. In step S107, the communication control unit 32 notifies the application unit 31 that the data recovery was successful. In this case, for example, the application unit 31 notifies the user that the data recovery was successful.

By contrast, in the case where the determination result in step S106 is negative, a process of step S108 is executed. In step S108, the communication control unit 32 notifies the application unit that the data recovery was not successful. In this case, for example, the application unit 31 notifies the user that the data recovery was not successful. The application unit 31 may notify the user that the data recovery will be performed again.

After steps S107 and S108, the communication control unit 32 terminates the data recovery process. The information processing device 3 can recover the data on the tag 2 by the data recovery process described above. In this modification example, the data recovery process is executed during execution of an optional application (regardless of the type of the application which is being executed).

In this modification example, the tag 2 stores application data (dedicated data) usable in a predetermined application program (specific application program). The information processing device 3 stores backup data of the data that is stored, or is to be stored, on the tag 2. In the case where the data stored on a tag 2 communicable with the information processing device 3 is broken, the information processing device 3 recovers the data stored on the tag 2 by use of the backup data regardless of the type of the application which is being executed.

According to the above, in the case where the data on the tag 2 is broken, even while the specific application program is not being executed (e.g., while a system application or a non-specific application is being executed), the data on the tag 2 including the application data for the specific application program is recovered. Therefore, the application data can be recovered even without execution of the specific application program. Thus, the number of opportunities in which data recovery can be performed is increased.

In another embodiment, the information processing device 3 may store a plurality of pieces of backup data for a single tag 2. In this case, the information processing device 3 may store the date/time (or only date) at which the backup data was stored, in association with the backup data of the data stored on the tag 2. In the data recovery process, the information processing device 3 refers to the data on the date/time, so that the data can be recovered by use of the backup data stored most recently and also the backup data stored before the most recent time of storage. This will be described specifically. In step S104, the communication control unit 32 reads all the backup data, corresponding to the tag 2 which is in communication with the information processing device 3, that is stored on the storage unit. Then, the communication control unit 32 displays the date/time associated with the read backup data and has the user select the date/time of the backup data to be used for the recovery. In step S105, the communication control unit 32 writes, to the tag 2, the backup data associated with the date/time selected by the user. This allows the user to select desired backup data from a plurality of pieces of backup data having different dates/times and to recover the data.

Modification Example Regarding the Software Structure

The information processing device 3 may store a tag setting program for executing various types of setting processes on the tag 2 (process of initial registration, data recovery, etc. described above), and execute the tag setting program to execute any of the setting processes. Hereinafter, a modification example in which a tag setting program is prepared in the information processing device 3 will be described.

Figure 29:
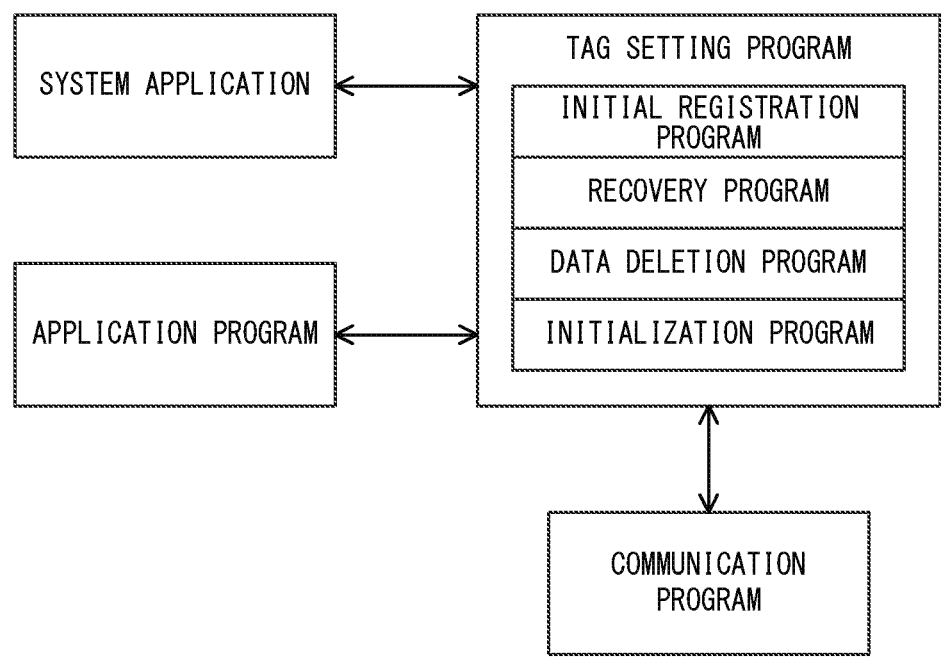
FIG. 29 shows an example of overview of a program structure stored on the information processing device in a modification example of the example embodiment.

FIG. 29 shows an overview of a structure of programs to be stored on the information processing device 3 in this modification example. As shown in FIG. 29, the information processing device 3 stores a system application program (in this example, referred to as a "system application"), a tag setting program, an application program (in this example, representing a specific application program and a non-specific application program), and a communication program.

In this modification example, the tag setting program includes an initial registration program, a recovery program, a data deletion program, and an initialization program. In another embodiment, the tag setting program may include at least one of these programs or any other program.

The initial registration program is to execute the initial registration described above by use of the communication control unit 32 (communication program). The initial registration program is to execute, for example, the processes of steps S83 and S83 described above.

The recovery program is to execute the data recovery for the tag 2 by use of the communication control unit 32 (communication program). The recovery program is to execute the process of transmitting the recovery instruction to the communication control unit 32 and/or the process of notifying the user based on the notification from the communication control unit 32 in, for example, the modification example described above in the "Modification example in which backup data of data that is stored, or is to be stored, on the tag 2 is stored". In another embodiment, the recovery program may be to execute a part of the processes (e.g., processes in steps S102 and S104), among the processes executed by the communication control unit 32 in the data recovery process (FIG. 28) in the above-described modification example.

The data deletion program is to delete dedicated data stored on the tag 2. Namely, the information processing device 3 can delete the dedicated data stored on the tag 2 by executing the data deletion program. The initialization program is to initialize the tag 2 (delete data in the read/write area 22). Namely, the information processing device 3 can delete the data stored in the read/write area 22 of the tag 2 by executing the data initialization program. Therefore, when the initialization program is executed in the "Modification example in which the use ID is stored in the read/write area" described above, the use ID set for the tag 2 can be deleted. This allows a use ID different from the deleted use ID to be newly set for the tag.

In this modification example, the system application and each of the application programs execute a process on the tag 2 by use of the tag setting program. The tag setting program may be executed as an application to be launched by the system application, and may be executed as an applet by each of the application programs. Namely, the tag setting program may be launched from the system application and also launched from each of the application programs. As can be seen, the tag setting program is prepared in the information processing device 3, and thus none of the application programs needs to prepare a function by the tag setting program. This allows an application to be developed easily.

For launching the tag setting program from the system application, one of the four programs included in the tag setting program may be specified by the user to be executed. For example, when the tag setting program is specified and launched in a menu screen of the system application, four items of "initial registration", "data recovery", "data deletion" and "initialization" may be displayed. In this case, the program corresponding to an item selected by the user is executed, and thus a process corresponding to the item is executed.

By contrast, for launching the tag setting program from an application program, the application program may select and execute one of the four programs included in the tag setting program in accordance with the situation. For example, in the case where the initial registration data is not stored on the tag 2 at the time when the specific application as the application program is to write dedicated data to the tag 2, the initial registration program may be executed to write the initial registration data to the tag 2.

Modification Example Regarding Encryption of Data Stored on the Tag

In another embodiment, a part of data stored on the tag 2 may not be encrypted or may be encrypted by an encryption method different from that for the rest of the data. For example, information representing the character (object) indicated by the external appearance of the tag 2 (such information is, for example, the figure ID described above) may be stored on the tag 2 without being encrypted. In this case, the information representing the character can be read by an information processing device having a function of decrypting the encrypted data stored on the tag 2 and also by an information processing device that does not have such a function. Thus, the information processing device that does not have such a function can also execute processes by use of the tag 2. Namely, the versatility of the tag 2 is improved. The information representing the character is recognizable from the external appearance of the tag 2 and thus does not cause any serious security problem even if not being encrypted.

As described above, the tag 2 has an external appearance that represents a predetermined object three-dimensionally or two-dimensionally. The tag 2 stores object information representing the predetermined object (figure ID) in a non-encrypted state, and stores a piece of information different from the object information in an encrypted state. The information processing device 3 executes a process of using the object information stored on the tag 2 to cause the display device to display the object. This improves the versatility of the tag as described above.

The object information may be stored as being encrypted by an encryption method different from that for the other data. For example, the tag 2 may store a piece of information different from the object information in a state of being encrypted by a first method and store the object information in a state of being encrypted by a second method different from the first method. A decryption function corresponding to the encryption of the second method is easier to use than the decryption function corresponding to the encryption of the first method. The decryption function corresponding to the encryption of the second method is, for example, provided free of charge. In this case, the versatility of the tag 2 is improved like in the above-described case.

In the above, the tag 2 is usable by two different types of information processing devices. For example, the first information processing device may not have a function of decrypting information encrypted by the first method, and may include a second decryption processing unit for decrypting information encrypted by the second method. The second information processing device may include a first decryption processing unit for decrypting information encrypted by the first method and also a second decryption processing unit for decrypting information encrypted by the second method. In the case where the object information is not encrypted, neither information processing device needs to include the second decryption processing unit. The first information processing device can use the object information stored on the tag 2, and the second information processing device can use the object information and information different from the object information stored on the tag 2. According to this, various types of information stored on the tag 2 are usable by the second information processing device (e.g., dedicated information processing device compatible to the tag 2), and the tag 2 is also usable by the first information processing device (e.g., general-purpose information processing device having a function of near field communication).

Modification Example Regarding a Process by an Application Program

As described above, in the case where one character (object) has a plurality of types, information representing the character stored on the tag 2 (figure ID described above) may include a first ID representing the plurality of types of the character as one group and also a second ID that is different by type. The application unit 31 may execute an information process based on a part of the figure ID as a process using the data (shared data) stored on the tag 2. Specifically, the application unit 31 may execute the information process based on the first ID. The contents of the information process are optional. For example, the contents of the information process are different for each of first IDS, and are the same as long as the first ID is the same even if the second ID is different. Specifically, the application unit 31 may execute a process of causing an item to appear based on the first ID in a game application. In this case, the application unit 31 causes the same item to appear as long as the first ID read from the tag 2 is the same even if the second ID is different. According to the above, the application unit 31 can execute the same process for the plurality of characters belong to the same group.

Under the condition that communication between the information processing device 3 and the predetermined tag 2 is made, the application unit 31 may change the setting in the application which is being executed. For example, in a game application, the application unit 31 may change the setting such that the number of characters or items usable in the game is increased or such that the user plays in a new stage.

The contents of the setting thus changed may be saved (stored) on the information processing device 3. In this case, the user does not need to cause the information processing device 3 and the tag 2 to communicate with each other each time the application is launched. This improves the convenience of the tag 2. The application unit 31 may execute the process of changing the setting in the application by use of the tag 2, regardless of whether or not the setting in the application has been changed by the tag 2 in another information processing device (different from the information processing device currently in communication with the tag 2). In this case, the user can change the setting in each of the applications to be executed by a plurality of information processing devices by use of one tag. This improves the convenience of the tag.

In another embodiment, the application unit 31 may not save, on the information processing device 3, the setting changed by the tag 2. In this case, each time the application is launched, the setting is returned to a default setting. In order to change the setting, it is requested to use the tag 2 (to cause the information processing device 3 and the tag 2 to communicate with each other) each time the application is launched.

In another embodiment, in the case where the setting in the application is changed by the tag 2, the application unit 31 may write, to the tag 2, setting changing information indicating that the setting has been changed. In this case, the application unit 31 may execute a process of changing the setting in an application by use of the tag 2 under the condition that the setting in the application has not been changed by use of the tag 2 in another information processing device (different from the information processing device currently in communication with the tag 2).

The systems, devices and apparatuses described herein may include one or more processors, which may be located in one place or distributed in a variety of places communicating via one or more networks. Such processor(s) can, for example, use conventional 3D graphics transformations, virtual camera and other techniques to provide appropriate images for display. By way of example and without limitation, the processors can be any of: a processor that is part of or is a separate component co-located with the stationary display and which communicates remotely (e.g., wirelessly) with the movable display; or a processor that is part of or is a separate component co-located with the movable display and communicates remotely (e.g., wirelessly) with the stationary display or associated equipment; or a distributed processing arrangement some of which is contained within the movable display housing and some of which is co-located with the stationary display, the distributed portions communicating together via a connection such as a wireless or wired network; or a processor(s) located remotely (e.g., in the cloud) from both the stationary and movable displays and communicating with each of them via one or more network connections; or any combination or variation of the above.

The processors can be implemented using one or more general-purpose processors, one or more specialized graphics processors, or combinations of these. These may be supplemented by specifically-designed ASICs (application specific integrated circuits) and/or logic circuitry. In the case of a distributed processor architecture or arrangement, appropriate data exchange and transmission protocols are used to provide low latency and maintain interactivity, as will be understood by those skilled in the art.

Similarly, program instructions, data and other information for implementing the systems and methods described herein may be stored in one or more on-board and/or removable memory devices. Multiple memory devices may be part of the same device or different devices, which are co-located or remotely located with respect to each other.

The example embodiment is usable as, for example, a game device or a game system for executing a game application or the like or a storage device or the like storing game data for the purpose of, for example, using a storage device in a more versatile manner.

While certain example systems, methods, devices and apparatuses have been described herein, it is to be understood that the appended claims are not to be limited to the systems, methods, devices and apparatuses disclosed, but on the contrary, are intended to cover various modifications and equivalent arrangements included within the spirit and scope of the appended claims.

What is claimed is:

1. A storage device comprising:
a near field communications transponder; and
a memory coupled to the near field communications transponder, the memory configured to provide:
at least one application data storage area dedicated for use by a first application; and
a shared data storage area usable by the first application as well as other applications, the shared data storage area storing at least one of (a) identification information specific to the storage device, (b) identification information representing a type of the storage device, (c) identification information specific to an external appearance of the storage device, and (d) identification information specific to a group to which an object represented by the storage device belongs;
wherein the shared data storage area stores data that is configured to cause a character to appear in a virtual space defined by the application.

2. The storage device of claim 1 wherein the shared data storage area is configured for use by the first application and at least one additional application that is different from the first application.

3. The storage device of claim 2 wherein the application data storage area is configured to store dedicated data that is configured for use only by the first application.

4. The storage device of claim 1 wherein the storage device comprises a figure-type tag having an external appearance representing a character.

5. The storage device of claim 1 wherein at time of manufacture, data is prestored in the shared data storage area.

6. The storage device of claim 1 wherein at time of manufacture, no data is prestored in the application data storage area.

7. The storage device of claim 1 wherein the application data storage area comprises a read/write area.

8. The storage device of claim 1 wherein the shared data storage area comprises a read/write area.

9. The storage device of claim 8 wherein the shared data storage area comprises a read-only area.

10. The storage device of claim 1 wherein the shared data storage area comprises a read-only area.

11. The storage device of claim 1 wherein the shared data storage area stores data that is configured to cause an item to appear in a virtual space defined by the application.

12. The storage device of claim 1 wherein the at least one application data storage area is pre-allocated at time of manufacture.

13. The storage area of claim 1 wherein the storage device is configured to enable the at least one application data storage area to be allocated to the first application after the storage device is manufactured.

14. The storage area of claim 1 wherein the storage device is configured to store avatar data, data representing a nickname, data representing registration date/time, and data representing region.

15. A storage device comprising:
a near field communications transponder; and
a memory coupled to the near field communications transponder, the memory configured to provide:
a shared data storage area usable by plural applications, the shared data storage area storing at least one of (a) identification information specific to the storage device, (b) identification information representing a type of the storage device, (c) identification information specific to an external appearance of the storage device, and (d) identification information specific to a group to which an object represented by the storage device belongs,
wherein the storage device comprises a figure-type tag having an external appearance representing a character.

16. A storage device comprising:
a near field communications transponder; and
a memory coupled to the near field communications transponder, the memory configured to provide:
a shared data storage area usable by plural applications, the shared data storage area storing at least one of (a) identification information specific to the storage device, (b) identification information representing a type of the storage device, (c) identification information specific to an external appearance of the storage device, and (d) identification information specific to a group to which an object represented by the storage device belongs;
wherein the shared data storage area stores data that is configured to cause a character to appear in a virtual space defined by the application.

17. A storage device comprising:
a near field communications transponder; and
a memory coupled to the near field communications transponder, the memory configured to provide:
a shared data storage area usable by plural applications, the shared data storage area storing at least one of (a) identification information specific to the storage device, (b) identification information representing a type of the storage device, (c) identification information specific to an external appearance of the storage device, and (d) identification information specific to a group to which an object represented by the storage device belongs;

wherein the shared data storage area stores data that is configured to cause an item to appear in a virtual space defined by the application.

* * * * *